(12) United States Patent
Chujoh et al.

(10) Patent No.: US 7,236,530 B2
(45) Date of Patent: *Jun. 26, 2007

(54) VARIABLE-LENGTH DECODING APPARATUS AND DECODING METHOD

(75) Inventors: Takeshi Chujoh, Toky (JP); Toshiaki Watanabe, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 149 days.

This patent is subject to a terminal disclaimer.

(21) Appl. No.: 10/957,733

(22) Filed: Oct. 5, 2004

(65) Prior Publication Data

US 2005/0041741 A1    Feb. 24, 2005

Related U.S. Application Data

(63) Continuation of application No. 09/319,160, filed as application No. PCT/JP98/04460 on Oct. 2, 1998, now Pat. No. 6,829,299.

(30) Foreign Application Priority Data

Oct. 2, 1997  (JP) .................................. 9-269916
Jul. 3, 1998  (JP) ................................. 10-189317

(51) Int. Cl.
  *H04B 1/66*    (2006.01)
(52) U.S. Cl. ........................ 375/240.23; 375/240.25; 375/240.27; 375/240.26; 375/240.28; 382/233; 382/235; 382/246
(58) Field of Classification Search .......... 375/240.23, 375/240.27, 240.25, 240.28, 240.26; 382/233, 382/235, 246
See application file for complete search history.

(56) References Cited

U.S. PATENT DOCUMENTS

| 5,488,418 A | 1/1996 | Mishima et al. |
| 5,488,616 A | 1/1996 | Takishima et al. |
| 5,734,430 A | 3/1998 | Mishima et al. |
| 5,778,191 A | 7/1998 | Levine et al. |
| 5,793,432 A | 8/1998 | Mishima et al. |
| 5,852,469 A * | 12/1998 | Nagai et al. ........... 375/240.23 |
| 5,854,799 A | 12/1998 | Okada et al. |

(Continued)

FOREIGN PATENT DOCUMENTS

CA    2016762    11/1990

(Continued)

OTHER PUBLICATIONS

K.A. Schouhamer Immink; "Error Detecting Runlength-Limited Sequences"; Eighth International Conference on Video, Audio and Data Recording, The University of Birmingham, UK; Apr. 24-26, 1990; pp. 176-182; XP000218953.

(Continued)

*Primary Examiner*—Shawn S. An
(74) *Attorney, Agent, or Firm*—Foley & Lardner LLP

(57) ABSTRACT

Encoded data using reversible variable length code words is input to a forward decoder (123) to be decoded in the forward direction. When an error is detected in the encoded data in the forward decode processing, backward decode processing is started by a backward decoder (126). A decode value determination unit (125) determines a decode value by using the forward and backward decode results and the error detection positions in the encoded data in units of bits and syntax which are respectively detected in the forward decoding and the backward decoding.

10 Claims, 40 Drawing Sheets

U.S. PATENT DOCUMENTS

| | | | |
|---|---|---|---|
| 6,111,916 | A | 8/2000 | Talluri et al. |
| 6,317,461 | B1 | 11/2001 | Chujoh et al. |
| 6,415,398 | B1 | 7/2002 | Kikuchi et al. |
| 6,516,034 | B2 * | 2/2003 | Todo et al. ............ 375/240.25 |
| 6,829,299 | B1 * | 12/2004 | Chujoh et al. .............. 375/240 |

FOREIGN PATENT DOCUMENTS

| | | |
|---|---|---|
| EP | 0 732 855 B1 | 10/2002 |
| JP | 5-252055 A | 9/1993 |
| JP | 5-300027 A | 11/1993 |
| JP | 8-340258 A | 12/1996 |
| WO | WO 97/15888 A1 | 5/1997 |

OTHER PUBLICATIONS

F. Eryurtlu et al., "Error Robustness Improvement of video Codecs with Two-Way Decodable Codes", Electronics Letters, vol. 33, No. 1, Jan. 1997.

Y. Takishima et al., "Reversible Variable Length Codes", IEEE Transactions on Communications, vol. 43, No. 2/3/4, pp. 158-162 (Feb.-Apr. 1995).

K. Nakajo et al., "Reversible Code and its Application to Dynamic Image Coding Having Error Resistance," The Transaction of IEICE, A, vol. J80-A, No. 3, pp. 532-541 (Mar. 1997).

Kikuchi et al., "Method of Coding Dynamic Image with High Error Resistance Appropriate for Modile Image Communication,", The Journal of the Institute of image Information and Television Engineers, vol. 51, No. 10, pp. 1772-1729 (1997).

A.S. Fraenkel et al., "Bidirectional Huffman Coding," The Computer Journal, vol. 33, No. 4, pp. 296-307 (1990).

K. Rose et al., "Enhancement of One-Dimensional Variable-Length DPCM Images Corrupted by Transmission Errors," IEEE Transactions on Communications, vol. 37, No. 4, pp. 373-379 (Apr. 1989).

* cited by examiner

FORWARD CODE TREE

BACKWARD CODE TREE

```
 0 1                    0 1          0        REARRANGE-    A   0 1 0
 0 0 0                  0 0 0        0          MENT        B   0 0 0 0
 1 0 0         0      → 1 0 0        0       ─────────→    C   1 0 0 0
 1 1 0      + 1 1       1 1 0        0                      D   1 1 0 0
 1 1 1        1 0 1     1 1 1        0                      E   1 1 1 0
 0 0 1 0                0 0 1 0      0                      F   0 1 1 1
 0 0 1 1                0 0 1 1      0                      G   0 0 1 0 0
 1 0 1 0                1 0 1 0      0                      H   0 0 1 1 0
 1 0 1 1                1 0 1 1      0                      I   1 0 1 0 0
                                                            J   1 0 1 1 0
                        0 1          1 1                    K   0 0 0 1 1
                        0 0 0        1 1                    L   1 0 0 1 1
                        1 0 0        1 1                    M   1 1 0 1 1
                        1 1 0        1 1                    N   1 1 1 1 1
                        1 1 1        1 1                    O   0 1 1 0 1
                        0 0 1 0      1 1                    P   0 0 1 0 1 1
                        0 0 1 1      1 1                    Q   0 0 1 1 1 1
                        1 0 1 0      1 1                    R   1 0 1 0 1 1
                        1 0 1 1      1 1                    S   1 0 1 1 1 1
                                                            T   0 0 0 1 0 1
                        0 1          1 0 1                  U   1 0 0 1 0 1
                        0 0 0        1 0 1                  V   1 1 0 1 0 1
                      → 1 0 0        1 0 1                  W   1 1 1 1 0 1
                        1 1 0        1 0 1                  X   0 0 1 0 1 0 1
                        1 1 1        1 0 1                  Y   0 0 1 1 1 0 1
                        0 0 1 0      1 0 1                  Z   1 0 1 0 1 0 1
                        0 0 1 1      1 0 1              SPACE   1 0 1 1 1 0 1
                        1 0 1 0      1 0 1
                        1 0 1 1      1 0 1
```

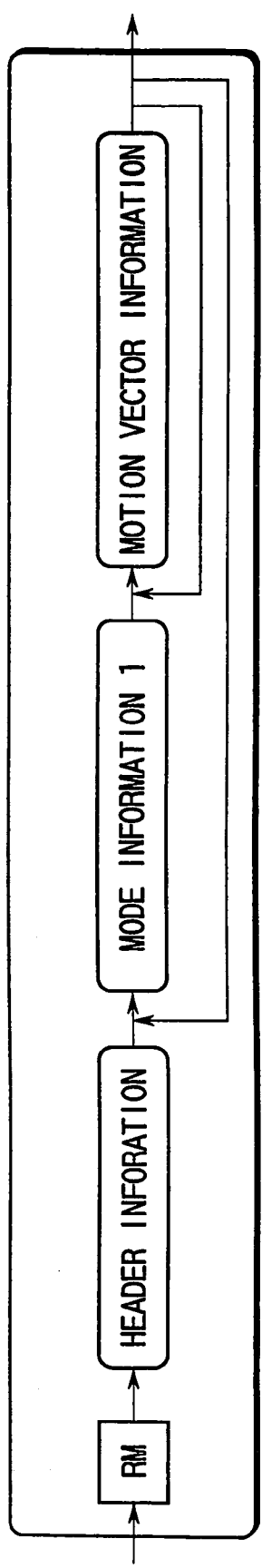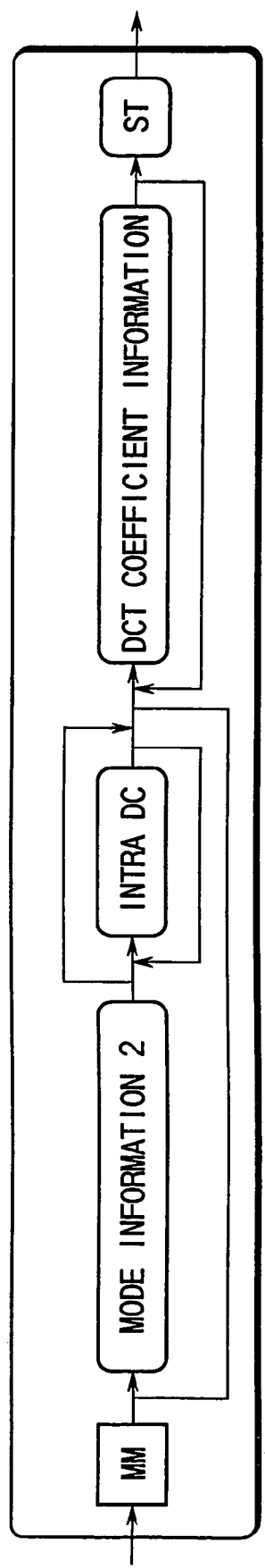

FIG. 22

| RUN | | | | | | | | | | | | | | LEVEL | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 0 | 1 | 2 | 3 | 6 | 12 | 13 | 20 | 30 | 31 | 42 | 43 | 56 | 57 | 58 | 72 | 73 | 74 | 90 | 91 | 110 | 111 | 92 | 112 | 132 | 133 |
| 1 | 4 | 7 | 21 | 32 | 33 | 44 | 59 | 75 | 76 | 93 | 113 | 135 | 136 | 0 | 0 | 0 | 0 | 0 | 0 | 0 | 0 | 0 | 0 | 0 | 0 |
| 2 | 8 | 22 | 45 | 60 | 77 | 78 | 114 | 115 | 116 | 137 | 138 | 0 | 0 | 0 | 0 | 0 | 0 | 0 | 0 | 0 | 0 | 0 | 0 | 0 | 0 |
| 3 | 9 | 34 | 46 | 79 | 94 | 117 | 139 | 140 | 157 | 0 | 0 | 0 | 0 | 0 | 0 | 0 | 0 | 0 | 0 | 0 | 0 | 0 | 0 | 0 | 0 |
| 4 | 14 | 35 | 61 | 95 | 96 | 141 | 0 | 0 | 0 | 0 | 0 | 0 | 0 | 0 | 0 | 0 | 0 | 0 | 0 | 0 | 0 | 0 | 0 | 0 | 0 |
| 5 | 15 | 47 | 80 | 97 | 142 | 143 | 0 | 0 | 0 | 0 | 0 | 0 | 0 | 0 | 0 | 0 | 0 | 0 | 0 | 0 | 0 | 0 | 0 | 0 | 0 |
| 6 | 23 | 62 | 81 | 98 | 158 | 0 | 0 | 0 | 0 | 0 | 0 | 0 | 0 | 0 | 0 | 0 | 0 | 0 | 0 | 0 | 0 | 0 | 0 | 0 | 0 |
| 7 | 24 | 63 | 82 | 118 | 159 | 0 | 0 | 0 | 0 | 0 | 0 | 0 | 0 | 0 | 0 | 0 | 0 | 0 | 0 | 0 | 0 | 0 | 0 | 0 | 0 |
| 8 | 36 | 64 | 119 | 144 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 37 | 83 | 120 | 160 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 48 | 99 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 65 | 121 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 66 | 161 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 84 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 122 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 123 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 145 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 146 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 147 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 162 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | LEVEL | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| 0 | 1 | 3 | 6 | 20 | 30 | 31 | 42 | 56 | 57 | 72 | 73 | 90 | 110 | 111 | 112 | 113 | 132 | 133 | 156 |
| 1 | 2 | 12 | 32 | 43 | 58 | 74 | 91 | 114 | 134 | 135 | 0 | 0 | 0 | 0 | 0 | 0 | 0 | 0 | 0 |
| 2 | 4 | 21 | 44 | 75 | 92 | 136 | 137 | 0 | 0 | 0 | 0 | 0 | 0 | 0 | 0 | 0 | 0 | 0 | 0 |
| 3 | 7 | 33 | 59 | 93 | 115 | 138 | 157 | 0 | 0 | 0 | 0 | 0 | 0 | 0 | 0 | 0 | 0 | 0 | 0 |
| 4 | 8 | 34 | 76 | 116 | 158 | 0 | 0 | 0 | 0 | 0 | 0 | 0 | 0 | 0 | 0 | 0 | 0 | 0 | 0 |
| 5 | 9 | 45 | 77 | 117 | 0 | 0 | 0 | 0 | 0 | 0 | 0 | 0 | 0 | 0 | 0 | 0 | 0 | 0 | 0 |
| 6 | 13 | 60 | 94 | 139 | 0 | 0 | 0 | 0 | 0 | 0 | 0 | 0 | 0 | 0 | 0 | 0 | 0 | 0 | 0 |
| 7 | 14 | 61 | 95 | 159 | 0 | 0 | 0 | 0 | 0 | 0 | 0 | 0 | 0 | 0 | 0 | 0 | 0 | 0 | 0 |
| 8 | 15 | 62 | 118 | 0 | 0 | 0 | 0 | 0 | 0 | 0 | 0 | 0 | 0 | 0 | 0 | 0 | 0 | 0 | 0 |
| 9 | 22 | 63 | 140 | 0 | 0 | 0 | 0 | 0 | 0 | 0 | 0 | 0 | 0 | 0 | 0 | 0 | 0 | 0 | 0 |
| 10 | 23 | 78 | 0 | 0 | 0 | 0 | 0 | 0 | 0 | 0 | 0 | 0 | 0 | 0 | 0 | 0 | 0 | 0 | 0 |
| 11 | 24 | 96 | 0 | 0 | 0 | 0 | 0 | 0 | 0 | 0 | 0 | 0 | 0 | 0 | 0 | 0 | 0 | 0 | 0 |
| 12 | 35 | 119 | 0 | 0 | 0 | 0 | 0 | 0 | 0 | 0 | 0 | 0 | 0 | 0 | 0 | 0 | 0 | 0 | 0 |
| 13 | 36 | 141 | 0 | 0 | 0 | 0 | 0 | 0 | 0 | 0 | 0 | 0 | 0 | 0 | 0 | 0 | 0 | 0 | 0 |
| 14 | 37 | 142 | 0 | 0 | 0 | 0 | 0 | 0 | 0 | 0 | 0 | 0 | 0 | 0 | 0 | 0 | 0 | 0 | 0 |
| 15 | 46 | 143 | 0 | 0 | 0 | 0 | 0 | 0 | 0 | 0 | 0 | 0 | 0 | 0 | 0 | 0 | 0 | 0 | 0 |
| 16 | 47 | 144 | 0 | 0 | 0 | 0 | 0 | 0 | 0 | 0 | 0 | 0 | 0 | 0 | 0 | 0 | 0 | 0 | 0 |
| 17 | 48 | 160 | 0 | 0 | 0 | 0 | 0 | 0 | 0 | 0 | 0 | 0 | 0 | 0 | 0 | 0 | 0 | 0 | 0 |
| 18 | 64 | 0 | 0 | 0 | 0 | 0 | 0 | 0 | 0 | 0 | 0 | 0 | 0 | 0 | 0 | 0 | 0 | 0 | 0 |
| 19 | 65 | 0 | 0 | 0 | 0 | 0 | 0 | 0 | 0 | 0 | 0 | 0 | 0 | 0 | 0 | 0 | 0 | 0 | 0 |
| 20 | 66 | 0 | 0 | 0 | 0 | 0 | 0 | 0 | 0 | 0 | 0 | 0 | 0 | 0 | 0 | 0 | 0 | 0 | 0 |
| 21 | 79 | 0 | 0 | 0 | 0 | 0 | 0 | 0 | 0 | 0 | 0 | 0 | 0 | 0 | 0 | 0 | 0 | 0 | 0 |
| 22 | 80 | 0 | 0 | 0 | 0 | 0 | 0 | 0 | 0 | 0 | 0 | 0 | 0 | 0 | 0 | 0 | 0 | 0 | 0 |
| 23 | 81 | 0 | 0 | 0 | 0 | 0 | 0 | 0 | 0 | 0 | 0 | 0 | 0 | 0 | 0 | 0 | 0 | 0 | 0 |
| 24 | 82 | 0 | 0 | 0 | 0 | 0 | 0 | 0 | 0 | 0 | 0 | 0 | 0 | 0 | 0 | 0 | 0 | 0 | 0 |
| 25 | 83 | 0 | 0 | 0 | 0 | 0 | 0 | 0 | 0 | 0 | 0 | 0 | 0 | 0 | 0 | 0 | 0 | 0 | 0 |
| 26 | 84 | 0 | 0 | 0 | 0 | 0 | 0 | 0 | 0 | 0 | 0 | 0 | 0 | 0 | 0 | 0 | 0 | 0 | 0 |
| 27 | 97 | 0 | 0 | 0 | 0 | 0 | 0 | 0 | 0 | 0 | 0 | 0 | 0 | 0 | 0 | 0 | 0 | 0 | 0 |
| 28 | 98 | 0 | 0 | 0 | 0 | 0 | 0 | 0 | 0 | 0 | 0 | 0 | 0 | 0 | 0 | 0 | 0 | 0 | 0 |
| 29 | 99 | 0 | 0 | 0 | 0 | 0 | 0 | 0 | 0 | 0 | 0 | 0 | 0 | 0 | 0 | 0 | 0 | 0 | 0 |
| 30 | 120 | 0 | 0 | 0 | 0 | 0 | 0 | 0 | 0 | 0 | 0 | 0 | 0 | 0 | 0 | 0 | 0 | 0 | 0 |
| 31 | 121 | 0 | 0 | 0 | 0 | 0 | 0 | 0 | 0 | 0 | 0 | 0 | 0 | 0 | 0 | 0 | 0 | 0 | 0 |
| 32 | 122 | 0 | 0 | 0 | 0 | 0 | 0 | 0 | 0 | 0 | 0 | 0 | 0 | 0 | 0 | 0 | 0 | 0 | 0 |
| 33 | 123 | 0 | 0 | 0 | 0 | 0 | 0 | 0 | 0 | 0 | 0 | 0 | 0 | 0 | 0 | 0 | 0 | 0 | 0 |
| 34 | 145 | 0 | 0 | 0 | 0 | 0 | 0 | 0 | 0 | 0 | 0 | 0 | 0 | 0 | 0 | 0 | 0 | 0 | 0 |
| 35 | 146 | 0 | 0 | 0 | 0 | 0 | 0 | 0 | 0 | 0 | 0 | 0 | 0 | 0 | 0 | 0 | 0 | 0 | 0 |
| 36 | 147 | 0 | 0 | 0 | 0 | 0 | 0 | 0 | 0 | 0 | 0 | 0 | 0 | 0 | 0 | 0 | 0 | 0 | 0 |
| 37 | 161 | 0 | 0 | 0 | 0 | 0 | 0 | 0 | 0 | 0 | 0 | 0 | 0 | 0 | 0 | 0 | 0 | 0 | 0 |
| 38 | 162 | 0 | 0 | 0 | 0 | 0 | 0 | 0 | 0 | 0 | 0 | 0 | 0 | 0 | 0 | 0 | 0 | 0 | 0 |

FIG. 23

| RUN | LEVEL | | | | |
|---|---|---|---|---|---|
| | 1 | 2 | 3 | 4 | 5 |
| 0 | 5 | 38 | 85 | 124 | 148 |
| 1 | 10 | 49 | 100 | 149 | 163 |
| 2 | 11 | 86 | 164 | 0 | 0 |
| 3 | 16 | 101 | 0 | 0 | 0 |
| 4 | 17 | 102 | 0 | 0 | 0 |
| 5 | 18 | 125 | 0 | 0 | 0 |
| 6 | 19 | 126 | 0 | 0 | 0 |
| 7 | 25 | 127 | 0 | 0 | 0 |
| 8 | 26 | 128 | 0 | 0 | 0 |
| 9 | 27 | 129 | 0 | 0 | 0 |
| 10 | 28 | 150 | 0 | 0 | 0 |
| 11 | 29 | 151 | 0 | 0 | 0 |
| 12 | 39 | 152 | 0 | 0 | 0 |
| 13 | 40 | 165 | 0 | 0 | 0 |
| 14 | 41 | 0 | 0 | 0 | 0 |
| 15 | 50 | 0 | 0 | 0 | 0 |
| 16 | 51 | 0 | 0 | 0 | 0 |
| 17 | 52 | 0 | 0 | 0 | 0 |
| 18 | 53 | 0 | 0 | 0 | 0 |
| 19 | 54 | 0 | 0 | 0 | 0 |
| 20 | 55 | 0 | 0 | 0 | 0 |
| 21 | 67 | 0 | 0 | 0 | 0 |
| 22 | 68 | 0 | 0 | 0 | 0 |
| 23 | 69 | 0 | 0 | 0 | 0 |
| 24 | 70 | 0 | 0 | 0 | 0 |
| 25 | 71 | 0 | 0 | 0 | 0 |
| 26 | 87 | 0 | 0 | 0 | 0 |
| 27 | 88 | 0 | 0 | 0 | 0 |
| 28 | 89 | 0 | 0 | 0 | 0 |
| 29 | 103 | 0 | 0 | 0 | 0 |
| 30 | 104 | 0 | 0 | 0 | 0 |
| 31 | 105 | 0 | 0 | 0 | 0 |
| 32 | 106 | 0 | 0 | 0 | 0 |
| 33 | 107 | 0 | 0 | 0 | 0 |
| 34 | 108 | 0 | 0 | 0 | 0 |
| 35 | 109 | 0 | 0 | 0 | 0 |
| 36 | 130 | 0 | 0 | 0 | 0 |
| 37 | 131 | 0 | 0 | 0 | 0 |
| 38 | 153 | 0 | 0 | 0 | 0 |
| 39 | 154 | 0 | 0 | 0 | 0 |
| 40 | 155 | 0 | 0 | 0 | 0 |
| 41 | 166 | 0 | 0 | 0 | 0 |
| 42 | 167 | 0 | 0 | 0 | 0 |
| 43 | 168 | 0 | 0 | 0 | 0 |
| 44 | 169 | 0 | 0 | 0 | 0 |

FIG. 24

| INDEX | VLC-CODE |
|---|---|
| 0 | 0000s |
| 1 | 110s |
| 2 | 111s |
| 3 | 0001s |
| 4 | 1010s |
| 5 | 1011s |
| 6 | 00100s |
| 7 | 00101s |
| 8 | 01000s |
| 9 | 01001s |
| 10 | 10010s |
| 11 | 10011s |
| 12 | 001100s |
| 13 | 001101s |
| 14 | 010100s |
| 15 | 010101s |
| 16 | 011000s |
| 17 | 011001s |
| 18 | 100010s |
| 19 | 100011s |
| 20 | 0011100s |
| 21 | 0011101s |
| 22 | 0101100s |
| 23 | 0101101s |
| 24 | 0110100s |
| 25 | 0110101s |
| 26 | 0111000s |
| 27 | 0111001s |
| 28 | 1000010s |
| 29 | 1000011s |
| 30 | 00111100s |
| 31 | 00111101s |
| 32 | 01011100s |
| 33 | 01011101s |
| 34 | 01101100s |
| 35 | 01101101s |
| 36 | 01110100s |
| 37 | 01110101s |
| 38 | 01111000s |
| 39 | 01111001s |
| 40 | 10000010s |
| 41 | 10000011s |
| 42 | 001111100s |
| 43 | 001111101s |
| 44 | 010111100s |
| 45 | 010111101s |
| 46 | 011011100s |
| 47 | 011011101s |
| 48 | 011101100s |
| 49 | 011101101s |
| 50 | 011110100s |
| 51 | 011110101s |
| 52 | 011111000s |
| 53 | 011111001s |
| 54 | 100000010s |
| 55 | 100000011s |
| 56 | 0011111100s |
| 57 | 0011111101s |
| 58 | 0101111100s |
| 59 | 0101111101s |
| 60 | 0110111100s |
| 61 | 0110111101s |
| 62 | 0111011100s |
| 63 | 0111011101s |
| 64 | 0111101100s |
| 65 | 0111101101s |
| 66 | 0111110100s |
| 67 | 0111110101s |
| 68 | 0111111000s |
| 69 | 0111111001s |
| 70 | 1000000010s |
| 71 | 1000000011s |
| 72 | 00111111100s |
| 73 | 00111111101s |
| 74 | 01011111100s |
| 75 | 01011111101s |
| 76 | 01101111100s |
| 77 | 01101111101s |
| 78 | 01110111100s |
| 79 | 01110111101s |
| 80 | 01111011100s |
| 81 | 01111011101s |
| 82 | 01111101100s |
| 83 | 01111011010s |
| 84 | 01111110100s |
| 85 | 01111110101s |
| 86 | 01111111000s |
| 87 | 01111111001s |
| 88 | 10000000010s |

FIG. 25

| | |
|---|---|
| 89 | 10000000011s |
| 90 | 001111111100s |
| 91 | 001111111101s |
| 92 | 010111111100s |
| 93 | 010111111101s |
| 94 | 011011111100s |
| 95 | 011011111101s |
| 96 | 011101111100s |
| 97 | 011101111101s |
| 98 | 011110111100s |
| 99 | 011110111101s |
| 100 | 011111011100s |
| 101 | 011111011101s |
| 102 | 011111101100s |
| 103 | 011111101101s |
| 104 | 011111110100s |
| 105 | 011111110101s |
| 106 | 011111111000s |
| 107 | 011111111001s |
| 108 | 100000000010s |
| 109 | 100000000011s |
| 110 | 0011111111100s |
| 111 | 0011111111101s |
| 112 | 0101111111100s |
| 113 | 0101111111101s |
| 114 | 0110111111100s |
| 115 | 0110111111101s |
| 116 | 0111011111100s |
| 117 | 0111011111101s |
| 118 | 0111101111100s |
| 119 | 0111101111101s |
| 120 | 0111110111100s |
| 121 | 0111110111101s |
| 122 | 0111111011100s |
| 123 | 0111111011101s |
| 124 | 0111111101100s |
| 125 | 0111111101101s |
| 126 | 0111111110100s |
| 127 | 0111111110101s |
| 128 | 0111111111000s |
| 129 | 0111111111001s |
| 130 | 1000000000010s |
| 131 | 1000000000011s |
| 132 | 00111111111100s |
| 133 | 00111111111101s |
| 134 | 01011111111100s |
| 135 | 01011111111101s |
| 136 | 01101111111100s |
| 137 | 01101111111101s |
| 138 | 01110111111100s |
| 139 | 01110111111101s |
| 140 | 01111011111100s |
| 141 | 01111011111101s |
| 142 | 01111101111100s |
| 143 | 01111101111101s |
| 144 | 01111110111100s |
| 145 | 01111110111101s |
| 146 | 01111111011100s |
| 147 | 01111111011101s |
| 148 | 01111111101100s |
| 149 | 01111111101101s |
| 150 | 01111111110100s |
| 151 | 01111111110101s |
| 152 | 01111111111000s |
| 153 | 01111111111001s |
| 154 | 10000000000010s |
| 155 | 10000000000011s |
| 156 | 001111111111100s |
| 157 | 001111111111101s |
| 158 | 010111111111100s |
| 159 | 010111111111101s |
| 160 | 011011111111100s |
| 161 | 011011111111101s |
| 162 | 011101111111100s |
| 163 | 011101111111101s |
| 164 | 011110111111100s |
| 165 | 011110111111101s |
| 166 | 011111011111100s |
| 167 | 011111011111101s |
| 168 | 011111101111100s |
| 169 | 011111101111101s |

FIG. 26

| RUN | CODE |
|---|---|
| 0 | 000000 |
| 1 | 000001 |
| : | : |
| 63 | 111111 |

| LEVEL | CODE |
|---|---|
| 0 | FORBIDDEN |
| 1 | 0000001 |
| 2 | 0000100 |
| : | : |
| 127 | 1111111 |

| INDEX | INTRA LAST | INTRA RUN | INTRA LEVEL | INTER LAST | INTER RUN | INTER LEVEL |
|---|---|---|---|---|---|---|
| 1 | 0 | 0 | 1 | 0 | 0 | 1 |
| 2 | 0 | 0 | 2 | 0 | 1 | 1 |
| 3 | 0 | 0 | 3 | 0 | 0 | 2 |
| 4 | 0 | 1 | 1 | 0 | 2 | 1 |
| 5 | 1 | 0 | 1 | 1 | 0 | 1 |
| 6 | 0 | 0 | 4 | 0 | 0 | 3 |
| 7 | 0 | 1 | 2 | 0 | 3 | 1 |
| 8 | 0 | 2 | 1 | 0 | 4 | 1 |
| 9 | 0 | 3 | 1 | 0 | 5 | 1 |
| 10 | 1 | 1 | 1 | 1 | 1 | 1 |
| 11 | 1 | 2 | 1 | 1 | 2 | 1 |
| 12 | 0 | 0 | 5 | 0 | 1 | 2 |
| 13 | 0 | 0 | 6 | 0 | 6 | 1 |
| 14 | 0 | 4 | 1 | 0 | 7 | 1 |
| 15 | 0 | 5 | 1 | 0 | 8 | 1 |
| 16 | 1 | 3 | 1 | 1 | 3 | 1 |
| 17 | 1 | 4 | 1 | 1 | 4 | 1 |
| 18 | 1 | 5 | 1 | 1 | 5 | 1 |
| 19 | 1 | 6 | 1 | 1 | 6 | 1 |
| 20 | 0 | 0 | 7 | 0 | 0 | 4 |
| 21 | 0 | 1 | 3 | 0 | 2 | 2 |
| 22 | 0 | 2 | 2 | 0 | 9 | 1 |
| 23 | 0 | 6 | 1 | 0 | 10 | 1 |
| 24 | 0 | 7 | 1 | 0 | 11 | 1 |
| 25 | 1 | 7 | 1 | 1 | 7 | 1 |
| 26 | 1 | 8 | 1 | 1 | 8 | 1 |
| 27 | 1 | 9 | 1 | 1 | 9 | 1 |
| 28 | 1 | 10 | 1 | 1 | 10 | 1 |
| 29 | 1 | 11 | 1 | 1 | 11 | 1 |
| 30 | 0 | 0 | 8 | 0 | 0 | 5 |
| 31 | 0 | 0 | 9 | 0 | 0 | 6 |
| 32 | 0 | 1 | 4 | 0 | 1 | 3 |
| 33 | 0 | 1 | 5 | 0 | 3 | 2 |
| 34 | 0 | 3 | 2 | 0 | 4 | 2 |
| 35 | 0 | 4 | 2 | 0 | 12 | 1 |
| 36 | 0 | 8 | 1 | 0 | 13 | 1 |
| 37 | 0 | 9 | 1 | 0 | 14 | 1 |
| 38 | 1 | 0 | 2 | 1 | 0 | 2 |
| 39 | 1 | 12 | 1 | 1 | 12 | 1 |
| 40 | 1 | 13 | 1 | 1 | 13 | 1 |
| 41 | 1 | 14 | 1 | 1 | 14 | 1 |
| 42 | 0 | 0 | 10 | 0 | 0 | 7 |
| 43 | 0 | 0 | 11 | 0 | 1 | 4 |
| 44 | 0 | 1 | 6 | 0 | 2 | 3 |
| 45 | 0 | 2 | 3 | 0 | 5 | 2 |
| 46 | 0 | 3 | 3 | 0 | 15 | 1 |
| 47 | 0 | 5 | 2 | 0 | 16 | 1 |
| 48 | 0 | 10 | 1 | 0 | 17 | 1 |
| 49 | 1 | 1 | 2 | 1 | 1 | 2 |
| 50 | 1 | 15 | 1 | 1 | 15 | 1 |
| 51 | 1 | 16 | 1 | 1 | 16 | 1 |
| 52 | 1 | 17 | 1 | 1 | 17 | 1 |
| 53 | 1 | 18 | 1 | 1 | 18 | 1 |
| 54 | 1 | 19 | 1 | 1 | 19 | 1 |
| 55 | 1 | 20 | 1 | 1 | 20 | 1 |
| 56 | 0 | 0 | 12 | 0 | 0 | 8 |
| 57 | 0 | 0 | 13 | 0 | 0 | 9 |
| 58 | 0 | 0 | 14 | 0 | 1 | 5 |
| 59 | 0 | 1 | 7 | 0 | 3 | 3 |
| 60 | 0 | 2 | 4 | 0 | 6 | 2 |
| 61 | 0 | 4 | 3 | 0 | 7 | 2 |
| 62 | 0 | 6 | 2 | 0 | 8 | 2 |
| 63 | 0 | 7 | 2 | 0 | 9 | 2 |
| 64 | 0 | 8 | 2 | 0 | 18 | 1 |
| 65 | 0 | 11 | 1 | 0 | 19 | 1 |
| 66 | 0 | 12 | 1 | 0 | 20 | 1 |
| 67 | 1 | 21 | 1 | 1 | 21 | 1 |
| 68 | 1 | 22 | 1 | 1 | 22 | 1 |
| 69 | 1 | 23 | 1 | 1 | 23 | 1 |
| 70 | 1 | 24 | 1 | 1 | 24 | 1 |
| 71 | 1 | 25 | 1 | 1 | 25 | 1 |
| 72 | 0 | 0 | 15 | 0 | 0 | 10 |
| 73 | 0 | 0 | 16 | 0 | 0 | 11 |
| 74 | 0 | 0 | 17 | 0 | 1 | 6 |
| 75 | 0 | 1 | 8 | 0 | 2 | 4 |
| 76 | 0 | 1 | 9 | 0 | 4 | 3 |
| 77 | 0 | 2 | 5 | 0 | 5 | 3 |
| 78 | 0 | 2 | 6 | 0 | 10 | 2 |
| 79 | 0 | 3 | 4 | 0 | 21 | 1 |
| 80 | 0 | 5 | 3 | 0 | 22 | 1 |
| 81 | 0 | 6 | 3 | 0 | 23 | 1 |
| 82 | 0 | 7 | 3 | 0 | 24 | 1 |
| 83 | 0 | 9 | 2 | 0 | 25 | 1 |
| 84 | 0 | 13 | 1 | 0 | 26 | 1 |
| 85 | 1 | 0 | 3 | 1 | 0 | 3 |
| 86 | 1 | 2 | 2 | 1 | 2 | 2 |
| 87 | 1 | 26 | 1 | 1 | 26 | 1 |
| 88 | 1 | 27 | 1 | 1 | 27 | 1 |

FIG. 30

| | | | | | | |
|---|---|---|---|---|---|---|
| 89 | 1 | 28 | 1 | 1 | 28 | 1 |
| 90 | 0 | 0 | 18 | 0 | 0 | 12 |
| 91 | 0 | 0 | 19 | 0 | 1 | 7 |
| 92 | 0 | 0 | 22 | 0 | 2 | 5 |
| 93 | 0 | 1 | 10 | 0 | 3 | 4 |
| 94 | 0 | 3 | 5 | 0 | 6 | 3 |
| 95 | 0 | 4 | 4 | 0 | 7 | 3 |
| 96 | 0 | 4 | 5 | 0 | 11 | 2 |
| 97 | 0 | 5 | 4 | 0 | 27 | 1 |
| 98 | 0 | 6 | 4 | 0 | 28 | 1 |
| 99 | 0 | 10 | 2 | 0 | 29 | 1 |
| 100 | 1 | 1 | 3 | 1 | 1 | 3 |
| 101 | 1 | 3 | 2 | 1 | 3 | 2 |
| 102 | 1 | 4 | 2 | 1 | 4 | 2 |
| 103 | 1 | 29 | 1 | 1 | 29 | 1 |
| 104 | 1 | 30 | 1 | 1 | 30 | 1 |
| 105 | 1 | 31 | 1 | 1 | 31 | 1 |
| 106 | 1 | 32 | 1 | 1 | 32 | 1 |
| 107 | 1 | 33 | 1 | 1 | 33 | 1 |
| 108 | 1 | 34 | 1 | 1 | 34 | 1 |
| 109 | 1 | 35 | 1 | 1 | 35 | 1 |
| 110 | 0 | 0 | 20 | 0 | 0 | 13 |
| 111 | 0 | 0 | 21 | 0 | 0 | 14 |
| 112 | 0 | 0 | 23 | 0 | 0 | 15 |
| 113 | 0 | 1 | 11 | 0 | 0 | 16 |
| 114 | 0 | 2 | 7 | 0 | 1 | 8 |
| 115 | 0 | 2 | 8 | 0 | 3 | 5 |
| 116 | 0 | 2 | 9 | 0 | 4 | 4 |
| 117 | 0 | 3 | 6 | 0 | 5 | 4 |
| 118 | 0 | 7 | 4 | 0 | 8 | 3 |
| 119 | 0 | 8 | 3 | 0 | 12 | 2 |
| 120 | 0 | 9 | 3 | 0 | 30 | 1 |
| 121 | 0 | 11 | 2 | 0 | 31 | 1 |
| 122 | 0 | 14 | 1 | 0 | 32 | 1 |
| 123 | 0 | 15 | 1 | 0 | 33 | 1 |
| 124 | 1 | 0 | 4 | 1 | 0 | 4 |
| 125 | 1 | 5 | 2 | 1 | 5 | 2 |
| 126 | 1 | 6 | 2 | 1 | 6 | 2 |
| 127 | 1 | 7 | 2 | 1 | 7 | 2 |
| 128 | 1 | 8 | 2 | 1 | 8 | 2 |
| 129 | 1 | 9 | 2 | 1 | 9 | 2 |

| | | | | | | |
|---|---|---|---|---|---|---|
| 130 | 1 | 36 | 1 | 1 | 36 | 1 |
| 131 | 1 | 37 | 1 | 1 | 37 | 1 |
| 132 | 0 | 0 | 24 | 1 | 0 | 17 |
| 133 | 0 | 0 | 25 | 1 | 0 | 18 |
| 134 | 0 | 0 | 26 | 0 | 1 | 9 |
| 135 | 0 | 1 | 12 | 0 | 1 | 10 |
| 136 | 0 | 1 | 13 | 0 | 2 | 6 |
| 137 | 0 | 2 | 10 | 0 | 2 | 7 |
| 138 | 0 | 2 | 11 | 0 | 3 | 6 |
| 139 | 0 | 3 | 7 | 0 | 6 | 4 |
| 140 | 0 | 3 | 8 | 0 | 9 | 3 |
| 141 | 0 | 4 | 6 | 0 | 13 | 2 |
| 142 | 0 | 5 | 5 | 0 | 14 | 2 |
| 143 | 0 | 5 | 6 | 0 | 15 | 2 |
| 144 | 0 | 8 | 4 | 0 | 16 | 2 |
| 145 | 0 | 16 | 1 | 0 | 34 | 1 |
| 146 | 0 | 17 | 1 | 0 | 35 | 1 |
| 147 | 0 | 18 | 1 | 0 | 36 | 1 |
| 148 | 1 | 0 | 5 | 1 | 0 | 5 |
| 149 | 1 | 1 | 4 | 1 | 1 | 4 |
| 150 | 1 | 10 | 2 | 1 | 10 | 2 |
| 151 | 1 | 11 | 2 | 1 | 11 | 2 |
| 152 | 1 | 12 | 2 | 1 | 12 | 2 |
| 153 | 1 | 38 | 1 | 1 | 38 | 2 |
| 154 | 1 | 39 | 1 | 1 | 39 | 1 |
| 155 | 1 | 40 | 1 | 1 | 40 | 1 |
| 156 | 0 | 0 | 27 | 0 | 0 | 19 |
| 157 | 0 | 3 | 9 | 0 | 3 | 7 |
| 158 | 0 | 6 | 5 | 0 | 4 | 5 |
| 159 | 0 | 7 | 5 | 0 | 7 | 4 |
| 160 | 0 | 9 | 4 | 0 | 17 | 2 |
| 161 | 0 | 12 | 2 | 0 | 37 | 1 |
| 162 | 0 | 19 | 1 | 0 | 38 | 1 |
| 163 | 1 | 1 | 5 | 1 | 1 | 5 |
| 164 | 1 | 2 | 3 | 1 | 2 | 3 |
| 165 | 1 | 13 | 2 | 1 | 13 | 2 |
| 166 | 1 | 41 | 1 | 1 | 41 | 1 |
| 167 | 1 | 42 | 1 | 1 | 42 | 1 |
| 168 | 1 | 43 | 1 | 1 | 43 | 1 |
| 169 | 1 | 44 | 1 | 1 | 44 | 1 |

FIG. 31

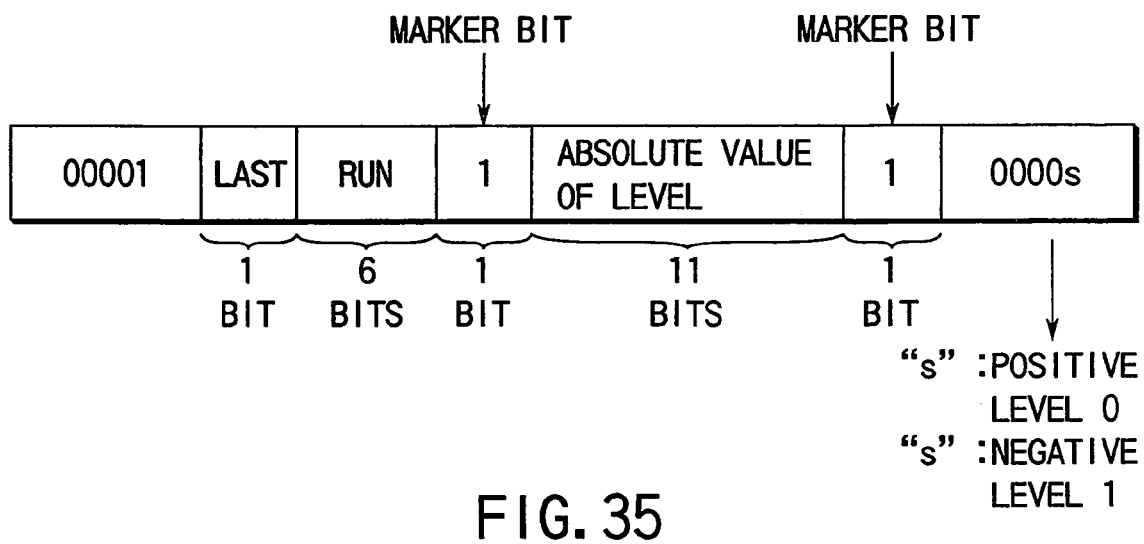
FIG. 34
FIG. 35
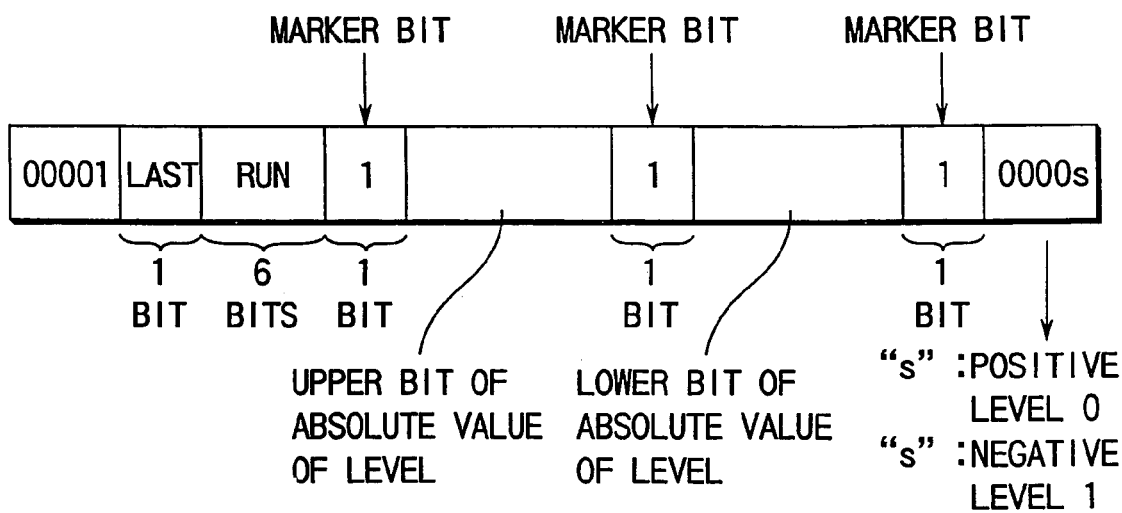
FIG. 36

| LEVEL | CODE |
|---|---|
| −2048 | FORBIDDEN |
| −2047 | 10000000001 |
| ⋮ | ⋮ |
| −2 | 11111111110 |
| −1 | 11111111111 |
| 0 | FORBIDDEN |
| 1 | 00000000001 |
| 2 | 00000000010 |
| ⋮ | ⋮ |
| 2047 | 01111111111 |
FIG. 41
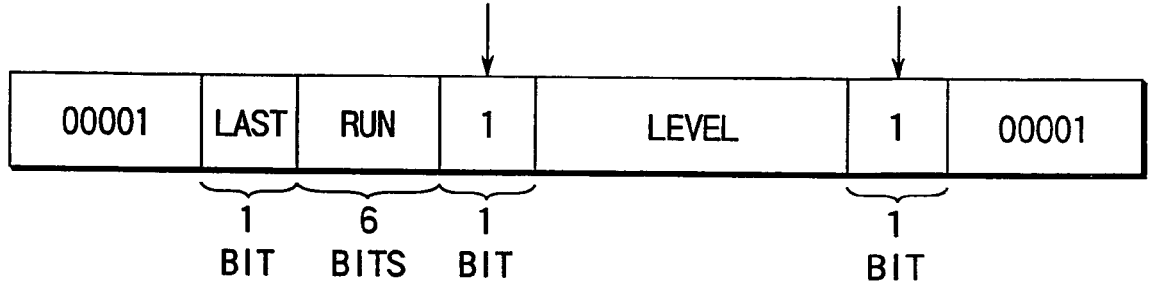
FIG. 42
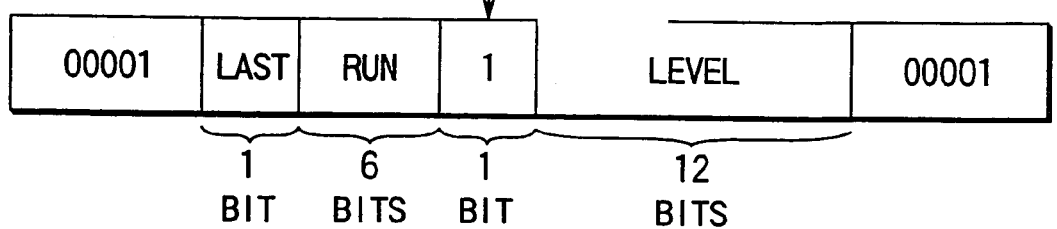
FIG. 43

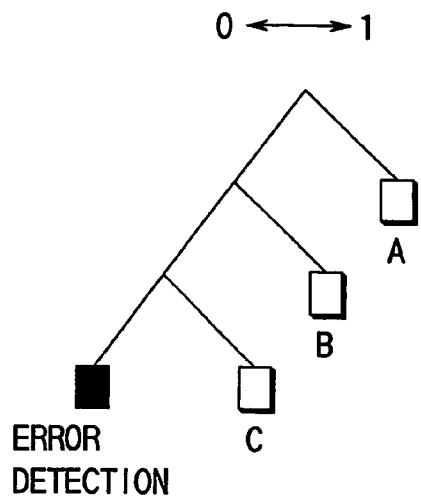
FIG. 53
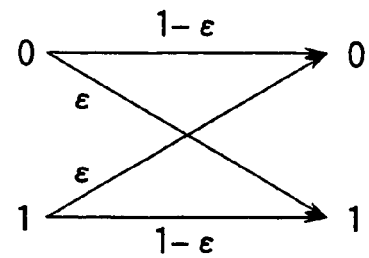
FIG. 54
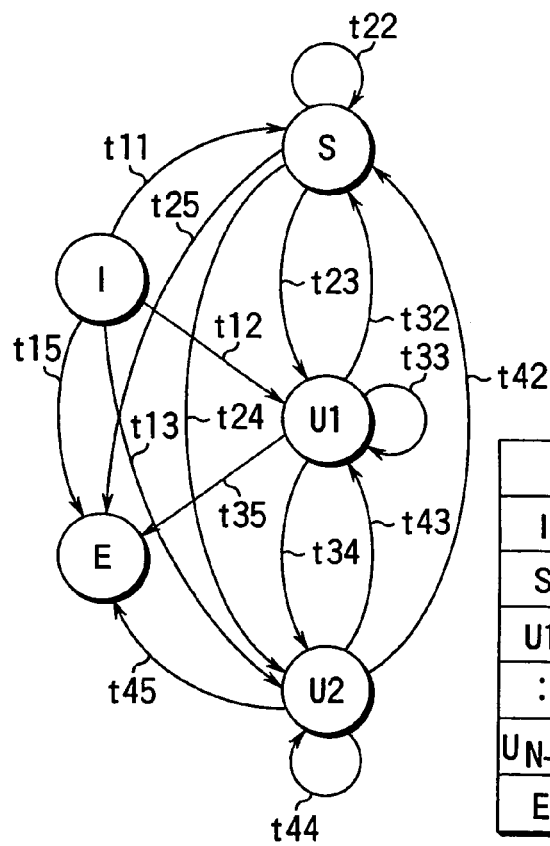
FIG. 55
| | I | S | U1 | ... | U$_{N-2}$ | E |
|---|---|---|---|---|---|---|
| I | t11 | t12 | t13 | ... | t1N | t1N+1 |
| S | t21 | t22 | t23 | ... | t2N | t2N+2 |
| U1 | t31 | t32 | t33 | ... | t3N | t3N+3 |
| : | : | : | : | : | : | : |
| U$_{N-2}$ | tN1 | tN2 | tN3 | ... | tNN | tNN+1 |
| E | 0 | | | | | 1 |
FIG. 56

VARIABLE-LENGTH DECODING APPARATUS AND DECODING METHOD

The present application is a continuation of U.S. application Ser. No. 09/319,160, filed Jun. 2, 1999 now U.S. Pat. No. 6,829,299, the entire contents of which are incorporated herein by reference.

TECHNICAL FIELD

The present invention relates to a variable-length decoding apparatus for decoding encoded data formed from a variable length code used for compression encoding of, e.g., a video signal, and a decoding method.

BACKGROUND ART

A variable length code is a code system for generating a code having a short average code length by respectively assigning a code having a short code length to a frequently occurring symbol and a code having a long code length to a rarely occurring symbol on the basis of the frequencies of occurrence of symbols. By using variable length codes, therefore, the amount of data can be greatly compressed as compared with the data before encoding. For this reason, variable length codes are widely used as codes for information compression.

In a video encoding system as well, variable length codes are used for a general standard scheme such as MPEG1, MPEG2, H.261, or H.263.

A general problem associated with variable length codes is that when an error is mixed in encoded data due to a channel error or the like, the encoded data mixed with the error cannot be properly decoded by a decoding apparatus owing to the influences of the error. In order to prevent this problem, when an error can occur in a transmission channel, a method of preventing the propagation of an error by inserting sync codes in data at given intervals is generally used. A bit pattern that does not appear by any combination of variable length codes is assigned to a sync code. According to this method, even if an error occurs in encoded data and the data cannot be decoded, the propagation of the error can be prevented by resuming decoding upon detection of the next sync code, thereby continuing the decoding.

Even with the use of sync codes, however, decoding cannot be performed for encoded data between the position where an error has occurred and decoding cannot be performed and the position where the next sync code is detected.

A variable-length decoding/encoding apparatus which can reduce the portion, which cannot be decoded, by using variable length codes that can be decoded bidirectionally, i.e, forward and backward and performing backward decoding upon detection of a next sync code, has been proposed in the patent application (Japanese Patent Application Nos. 7-260383 and 9-81614) filed by the present applicant.

Even with such a variable-length encoding/decoding apparatus, an error in encoded data can be detected only when, for example, a bit pattern that is not used as a code word of a variable-length code appears. For this reason, in some case, an error is detected at a succeeding position considerably away from the position where the error is actually mixed in the data. This is because a bit pattern that is not used as a code word of a variable length code does not always appear at the position where the error is actually mixed in the data, and decode processing is continuously performed as long as a corresponding portion is present in the bit patterns used as the code words of the variable length code. As a result, an incorrect word code is erroneously decoded as a correct code word.

Various methods have been examined as counter-measures against channel errors in a video encoding/decoding apparatus. For example, several methods as countermeasures against channel errors are disclosed in a literature (Hideo Kuroda, "Image Coding Technique", Shokodo, 1996). Of these methods, error concealment is introduced as a technique used on the decoder side. Error concealment is a technique of minimizing the influences of an error on a frame by using motion vectors on the peripheral portion of the frame upon occurrence of a loss of encoded data.

If, however, an incorrect code word is decoded as a correct code word, a technique of minimizing the influences of an error, such as the above error concealment, cannot be used. As a result, the frame is affected by the error.

The influences of an error in the INTRA mode (intraframe encoding mode) are larger than those in the INTER mode (interframe encoding mode), and a block in unnatural color appears on a frame.

As described above, in the conventional variable-length decoding apparatus, when a variable length code is decoded, an incorrect code word may be decoded as a correct word. If, therefore, this apparatus is applied to decoding of a variable length encoded video signal, a frame is affected by an error.

It is an object of the present invention to provide a variable-length decoding apparatus and a decoding method which can decrease the possibility that an incorrect code word is erroneously decoded as a correct word, and can realize sufficient resistance to errors.

DISCLOSURE OF INVENTION

According to the present invention, there is provided a variable-length decoding apparatus comprising an input unit for receiving encoded data formed from a variable length code made up of code words that can be decoded in both a forward direction and a backward direction, a forward decoder for decoding the encoded data in the forward direction, a backward decoder for decoding the encoded data in the backward direction, and a decode value determination unit for outputting a final decode result from decode results respectively obtained by the forward decoder and the backward decoder, wherein each of the forward and backward decoders includes a detection unit for detecting an error in the encoded data, and the decode value determination unit determines a decode value by using error detection positions in the encoded data in units of bits and syntax, which are detected by the forward decoder and indicate an error position in the encoded data, and error detection positions in the encoded data in units of bits and syntax, which are detected by the backward decoder and indicate an error position in the encoded data.

In this variable-length decoding apparatus, when errors are detected by the forward and backward decoders, the decode value determination unit is notified of the error detection positions as two types of position information, i.e., positions in units of bits and positions in units of syntax. The true error position can therefore be checked doubly on the basis of the error detection positions in units of bits and the error detection positions in units of syntax. This allows the use of only decode results corresponding to correct code words with a considerably high probability, and hence can decreases the possibility of erroneously decoding an incorrect code word as a correct code word.

In addition, the decode value determination unit preferably uses a decode value determination method of, (a) using a forward decode result as a decode value for code words up to a position a predetermined amount before the error detection position in units of bit or syntax, which is obtained by the forward decoder, and a backward decode result as a decode value for code words from a position a predetermined amount after the error detection position in units of bits or syntax, which is obtained by the backward decoder, and discarding the remaining encoded data, when the error detection positions obtained by the forward and backward decoders do not cross each other in units of both bits and syntax, (b) using a forward decode result as a decode value for code words up to a position immediately before the error detection position in units of syntax, which is obtained by the backward decoder, and a backward decode result as a decode value for code words from a position immediately after the error detection position in units of syntax, which is obtained by the forward decoder, and discarding encoded data of a portion on which the error detection positions in units of syntax cross each other, when the error detection positions obtained by the forward and backward decoders do not cross each other in units of bits but cross each other in units of syntax, (c) using a forward decode result as a decode value for code words up to a position immediately before the error detection position in units of bits, which is obtained by the backward decoder, and a backward decode result as a decode value for code words from a position immediately after the error detection position in units of bits, which is obtained by the forward decoder, and discarding encoded data of a portion on which the error detection positions in units of bits cross each other, when the error detection positions obtained by the forward and backward decoders cross each other in units of bits but do not cross each other in units of syntax, and (d) selecting a position where a crossing portion becomes largest as an error detection position, using a forward decode result as a decode value for code words up to a position immediately before the error detection position obtained by the backward decoder and a backward decode result as a decode value for code words from a position immediately after the error detection position obtained by the forward decoder, and discarding encoded data of a portion on which the error detection positions cross each other, when the error detection positions obtained by the forward and backward decoders cross each other in units of both bits and syntax.

Considering that an error detection position in a variable length code succeeds considerably away from the actual error position, in the case (a) in which the error detection positions do not cross each other in both the forward and backward directions, code words up to a position set by retracting the encoded data by a predetermined amount from each error detection position are used. In the cases (b) to (d) in which the error detection positions in the forward or backward direction cross each other somehow, a portion having a large crossing range is discarded to effectively prevent an incorrect portion from being erroneously determined as a correct portion.

Furthermore, according to the present invention, there is provided a video decoding apparatus comprising an input unit for receiving encoded data of a video signal containing a variable length code generated by encoding transform coefficients obtained by orthogonal transformation of the video signal by using code words that can be decoded in both a forward direction and a backward direction, a sync section detection unit for detecting a sync section of the encoded data, a forward decoder for decoding encoded data in the forward direction in a predetermined sync section detected by the sync section detection unit, a backward decoder for decoding encoded data in the backward direction in a predetermined sync section detected by the sync section detection unit, and a decode value determination unit for outputting a final decode result from decode results obtained by the forward and backward decoders, wherein each of the forward and backward decoders includes an error detection unit for detecting an error in the encoded data, and the decode value determination unit determines a decode value by using error detection positions in the decoded data in units of bits and syntax which indicate an error position in the encoded data which is detected by the forward decoder, and error detection positions in the decoded data in units of bits and syntax which indicate an error position in the encoded data which is detected by the backward decoder.

In general, owing to the characteristics of a video encoding scheme, to determine an incorrect portion as a correct portion influences the display frame more than to discard a correct portion. Therefore, by performing a double check based on error detection positions in units of bits and syntax, the influences exerted in the display frame when an incorrect portion is determined as a correction can be greatly reduced.

The decode value determination unit in this video decoding apparatus preferably uses a decode value determination method of, (a) using a forward decode result as a decode value for macroblocks up to a position a predetermined amount before the error detection position in units of bit or syntax, which is obtained by the forward decoder, and a backward decode result as a decode value for macroblocks from a position a predetermined amount after the error detection position in units of bits or syntax, which is obtained by the backward decoder, and discarding encoded data composed of transform coefficients of the remaining macroblocks, when the error detection positions obtained by the forward and backward decoders do not cross each other as both positions in units of bits and syntax, (b) using a forward decode result as a decode value for macroblocks up to a position immediately before the error detection position in units of syntax, which is obtained by the backward decoder, and a backward decode result as a decode value for macroblocks from a position immediately after the error detection position in units of syntax, which is obtained by the forward decoder, and discarding encoded data composed of transform coefficients of a macroblock on which the error detection positions in units of syntax cross each other, when the error detection positions obtained by the forward and backward decoders do not cross each other as positions in units of bits but cross each other as positions in units of syntax, (c) using a forward decode result as a decode value for macroblocks up to a position immediately before the error detection position in units of bits, which is obtained by the backward decoder, and a backward decode result as a decode value for macroblocks from a position immediately after the error detection position in units of bits, which is obtained by the forward decoder, and discarding encoded data composed of transform coefficients of a macroblock on which the error detection positions in units of bits cross each other, when the error detection positions obtained by the forward and backward decoders cross each other as positions in units of bits but do not cross each other as positions in units of syntax, and (d) selecting a position where a crossing portion becomes largest as an error detection position, using a forward decode result as a decode value for macroblocks up to a position immediately before the error detection position obtained by the backward decoder and a backward decode result as a decode value for macroblocks from a position immediately after the error detection position obtained by the forward decoder, and discarding encoded data composed of transform coefficients of a macroblock on which the error detection positions cross each other, when the error detection positions obtained by the forward and backward decoders cross each other as both positions in units of bits and syntax.

Considering that an error detection position in a variable length code succeeds considerably away from the actual error position, in the case (a) in which the error detection positions do not cross each other in both the forward and backward directions, macroblocks up to a position set by retracting the encoded data by a predetermined amount from each error detection position are used. In the cases (b) to (d) in which the error detection positions in the forward or backward direction cross each other somehow, a portion having a large crossing range is discarded to prevent the influences of determination of an incorrect portion as a correct portion in the display frame.

When an error is detected in the encoded data in the sync section, the decode value determination unit discards part or all of encoded data composed of macroblock transform coefficients having undergone intraframe encoding within a macroblock in which no error has been detected.

In the intraframe encoding mode, the occurrence of an error greatly influences a frame. More specifically, display of wrong coefficients causes a phenomenon in which a block in unnatural color appears in a frame. If, therefore, at least the occurrence of an error in a sync section is known, the influences of the error on the frame can be reduced by discarding macroblocks in the intraframe encoding mode.

In addition, the decode value determination unit displays a previous frame for a macroblock from which encoded data is discarded or processes the macroblock in a mode without encoding when an intraframe encoding mode is set, and performs motion compensation when an interframe prediction encoding mode is set.

In the intraframe encoding mode, when a DCT coefficient is discarded, since no motion vector is present, a previous frame is displayed, or data is processed in a mode without encoding. In the interframe encoding mode, since a motion vector on the upper layer is present, a considerably natural image can be generated by performing motion compensation using this vector without any DCT coefficient. That is, a DCT coefficient belongs to the lower layer, and a motion vector belongs to the upper layer. If, therefore, an upper motion vector is available, an image can be generated without using any lower DCT coefficient.

Furthermore, according to the present invention, there is provided a variable-length decoding apparatus comprising an input unit for receiving encoded data formed from a variable length code made up of code words including code words that can be decoded in both a forward direction and a backward direction, a forward decoder for decoding the encoded data in the forward direction, a backward decoder for decoding the encoded data in the backward direction, and a decode value determination unit for outputting a final decode result from decode results respectively obtained by the forward decoder and the backward decoder, wherein each of the forward and backward decoders includes a detection unit for detecting an error in the encoded data, and the decode value determination unit estimates a range in which an error is present on the basis of error detection positions detected in the encoded data by the forward and backward decoders, an error rate in a transmission system or storage system, an occurrence probability of each code word, and a bit pattern of each code word in a code word table, thereby determining a final decode value.

In this variable-length decoding apparatus, the probability that an incorrect code word is erroneously decoded as a correct code word can be decreased to a predetermined probability or less by estimating the actual positions of errors from error detection positions in terms of probability in accordance with the error rate in the transmission system or storage system and the performance of code words.

BRIEF DESCRIPTION OF DRAWINGS

FIG. 3 is a view for explaining a second method of forming the code words of a reversible code.

FIG. 4 is a view for explaining a third method of forming the code words of a reversible code.

FIGS. 12A and 12B are views showing a syntax for the encoded data used in the video decoding apparatus according to the second embodiment.

FIG. 22 is a view showing an INDEX table used to search a code word table for an INDEX value with RUN and LEVEL values of a non-LAST coefficient in the INTRA mode in the encoder of the video encoding/decoding system in FIG. 10.

FIG. 23 is a view showing an INDEX table used to search the code word table for an INDEX value with RUN and LEVEL values of a non-LAST coefficient in the INTER mode in the encoder of the video encoding/decoding system in FIG. 10.

FIG. 24 is a view showing an INDEX table used to search the code word table for an INDEX value with RUN and LEVEL values of a LAST coefficient in the encoder of the video encoding/decoding system in FIG. 10.

FIG. 25 is a view showing a part of the code word table used in the video encoding/decoding system in FIG. 10.

FIG. 26 is a view showing the remaining part of the code word table used in the video encoding/decoding system in FIG. 10.

FIG. 30 is a view showing a part of the code word table used in the video encoding/decoding system in FIG. 10.

FIG. 31 is a view showing the remaining part of the code word table used in the video encoding/decoding system in FIG. 10.

FIG. 34 is a view showing another arrangement of the LEVEL fixed-length code word table.

FIG. 35 is a view showing another format of an encoded data sequence having ESCAPE codes added to its two ends.

FIG. 36 is a view showing still another format of an encoded data sequence having ESCAPE codes added to its two ends.

FIG. 41 is a view showing an arrangement of a LEVEL fixed-length code word table using a two's-complement expression.

FIG. 42 is a view showing an arrangement of an encoded data sequence in the use of the LEVEL fixed-length code word table in FIG. 41.

FIG. 43 is a view showing another arrangement of the encoded data sequence in the use of the LEVEL fixed-length code word table in FIG. 41.

FIG. 53 is a view showing a code tree for a code that does not satisfy the Kraft inequality with an equal sign.

FIG. 54 is a view for explaining a two-dimensional symmetrical communication channel.

FIG. 55 is an example of a state transition diagram of code words on the two-dimensional symmetrical communication channel.

FIG. 56 is a state transition table of the code words on the two-dimensional symmetrical communication channel.

BEST MODE OF CARRYING OUT THE INVENTION

The embodiments of the present invention will be described below with reference to the accompanying drawings.

In the present invention, as variable length codes, reversible codes (Reversible VLCs), which can be decoded in the two directions, i.e., the forward and backward directions, are used. Reversible codes will therefore be described with reference to FIGS. 1 to 4 prior to a description of the embodiments of the present invention.

Figure 1:
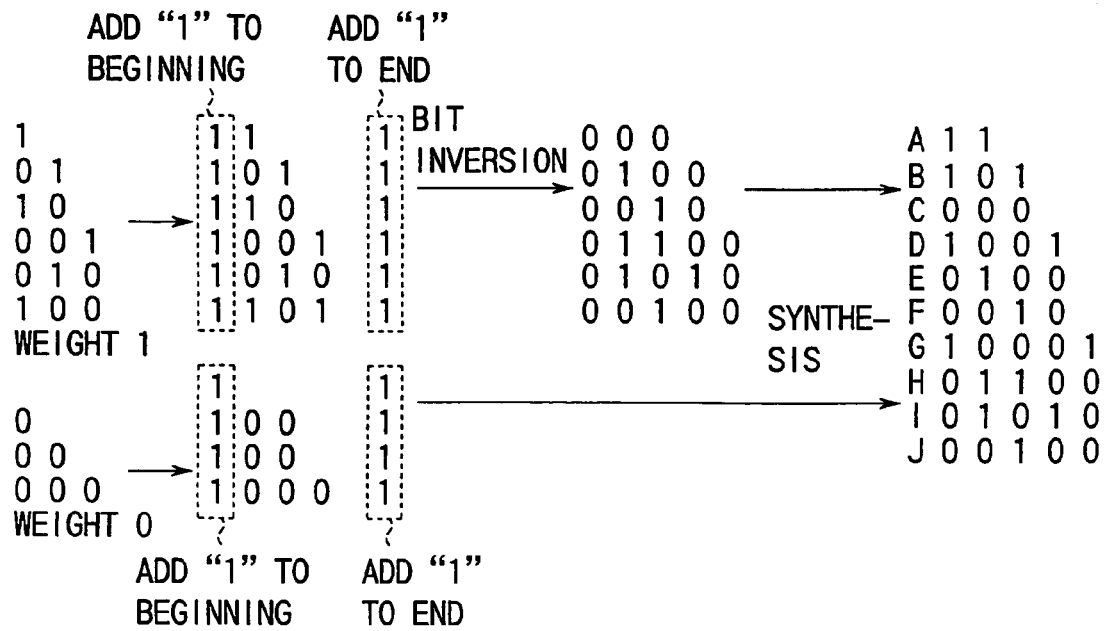
FIG. 1 is a view for explaining a first method of forming the code words of a reversible code.
Figure 2A:
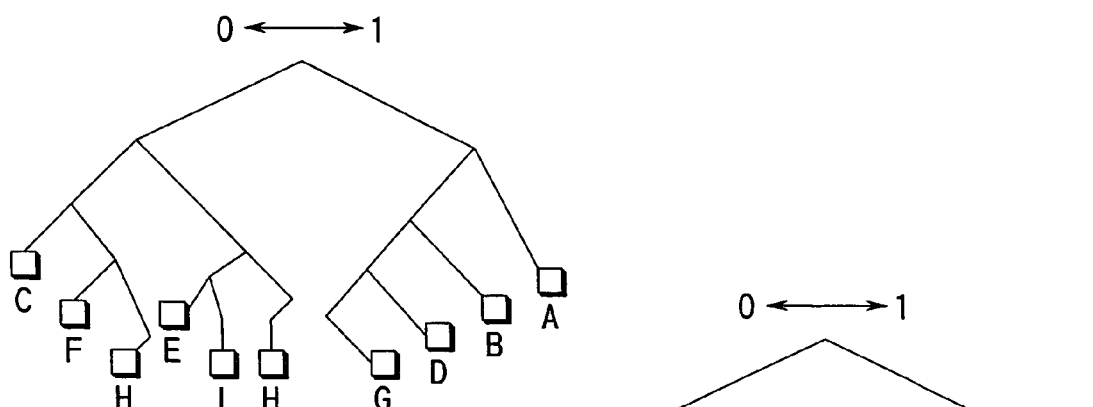
FIGS. 2A and 2B are views respectively showing a forward code tree and a backward code tree.
Figure 2B:
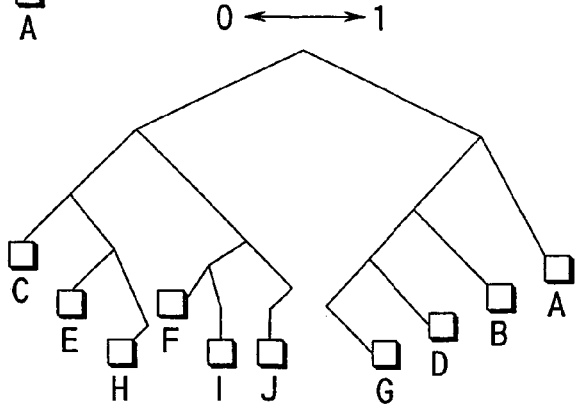

FIG. 1 shows a first method of forming the code words of a reversible code. First of all, as indicated on the left side of FIG. 1, two types of binary sequences having different weights (having 0 and 1 weight in this case), arranged in the increasing order of code lengths, and respectively having constant weights (the number of "1"s in this case) are prepared. As indicated by the middle portion of FIG. 1, "1"s are added to the beginning and end of each of these binary sequences, and the binary sequences with the weight 1 are inverted. Thereafter, these two types of binary sequences are synthesized, as indicated on the right side of FIG. 1.

The code length of this variable length code can be known by counting the number of the symbols at the beginning of the respective codes. In the case shown in FIG. 1, if the first symbol is "0", the appearance of three "0"s indicates the boundary (code length) of a code. If the first symbol is "1", the appearance of two "1"s indicates the boundary of a code. The code words of the variable length code in FIG. 1 which correspond to information symbols A to J can be assigned to the leaves of the forward code tree shown in FIG. 2A and the leaves of the backward code tree in FIG. 2B. As is obvious, therefore, this code can be decoded in both the forward and backward directions.

Figures 3, 4:
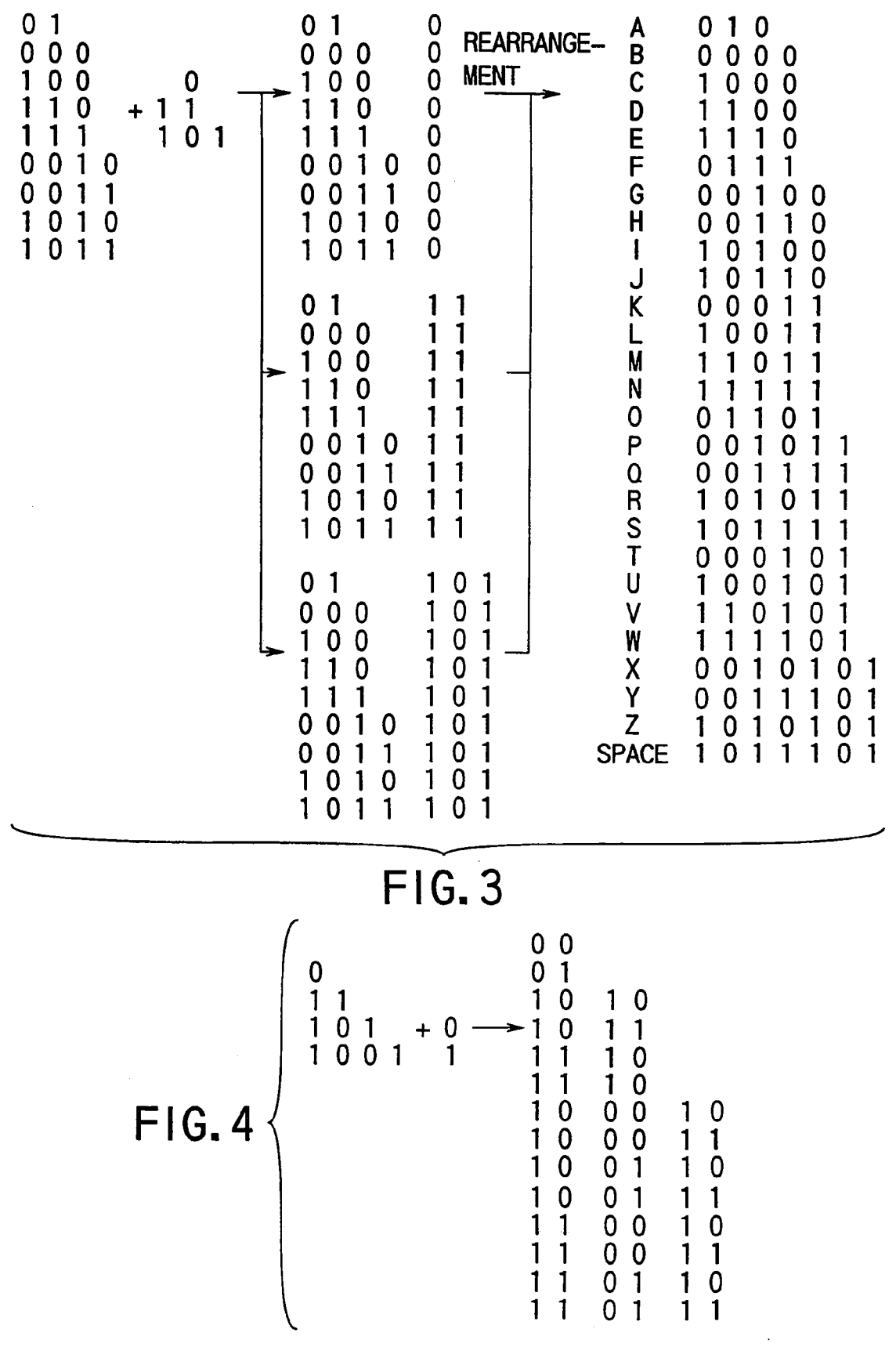

FIG. 3 shows a second method of forming the code words of a reversible code. First of all, as indicated on the left side of FIG. 3, first and second reversible codes are prepared. As indicated by the middle portion of FIG. 3, the first code word of the second reversible code is added to the end of every code word of the first reversible code. Likewise, every code word of the second reversible code is added one by one to the end of every code word of the first reversible code. Thereafter, as indicated on the right side of FIG. 3, the resultant code is rearranged into a new reversible code. With this forming method, a new reversible code having a code word count A×B (27 in this case), i.e., the product of a code word count A (A=9 in this case) of the first reversible code and a code word count B (B=3 in this case) of the second reversible code, can be formed.

When the reversible code formed by this forming method is to be decoded in the forward direction, the first reversible code is decoded first, and then the second reversible code is decoded. When this code is to be decoded in the backward direction, the second reversible code is decoded first, and then the first reversible code is decoded. Obviously, the code can be decoded in both the forward and backward directions.

In this case, the second reversible code is added to the end of each code word of the first reversible code. However, the second reversible code may be added to the beginning of the first reversible code or fixed-length codes may be added to both the end and beginning of the first reversible code. In addition, although different codes are used as the first and second reversible codes in this case, identical codes may be used. Furthermore, in this embodiment, variable length codes are used as the first and second reversible codes, either of the codes may be replaced with a fixed-length code.

FIG. 4 shows a third method of forming a reversible code. First of all, as indicated on the left side of FIG. 4, a variable length reversible code and a fixed-length reversible code are prepared. As indicated on the right side of FIG. 4, the fixed-length reversible code is added immediately after each bit of the code words of the reversible code. With this forming method, when a K-bit fixed-length reversible code is used, an H-bit code word is formed to have (K+1)H bits, and the code word count can be increased by 2 KH times.

In this case, the fixed-length code is added immediately after each bit of the code words of the reversible code. However, the fixed-length code may be added immediately before each bit, or may be added both immediately before and after each bit.

Variable-length encoding/decoding apparatuses according the embodiments of the present invention will be described next.

(First Embodiment)

Figure 5:
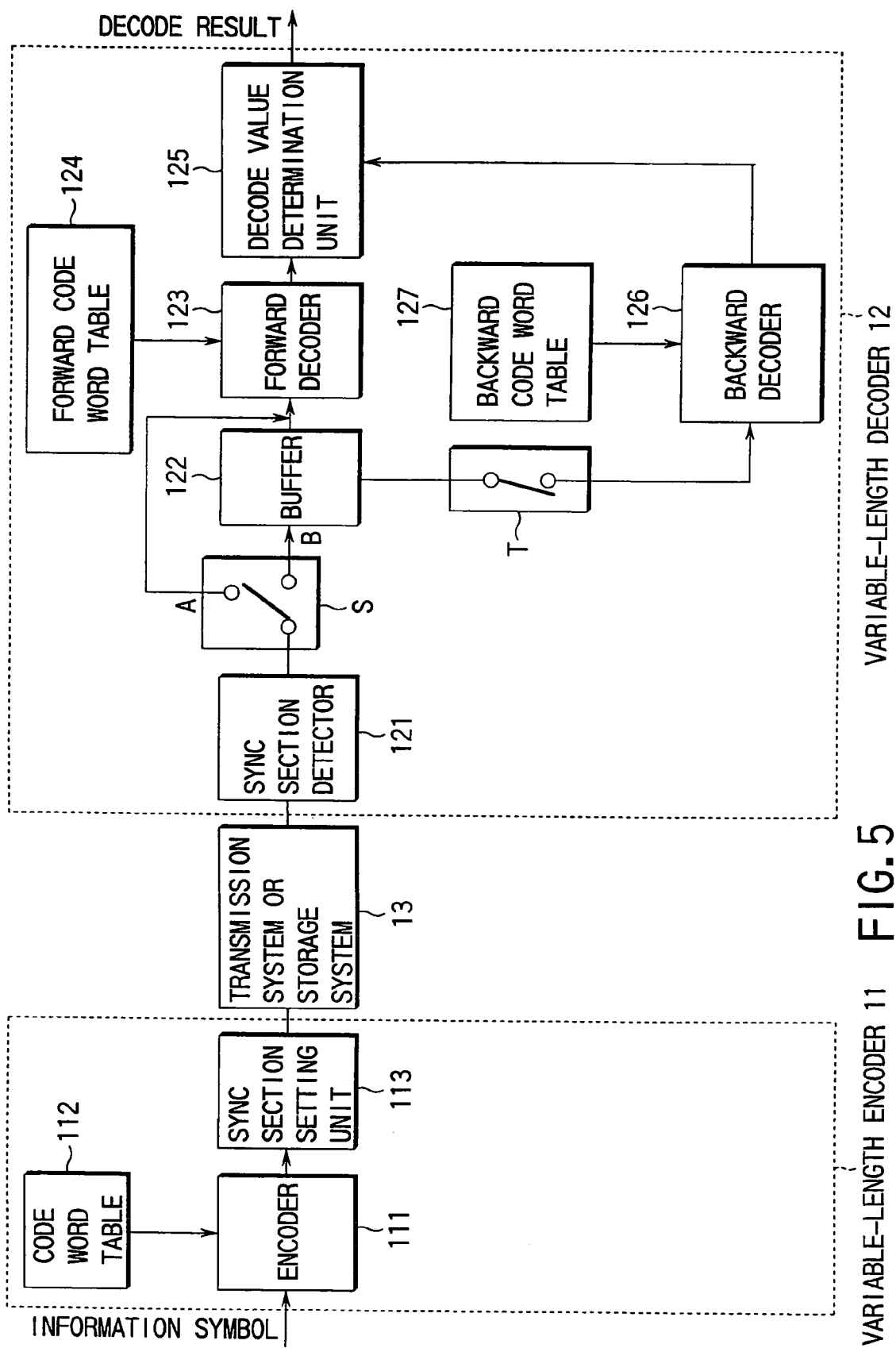
FIG. 5 is a block diagram showing the arrangement of an encoding/decoding system using a variable-length encoding apparatus according to the first embodiment of the present invention.

FIG. 5 shows the arrangement of a variable-length encoding/decoding apparatus according to an embodiment of the present invention. This variable-length encoding/decoding apparatus generates variable-length-encoded data and decodes it. A sync code is periodically inserted in variable-length-encoded data. As a variable length code, a reversible code (Reversible VLC) that can be decoded in the two directions, i.e., the forward and backward directions, like those described above, is used.

As shown in FIG. 5, a variable-length encoding apparatus 11 is constituted by an encoder 111, a coded word table 112, and a sync section setting unit 113. The coded word table 112 stores variable length code words prepared in correspondence with information symbols in accordance with the reversible code word forming methods described with reference to FIGS. 1 to 4. The coded word table 112 also stores reversible codes, which can be decoded in both the forward and backward directions, in correspondence with the respective information symbols. The encoder 111 encodes an information symbol into a variable length code word by referring to the coded word table 112. The encoder 111 then selects and outputs a code word corresponding to the input information symbol from the code words stored in the coded word table 112. The sync section setting unit 113 combines the code words selected by the encoder 111 in each sync section, inserts a stuffing code that can be decoded in both the forward and backward directions, and outputs encoded data in each sync section. This encoded data is sent to a variable-length decoder 12 through a transmission system or storage system 13.

The variable-length decoder 12 is constituted by a sync section detector 121, a buffer 122, two switches S and T, a forward decoder 123, a forward code word table 124, a decode value determination unit 125, a backward decoder 126, and a backward code word table 127.

In the variable-length decoder 12, the sync sections of the encoded data input from the transmission system or storage system 13 are detected by the sync section detector 106, and the encoded data is decoded in each of the detected sync sections.

If the encoded data input from the transmission system or storage system 13 is a variable length code that can be decoded in only the forward direction, the switch S is connected to the A side. As a result, the forward decoder 123 performs normal forward decoding by using the forward code word table 124. The encoded data decoded by the forward decoder 123 is sent to the decode value determination unit 125.

If the encoded data is a variable-length code that can be decoded bidirectionally, the switch S is connected to the B side. As a result, all the encoded data within a sync section are temporarily stored in the buffer 122. The total number of bits of the encoded data formed from a variable length code that can be decoded bidirectionally is checked by counting the number of bits of the encoded data stored in the buffer 122 using the forward decoder 123 or the like. Thereafter, the encoded data is read out from the buffer 122, and normal forward decoding is started by the forward decoder 123 using the forward code word table 124. The forward decoder 123 performs this forward decoding operation while checking whether there is an error in the encoded data.

More specifically, when a bit pattern that cannot exist in the forward code word table 124 appears, or data to be decoded runs out before the total bit length of decoded encoded data reaches the total number of bits described above, or a state that is impossible in units of syntax (the rules of grammar for encoded data) has occurred, the forward decoder 123 detects that an error has occurred at the position where such a case is detected. The state that is impossible in units of syntax indicates, for example, a state in which when the number of code words contained in each encoded data corresponding to a lower layer is designated by encoded data on an upper layer, the designated number of code words does not coincide with the number of code words contained in each encoded data.

The error detection position in units of bits and the error detection position in units of syntax are sent as information indicating the detection position of the error to the decode value determination unit 125, together with the result obtained by normally completing forward decoding before the detection of the error, regardless of the condition under which the encoded data error is detected. In this case, the error detection position in units of bits indicates the specific bit number of the encoded data counted from the start of synchronization as the error detection position. The error detection position in units of syntax indicates, for example, the specific code word number of the encoded data counted from the start of synchronization as the position where the identical error is detected.

If an error is detected by the forward decoder 123, the switch T is turned on to send the encoded data stored in the buffer 122 to the backward decoder 126. The backward decoder 126 then starts decoding the data by using the backward code word table 127. This backward decoding is also performed while the presence/absence of an error in the decoded error is checked. Error detection is performed under the same condition as that in the case of the forward decoder 123. If an error is detected in backward decoding, the error detection position in units of bits and the error detection position in units of syntax are sent as information indicating the error detection position to the decode value determination unit 125, together with the result obtained by normally completing backward decoding before the detection of the error.

The decode value determination unit 125 determines the final decode result on the basis of the decode results obtained by the forward decoder 123 and the backward decoder 126. That is, the boundary between a correct code word and an incorrect code word is doubly checked on the basis of both the error detection positions in units of bits and syntax, which are respectively notified from the forward decoder 123 and the backward decoder 126. With this operation, the forward decode result and the backward decode result are selectively used as a decode value for only a code word that is assumed to be a correct code word with a considerably high probability, and the remaining code words are discarded.

Figure 6A:
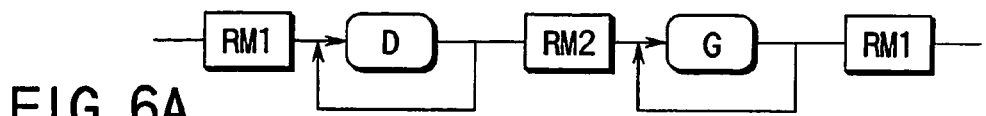
FIGS. 6A and 6B are views showing a syntax for the encoded data used by the variable-length decoding apparatus according to the first embodiment.
Figure 6B:
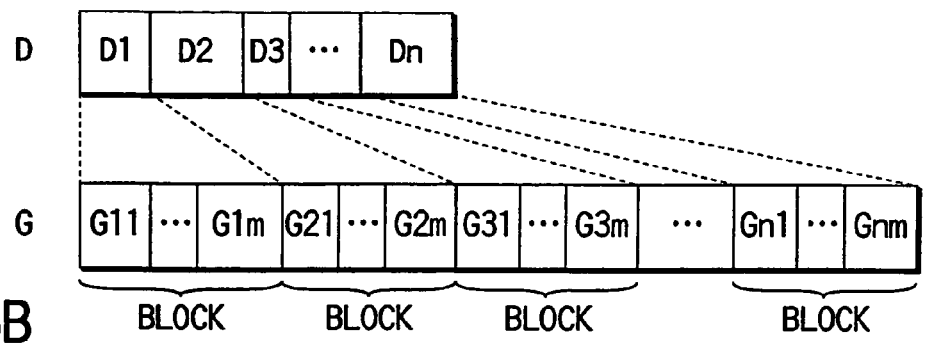

FIGS. 6A and 6B show an example of a syntax for encoded data in this embodiment.

As shown in FIG. 6A, encoded data is divided into two information layers, namely D information on the upper layer and G information on the lower layer. Encoding is performed such that m G code words are present for each D code word. If D information is composed of n code words, G information following the D information is composed of n×m code words. In this case, sync intersections are set in units of combinations of D information and succeeding G information, and a resync marker (RM1) is inserted between the sync sections. In addition, a resync marker (RM2) is set between D information and G information.

D information is encoded with a variable length code that can be decoded in only the forward direction. G information is decoded with a variable length code that can be decoded bidirectionally. As is obvious from this syntax, the total number of code words of G information can be found out to be n×m when D information is decoded. This total code word count of G information is used to indicate an error detection position as a position in units of syntax, i.e., to determine which code word among the code words, belonging to an interval from the synchronization start position to the end position, has occurred an error.

Figure 7A:
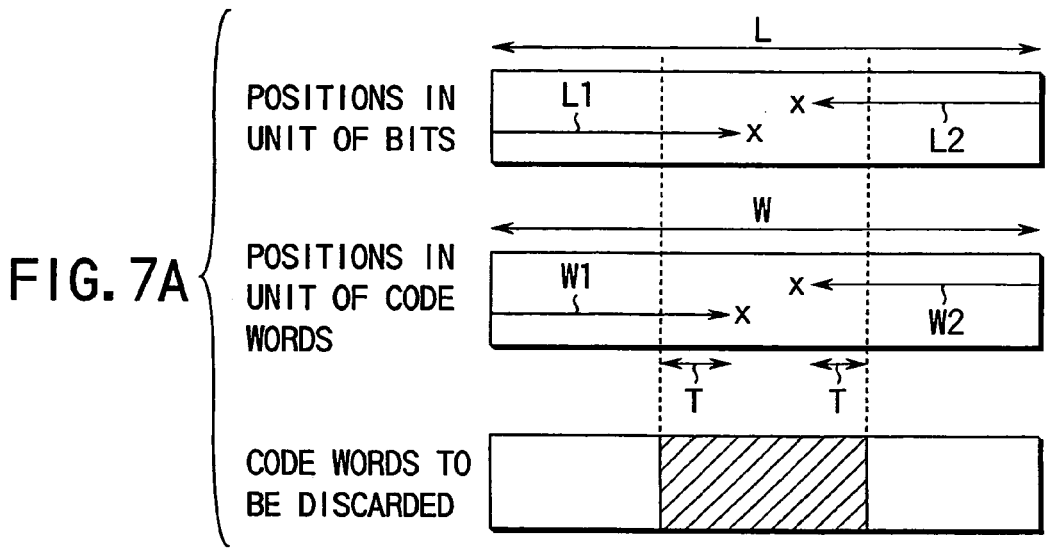
FIGS. 7A and 7B are views for explaining the principle of a first decode value determination method in the variable-length decoding apparatus according to the first embodiment.
Figure 7B:
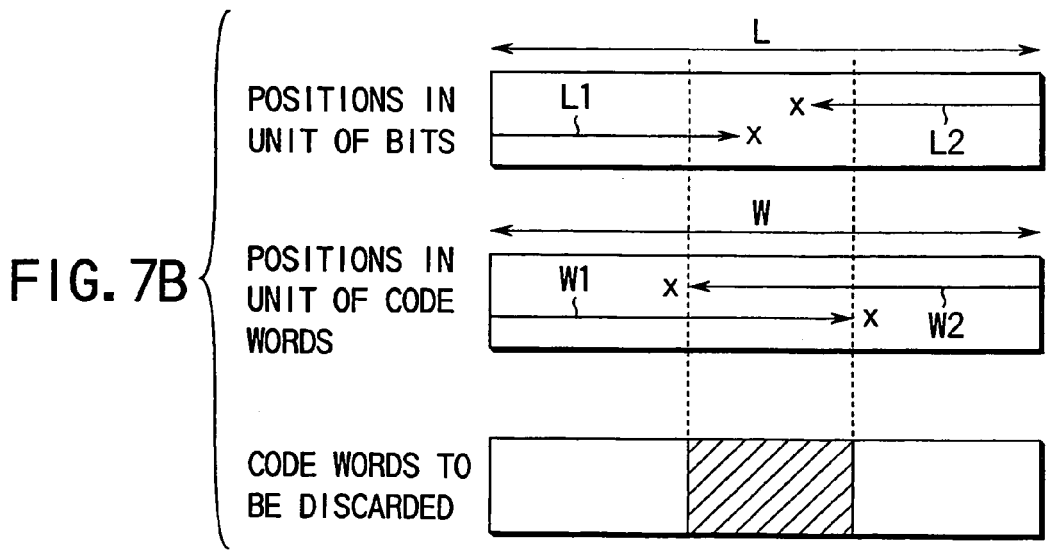
Figure 8A:
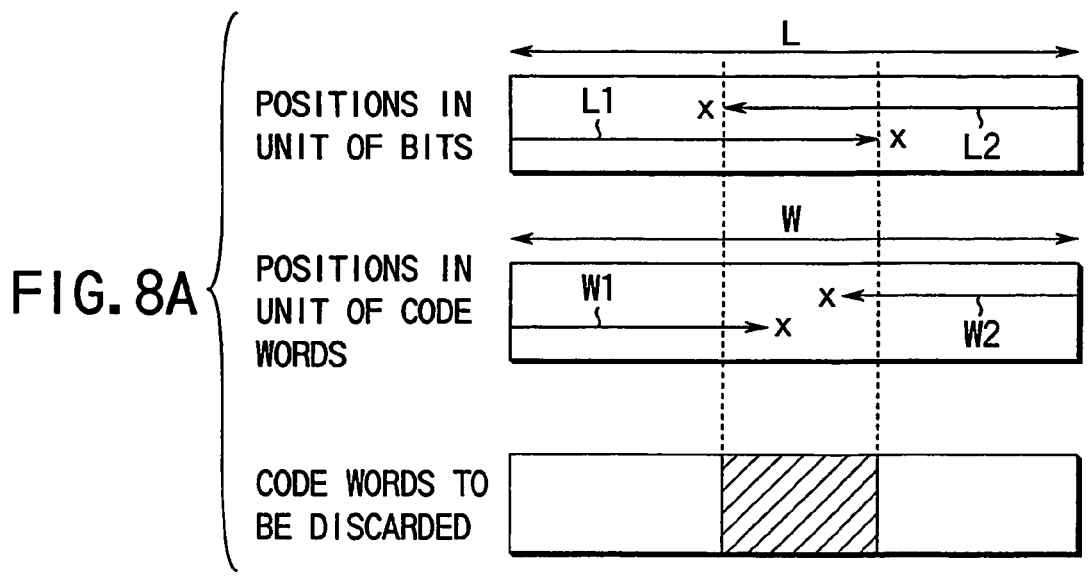
FIGS. 8A and 8B are views for explaining the principle of a second decode value determination method in the variable-length decoding apparatus according to the first embodiment.
Figure 8B:
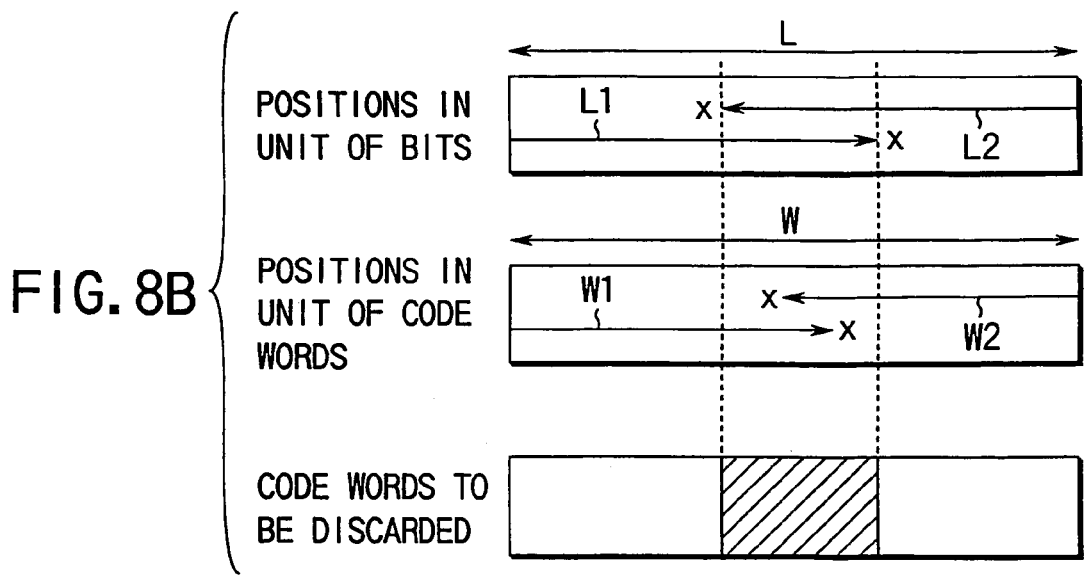

FIGS. 7 and 8 show the operation of the decode value determination unit 304 in decoding the encoded data of G information formed from a reversible variable length code.

First of all, the following functions are defined for G information:

L: total number of bits
W: total number of code words (=n×m)
W1: number of code words decoded in forward direction
W2: number of code words decoded in backward direction
L1: number of bits decoded in forward direction
L2: number of bits decoded in backward direction
f_code(L1): number of code words obtained when L1 bits are decoded in forward direction
b_code(L2): number of code words obtained when L2 bits are decoded in backward direction FIG. 7A shows a case wherein the error detection positions respectively obtained by the forward decoder 123 and the backward decoder 126 do not cross each other (i.e., do not pass each other) as both positions in units of bits and code words, i.e., a case wherein L1+L2<L and W1+W2<W. In this case, encoded data up to a position T code words before each error detection position is used. That is, W1−T code words in the forward direction and W2−T code words in the backward direction are used, and the remaining code words are discarded.

In this case, the encoded data is retraced by T code words. However, G information may be retraced by T bits or T blocks.

FIG. 7B shows a case wherein the error detection positions respectively obtained by the forward decoder 123 and the backward decoder 126 do not cross each other as positions in units of bits but cross each other as positions in terms of code words, i.e., a case wherein L1+L2<L and W1+W2≧W. Such a state occurs, for example, when each code word contained in encoded data is decoded as a code word having a bit pattern with a bit count smaller than the actual bit count for a while from the position where an error is actually mixed.

In this case, W−W2 code words in the forward direction and W−W1 code words in the backward direction are used, and the remaining code words are discarded.

FIG. 7A shows a case wherein the error detection positions respectively obtained by the forward decoder 123 and the backward decoder 126 cross each other as positions in units of bits, but do not cross each other as positions in terms of code words, i.e., a case wherein L1+L2≧L and W1+W2<W. Such a state occurs, for example, when each code word contained in encoded data is decoded as a code word having a bit pattern with a bit count larger than the actual bit count for a while from the position where an error is actually mixed.

In this case, the code words of W−b_code(L2) macroblocks in the forward direction and the code words of W−f_code(L1) macroblocks in the backward direction are used, and the remaining code words are discarded.

FIG. 7B shows a case wherein the error detection positions respectively obtained by the forward decoder 123 and the backward decoder 126 cross each other as both positions in units of bits and code words, i.e., a case wherein L1+L2≧L and W1+W2≧W. In this case, min {W−b_code (L2), W−W2} code words in the forward direction and min {W−f_code(L1), W−W1} code words in the backward direction are used, and the remaining code words are discarded.

In this case, since the total number of code words of G information is found by using the syntax in FIG. 2, a code word position is used as a position in units of syntax. However, the present invention can be applied to any case as long as logical positions obtained by using a syntax are used.

A procedure for a decoding method performed by the variable-length decoder 12 in this embodiment will be described next.

This decoding method is basically performed as follows. As described with reference to FIG. 5, encoded data using reversible variable length code words is decoded in the forward direction until an error is detected in the encoded data. When an error is detected in this forward decoding, backward decoding is performed until an error is detected in the encoded data. A decode value is then determined by using the forward and backward decode results and error detection positions in units of bits of encoded data and syntax which are respectively detected in the forward and backward decoding.

Figure 9:
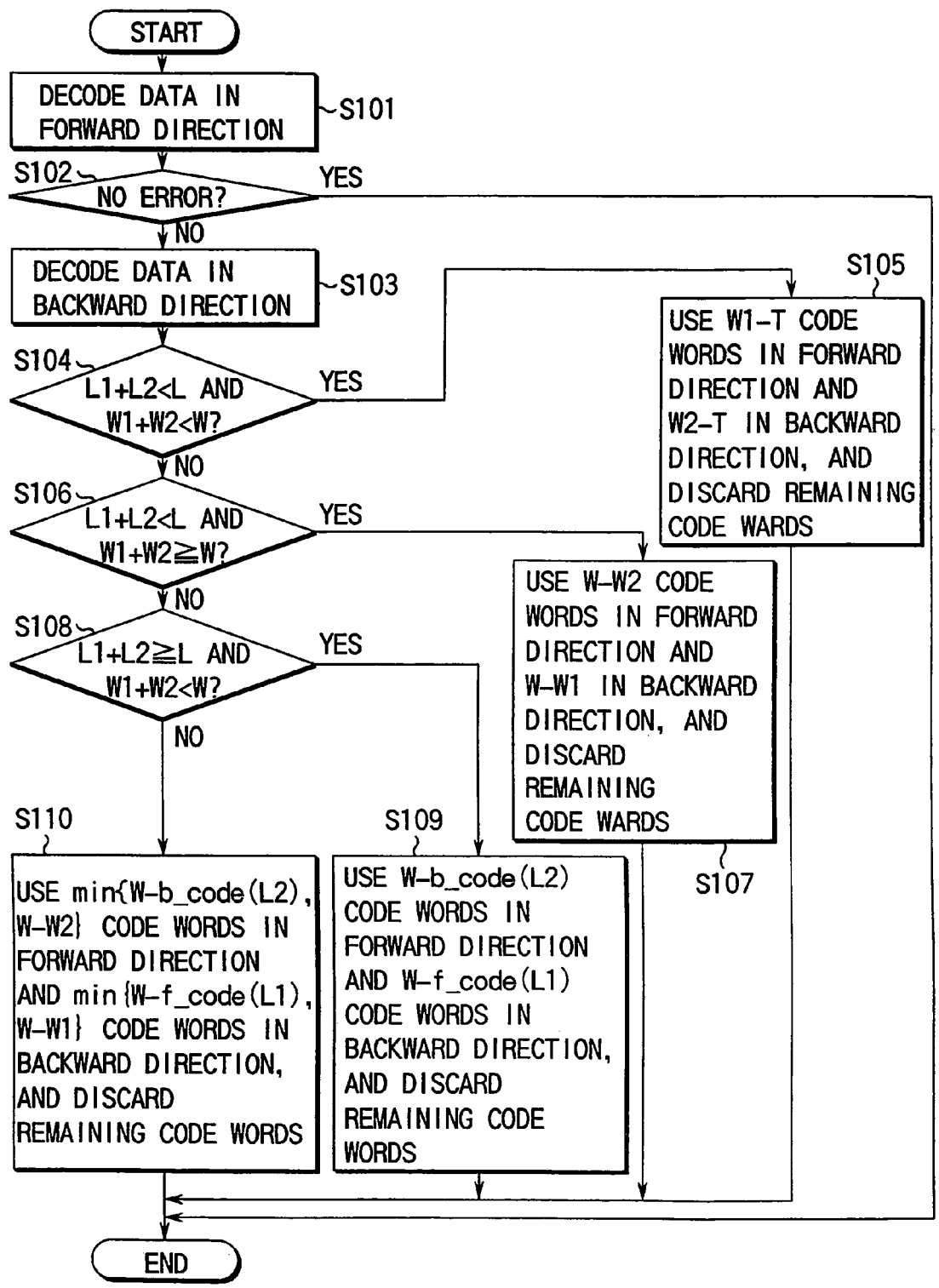
FIG. 9 is a flow chart for explaining a procedure for a decode value determination method in the variable-length decoding apparatus according to the first embodiment.

FIG. 9 is a flow chart showing a procedure for the method of decoding variable-length data formed from a reversible code.

First of all, the previously described functions L, W, W1, W2, L1, L2, f_code(L1), and b_code(L2) are defined, and forward decoding is started from first G information in a sync section (step S101). If no error is detected in this forward decoding within the sync section, the decode processing is terminated (step S102). If an error is detected in the forward decoding, backward decoding is started from last G information in the sync section (step S103). In general, if an error is detected in the forward decode processing, an error is normally detected in the backward decode processing.

If error detection positions do not cross each other as both positions in units of bits and positions in terms of code words, i.e., a case wherein L1+L2<L and W1+W2<W (step S104), the encoded data up to a position T code words before each error detection position is used. That is, W1−T code words in the forward direction and W2−T code words in the backward direction are used, and the remaining code words are discarded (step S105).

If the error detection positions do not cross each other as positions in units of bits but cross each other as positions in terms of code words, i.e., a case wherein L1+L2<L and W1+W1≧W (step S106), W−W2 code words in the forward direction and W−W1 code words in the backward direction are used, and the remaining code words are discarded (step S107).

If the error detection positions cross each other as positions in units of bits but do not cross each other as positions in terms of code words, i.e., a case wherein L1+L2≧L and W1+W2<W (step S108), W−b_code(L2) macroblocks in the forward direction and W−f_code(L1) macroblocks in the backward direction are used, and the remaining code words are discarded (step S109).

In a case other than those described above, i.e., a case wherein the error detection positions cross each other as both positions in units of bits and positions in terms of code words, i.e., a case wherein L1+L2≧L and W1+W2≧W, min {W−b_code(L2), W−W2} code words in the forward direction and min {W−f_code(L1), W−W1} code words in the backward direction are used, and the remaining code words are discarded (step S110).

(Second Embodiment)

Figure 10:
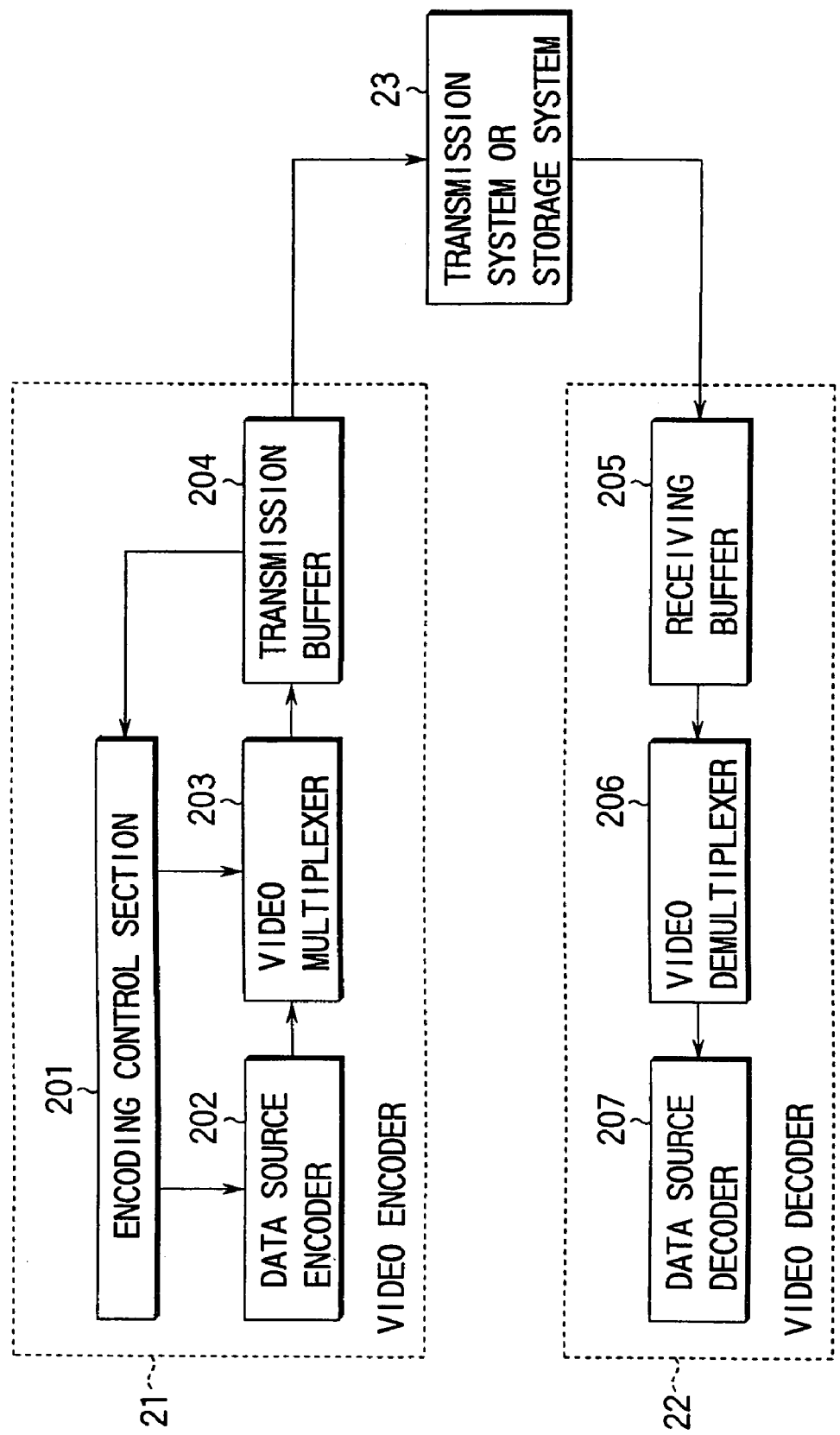
FIG. 10 is a block diagram showing the arrangement of a video encoding/decoding system using a video decoding apparatus according to the second embodiment of the present invention.

FIG. 10 shows the arrangement of a variable-length encoding/decoding apparatus for video signals according to the second embodiment of the present invention.

This video encoding/decoding apparatus is made up of a video encoder 21, a video decoder 22, and a transmission system or storage system 23.

In the video encoder 21, the data encoded by a data source encoder 202 is divided into upper layer data and lower layer data by a video multiplexer 203, and the respective data are variable-length encoded. These upper and lower layer data are multiplexed, and sync section setting and the like are performed. The resultant data is smoothed by a transmission buffer 204. The resultant data is then sent as encoded data to the transmission system or storage system 23. An encoding control unit 201 controls the data source encoder 202 and the video multiplexer 203 in consideration of the buffer amount of the transmission buffer 204.

In the video decoder 22, the encoded data from the transmission system or storage system 23 is stored in a receiving buffer 205, and the encoded data is demultiplexed into upper and lower layer data in units of sync sections by a video demultiplexer 206. These data are variable-length-decoded. The resultant data are sent to a data source decoder 207. Finally, the video data are decoded.

In this case, the variable-length encoding/decoding apparatus described in the first embodiment is applied to the video multiplexer 203 and the video demultiplexer 206.

Figure 11:
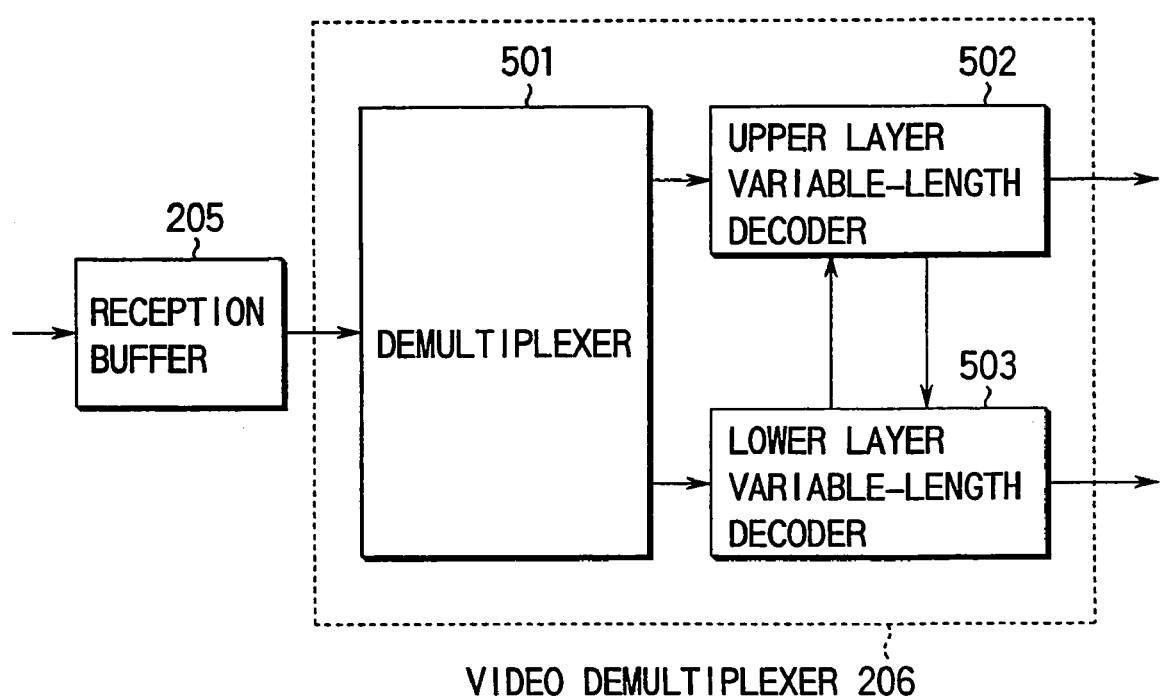
FIG. 11 is a block diagram showing the arrangement of the video demultiplexer of the video decoding apparatus according to the second embodiment.

FIG. 11 is a block diagram showing the video demultiplexer 206 in the second embodiment.

The encoded data received by the receiving buffer 205 is sent to a demultiplexer 501, in which sync sections are detected, and the encoded data is demultiplexed into upper and lower layer data in units of sync sections. The resultant data are respectively sent to an upper layer variable-length decoder 502 and a lower layer variable-length decoder 503 to be variable-length-decoded.

FIGS. 12A and 12B show a syntax for encoded video data used in the second embodiment.

Encoded data is hierarchically arranged into upper layer data (FIG. 12A) and lower layer data (FIG. 12B) in units of video packets. Sync sections are respectively set in upper and lower layer data with a resync marker (RM) and a motion marker (MM). In addition, "ST" on the lower layer represents a stuffing code.

According to this syntax, part of the mode information and vector information of a macroblock as a unit in prediction encoding of a video signal belong to the upper layer, whereas part of the mode information, INTRA DC (the DC value of a DCT coefficient in intraframe encoding), and DCT coefficient information belong to the lower layer. In addition, sync codes indicating boundaries are set in the respective information. As the DCT coefficient information, a reversible code is used.

A video packet normally includes a plurality of macroblocks. The number of the first macroblocks contained in the video packet is set in header information on the upper layer. In addition, mode information 1 and motion vector information on the upper layer are set in units of macroblocks. The number of loops of mode information 1 and motion vector information corresponds to the number of macroblocks contained in the video packet.

Figure 13:
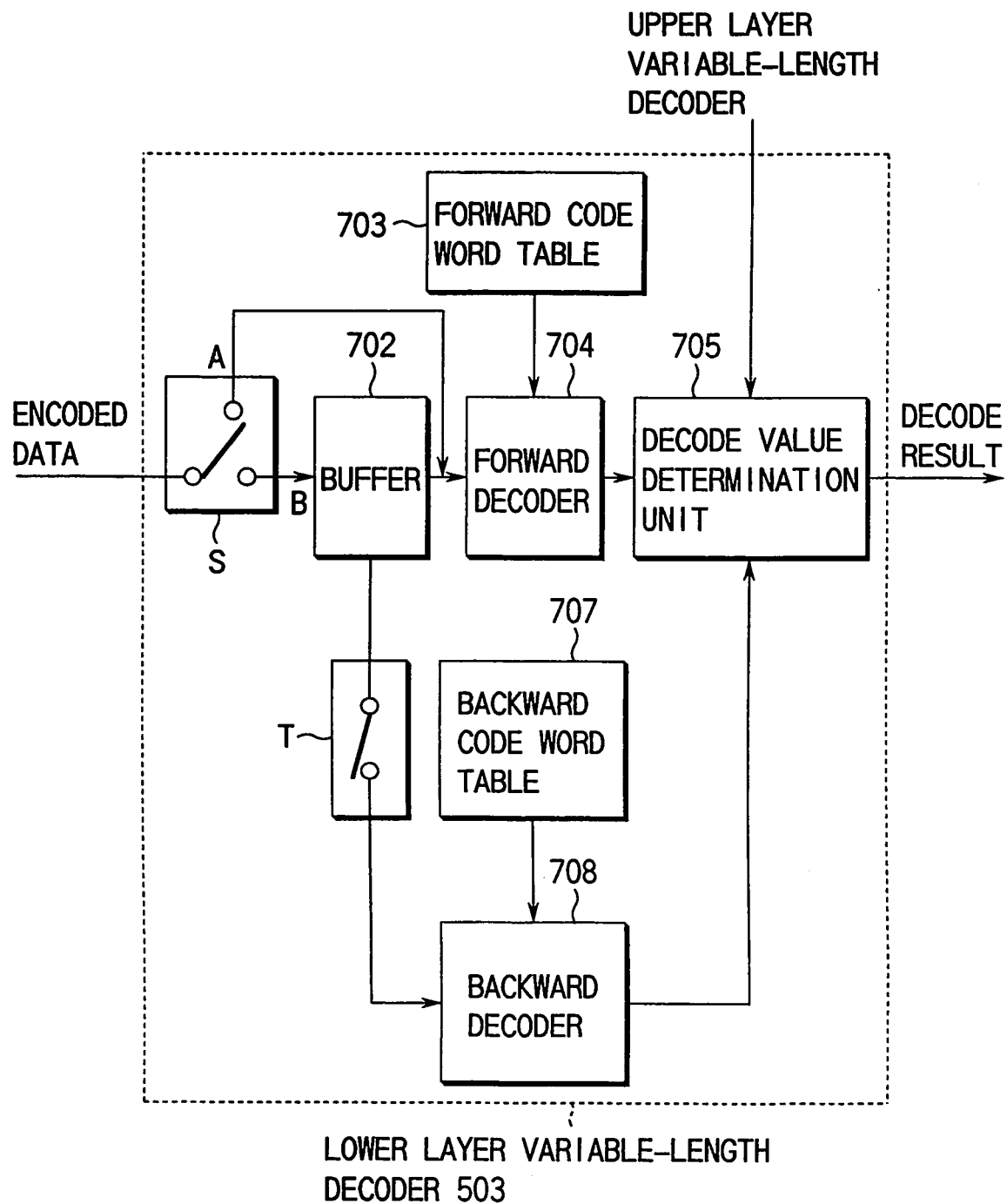
FIG. 13 is a block diagram showing the arrangement of a lower layer variable-length decoding apparatus arranged in the video decoding apparatus according to the second embodiment.

FIG. 13 is a block diagram showing the arrangement of the lower layer variable-length decoder 503 in the second embodiment.

As described above, of the data demultiplexed into the upper and lower layer encoded data in units of sync sections by the demultiplexer 501 in FIG. 1, the lower layer encoded data is sent to the lower layer variable-length decoder 503.

In this lower layer variable-length decoder 503, until DCT coefficient information is detected in units of syntax, a switch S is connected to the A side, and a forward decoder 704 performs normal forward decoding by using a forward code word table 703. The encoded data decoded by the forward decoder 704 is sent to a decode value determination unit 705. If an error is detected, the decoded data is compared with the decode result obtained by the upper layer variable-length decoder 502 to determine a decode result.

If the encoded data is DCT coefficient information, the switch S is connected to the B side, and all the DCT coefficient information in a sync section is stored in a buffer 702. For example, the forward decoder 704 or the like counts the number of bits of the encoded data stored in the buffer 702 to check the total number of bits of the DCT coefficient information formed from a reversible variable length code. Thereafter, the encoded data is read out from the buffer 702, and the forward decoder 704 starts normal forward decoding by using the forward code word table 703. The forward decoder 704 performs forward decoding while checking whether there is an error in the encoded data.

More specifically, for example, when a bit pattern that cannot exist in the forward code word table 703 appears, or data to be decoded runs out before the total number of bit lengths of decoded encoded data reaches the total number of bits described above, or a state that is impossible in units of syntax occurs, the forward decoder 704 detects that an error has occurred at the corresponding detection position. The state that is impossible in units of syntax indicates, for example, a state wherein the sum of the run of zeros and number of nonzero coefficients in each block of 8×8 DCT coefficients is larger than 64.

The error detection position in units of bits and the error detection position in units of syntax are sent as information indicating the detection position of the error to the decode value determination unit 705, together with the result obtained by normally completing forward decoding before the detection of the error, regardless of the condition under which the encoded data error is detected. In this case, the error detection position in units of bits indicates the specific bit number of the encoded data counted from the start of synchronization of the DCT coefficient information as the error detection position. The error detection position in units of syntax indicates the specific macroblock number counted from the start of synchronization as the position where the identical error is detected.

When an error is detected by the forward decoder 704, a switch T is turned on to send the encoded data stored in the buffer 122 to a backward decoder 708. The backward decoder 708 starts backward decoding by using a backward code word table 707. The backward decoder 708 performs this backward decoding while checking whether there is an error in the encoded data formed from reversible DCT coefficient information. Error detection is performed under the same condition as in the case of the forward decoder 704. If an error is detected in the backward decoding, the error detection position in units of bits and the error detection position in units of syntax are sent as information indicating the position where the error is detected to the decode value determination unit 705, together with the result obtained by normally completing decoding before the detection of the error.

The decode value determination unit 705 determines a final decode result by comparing the decode result obtained by the forward decoder 704 with the decode result obtained by the backward decoder 708. That is, the boundary between a correct macroblock and an incorrect macroblock is doubly checked on the basis of both the error detection positions in units of bits and syntax, which are respectively notified from the forward decoder 704 and the backward decoder 708. With this operation, the forward decode result and the backward decode result are selectively used as a decode value for only a macroblock in which all the code words are assumed to be correct with a considerably high probability, and the remaining macroblocks are discarded.

Figure 14:
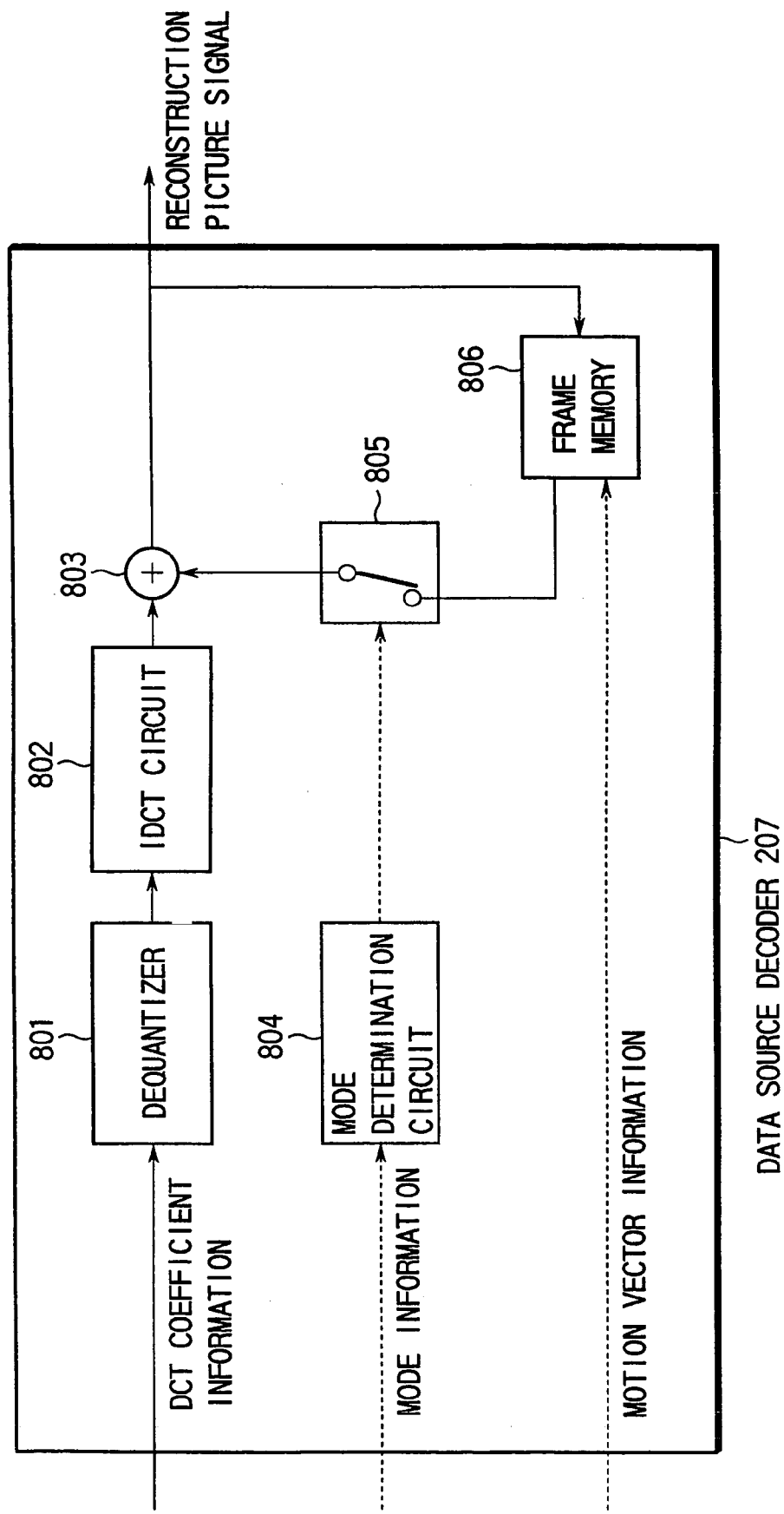
FIG. 14 is a block diagram showing the arrangement of a data source decoder arranged in the video decoding apparatus according to the second embodiment.

FIG. 14 shows an example of the arrangement of the data source decoder 207.

The data source decoder 207 receives the mode information, the motion vector information, the DCT coefficient information, and the like which are demultiplexed by the video demultiplexer 206 and variable-length-decoded.

If the mode information is INTRA, a mode determination circuit 804, to which the mode information is input, turns off a mode switch 805 to be disconnected from a frame memory 806. The DCT coefficient information is then dequantized by a dequantizer 801 and is subjected to inverse discrete cosine transform in an IDCT circuit 802. As a result, a reconstruction image signal is generated. This reconstruction image signal is stored as a reference image in the frame memory 806 and is output as a reproduction image signal to a display unit.

If the mode information is INTER, the mode switch 805 is turned on to connect an adder 803 to the frame memory 806. With this operation, the DCT coefficient information is dequantized by the dequantizer 801 and is subjected to inverse discrete cosine transform in the IDCT circuit 802. The adder 803 adds the resultant data to the information obtained by motion compensation for the reference image in the frame memory 806 on the basis of the motion vector information to generate a reconstruction image signal. This reconstruction image signal is stored as a reference image in the frame memory 806 and is also output as a reproduction image signal.

FIGS. 15A to 16B show the operation of the decode value determination unit 705 which is to be performed when the encoded data of DCT coefficient information formed from a reversible variable length code is to be decoded.

Figure 15A:
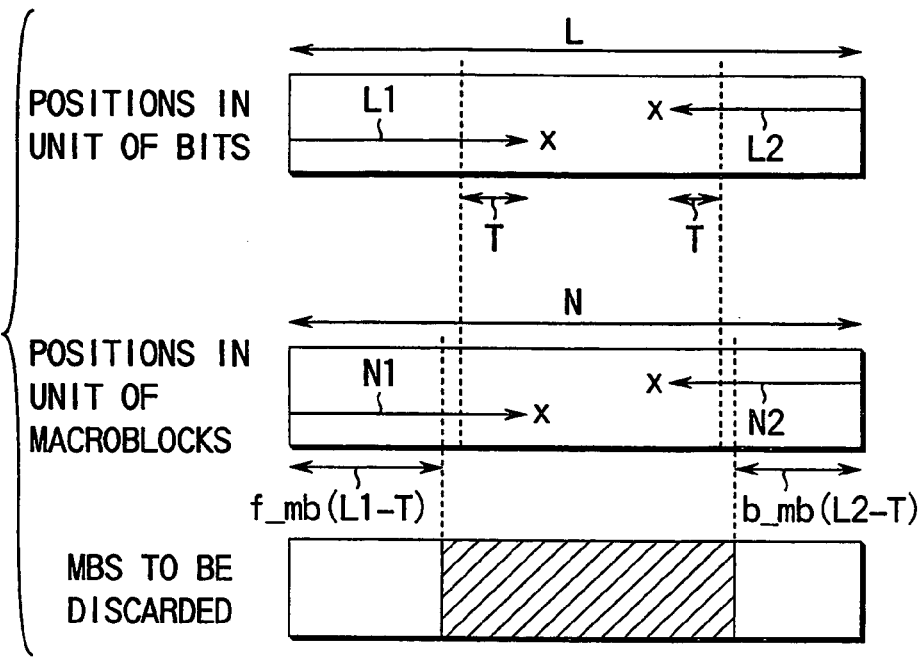
FIGS. 15A and 15B are views for explaining the principle of a first decode value determination method in the video decoder according to the second embodiment.

First of all, the following functions for the DCT coefficient information are defined:

L: total number of bits
N: total number of macroblocks
N1: number of macroblocks decoded in forward direction
N2: number of macroblocks decoded in backward direction
L1: number of bits decoded in forward direction
L2: number of bits decoded in backward direction
f_mb(L): number of macroblocks obtained when L bits are decoded in forward direction
b_mb(L): number of macroblocks obtained when L bits are decoded in backward direction FIG. 15A shows a case wherein the error detection positions respectively obtained by the forward decoder 704 and the backward decoder 708 do not cross each other as both positions in units of bits and positions in units of macroblocks, i.e., a case wherein L1+L2<L and N1+N2<N. In this case, assume that bits to a position retraced by T bits are used, the coefficient information of f_mb(L1−T) macroblocks in the forward direction and the coefficient information of b_mb(L2−T) macroblocks in the backward direction are used, and the remaining coefficient information is discarded.

In this case, the DCT coefficient information is retraced by T bits. However, this information may be retraced by T code words, T blocks, or T macroblocks.

Figure 15B:
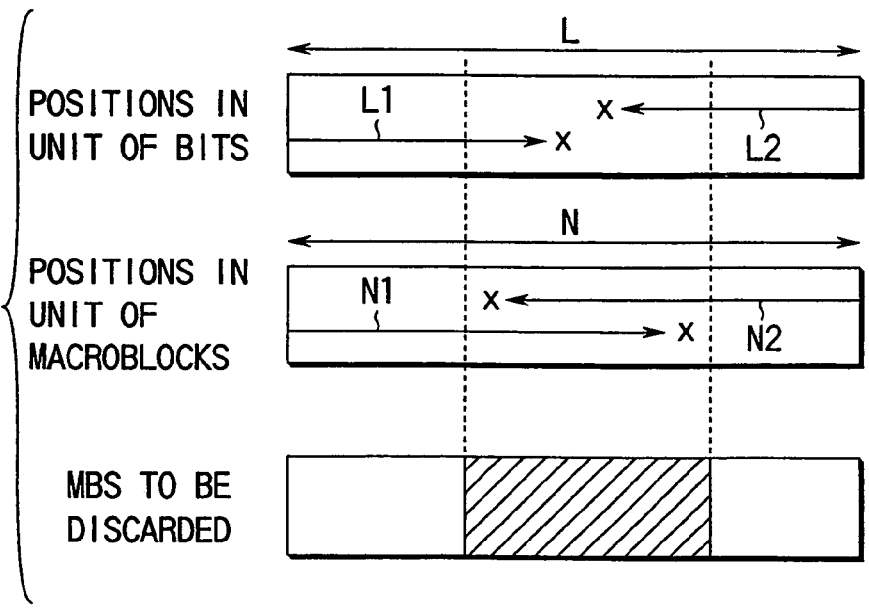

FIG. 15B shows a case wherein the error detection positions respectively obtained by the forward decoder 704 and the backward decoder 708 do not cross each other as positions in units of bits but cross each other as positions in units of macroblocks, i.e., a case wherein L1+L2<L and N1+N2≧N. In this case, the coefficient information of N−N2−1 macroblocks in the forward direction and the coefficient information of N−N1−1 macroblock in the backward direction are used, and the remaining coefficient information is discarded.

Figure 16A:
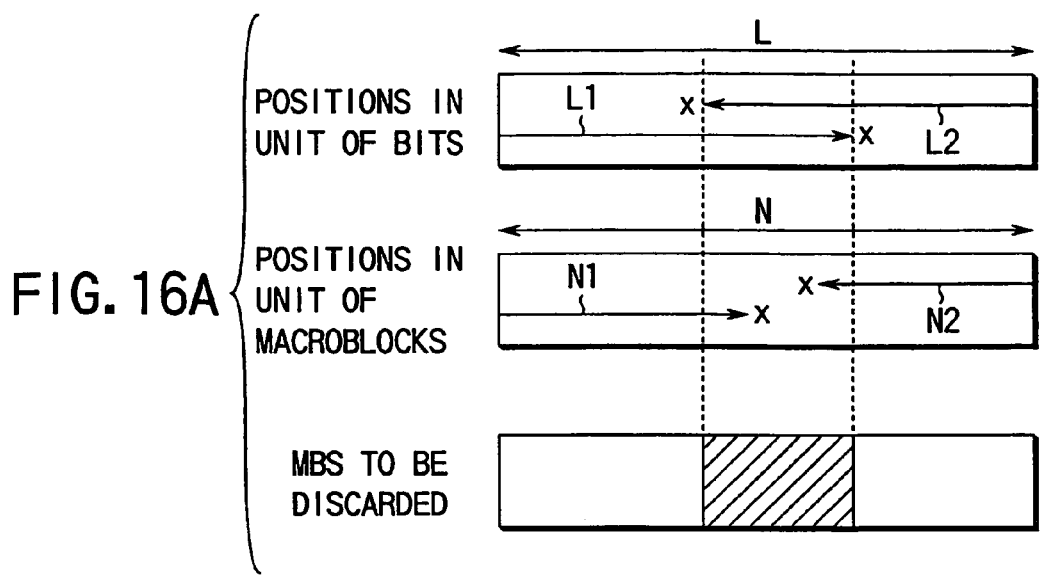
FIGS. 16A and 16B are views for explaining the principle of a second decode value determination method in the video decoding apparatus according to the second embodiment.

FIG. 16A shows a case wherein the error detection positions respectively obtained by the forward decoder 704 and the backward decoder 708 cross each other as positions in units of bits but do not cross each other as positions in units of macroblocks, i.e., a case wherein L1+L2≧L and N1+N2<N. In this case, the coefficient information of N−b_mb(L2) macroblocks in the forward direction and the coefficient information of N−f_mb(L1) macroblocks in the backward direction are used, and the remaining coefficient information is discarded.

Figure 16B:
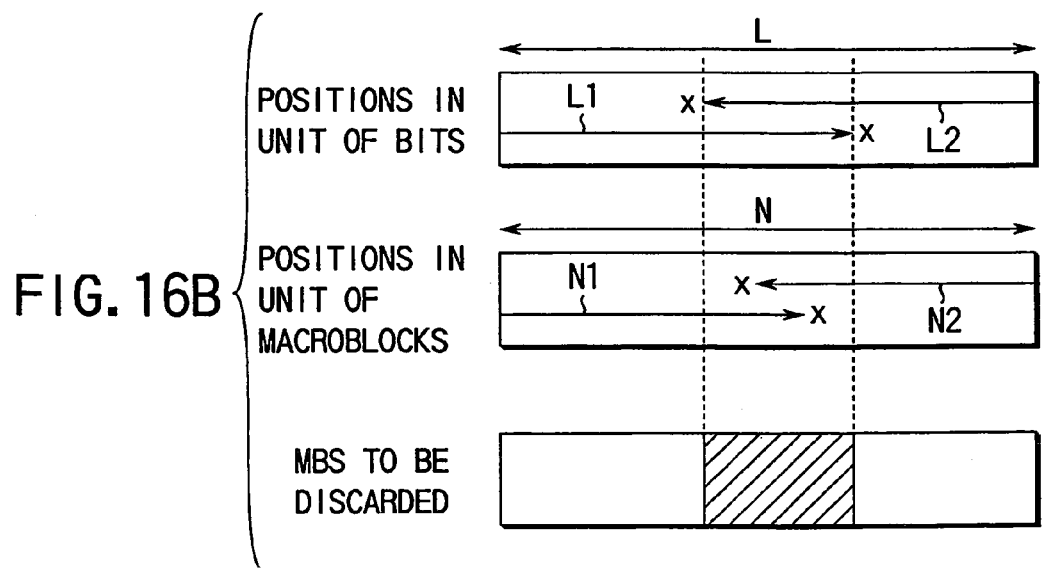

FIG. 16B shows a case wherein the error detection positions respectively obtained by the forward decoder 704 and the backward decoder 708 cross each other as both positions in units of bits and positions in units of macroblocks, i.e., a case wherein L1+L2≧L and N1+N2≧N. In this case, the coefficient information of min {N−b_mb(L2), N−N2−1} macroblocks in the forward direction and the coefficient information of min {N−f_mb(L1), N−N1−1} macroblocks in the backward direction are used, and the remaining coefficient information is discarded.

In this case, with regard to the macroblocks from which DCT coefficients are discarded, in the INTRA mode, a previous frame is displayed without any change, or processing as a mode without encoding is performed. In the INTER mode, a decode value is determined to display the information with motion compensation (MC) by using upper layer motion vector (MV) information.

Figure 17:
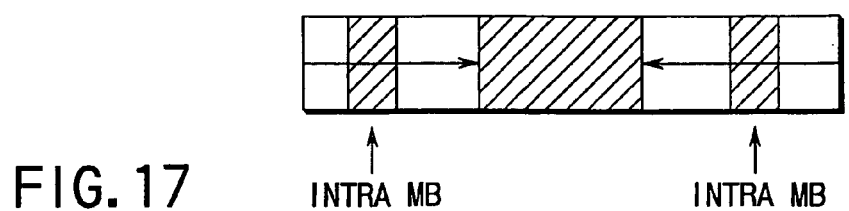
FIG. 17 is a view for explaining the principle of a third decode value determination method in the video decoding apparatus according to the second embodiment.

When any one of the states shown in FIGS. 15A, 15B, 16A, and 16B occurs, as shown in FIG. 17, the DCT coefficients of some or all of the macroblocks in the INTRA mode within the corresponding sync section are discarded, and a previous frame corresponding to the discarded information may be displayed or processing as a mode without encoding is performed, even if no error is detected. In the INTRA mode, an error greatly affects a frame. More specifically, when a wrong coefficient is displayed, a block in an unnatural color appears in the frame. If, therefore, at least the presence of an error in a sync section is known in advance, the influence of the error on the frame can be reduced by discarding the macroblocks in the INTRA mode.

In the second embodiment, DCT coefficients are discarded in units of macroblocks. Obviously, however, this operation may be performed in units of blocks.

A procedure for the decoding method performed by the lower layer variable-length decoder 503 in the second embodiment will be described next.

This decoding method is basically performed as follows. As shown in FIG. 13, DCT coefficient information formed from reversible variable length code words is decoded in the forward direction until an error is detected in the information. When an error is detected in this forward decoding, backward decoding is performed until an error is detected in the DCT coefficient information. A decode value is then determined by using the forward and backward decode results and error detection positions in units of bits of encoded data and syntax which are respectively detected in the forward and backward decoding.

Figure 18:
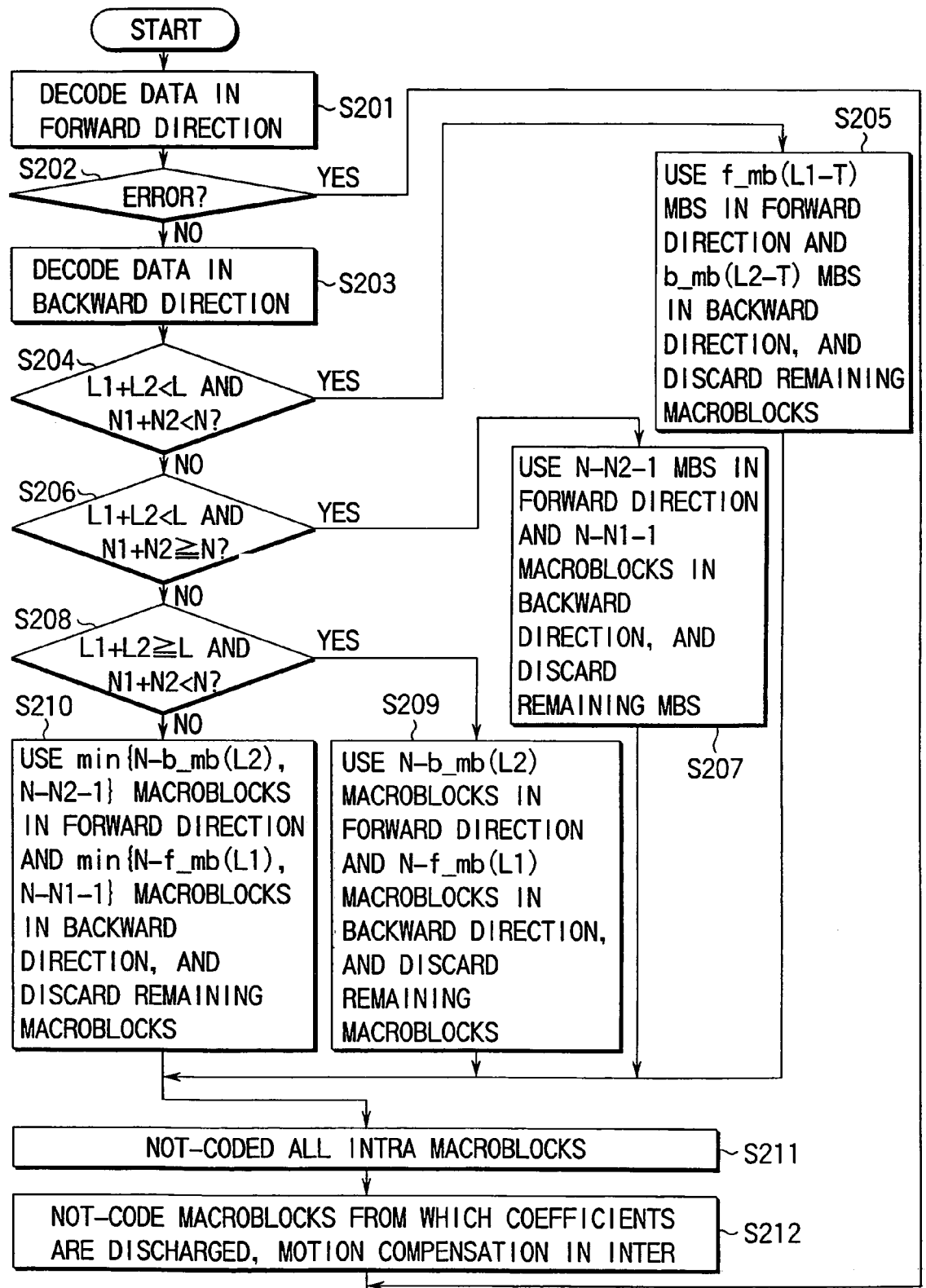
FIG. 18 is a flow chart for explaining a procedure for a decode value determination method in the video decoding apparatus according to the second embodiment.

A procedure for decoding the DCT coefficient portion of an AC component will be described below with reference to the flow chart of FIG. 18.

First of all, the previously described functions L, N, N1, N2, L1, L2, f_mb(L), and b_mb(L) are defined. Forward decode processing is then started (step S201). If no error is detected in this forward decode processing, the decode processing is terminated (step S202). If an error is detected in the forward decode processing, backward decoding is started (step S203). If an error is detected in the forward decode processing, an error is normally detected in backward decode processing.

If the error detection positions do not cross each other as both positions in units of bits and positions in units of macroblocks, i.e., L1+L2<L and N1+N2<N (step S204), the bits up to a position retraced by T bits are used. That is, the coefficient information of f_mb(L1−T) macroblocks in the forward direction and the coefficient information of b_mb (L2−T) macroblocks in the backward direction are used, and the remaining coefficient information is discarded (step S205).

If the error detection positions do not cross each other as positions in units of bits but cross each other as positions in units of macroblocks, i.e., L1+L2<L and N1+N2≧N (step S206), the coefficient information of N−N2−1 macroblocks in the forward direction and the coefficient information of N−N1−1 macroblocks in the backward direction are used, and the remaining coefficient information is discarded (step S207).

If the error detection positions cross each other as positions in units of bits but do not cross each other as positions in units of macroblocks, i.e., L1+L2≧L and N1+N2<N (step S208), the coefficient information of N−b_mb(L2) macroblocks in the forward direction and the coefficient information of N−f_mb(L1) macroblocks in the backward direction are used, and remaining coefficient information is discarded (step S209).

If the error detection positions correspond to another case, and more specifically, if the error detection positions cross each other as both positions in units of bits and positions in units of macroblocks, i.e., L1+L2≧L and N1+N2≧N, the coefficients of min{N−b_mb(L2), N−N2−1} macroblocks in the forward direction and the coefficients of min{N−f_mb (L1), N−N1−1} macroblocks in the backward direction are used, and the remaining coefficients are discarded (step S210).

If an error is detected, the DCT coefficients of all the macroblocks in the INTRA mode within the corresponding sync section are discarded, and a previous frame is displayed without any change or processing as a mode without encoding is performed (step S211).

With regard to the macroblocks from which the DCT coefficients are discarded, in the INTRA mode, a previous frame is displayed without any change, or processing as a mode without encoding is performed. In the INTER mode, a decode value is determined to display the information with motion compensation (MC) by using upper layer motion vector (MV) information (step S212).

A detailed arrangement of a code word table used in the video encoding/decoding apparatus of the second embodiment and encoding/decoding of a reversible code using the table will be described next.

The data source encoder 202 in FIG. 10 performs intra-block scanning in units of 8×8 DCT coefficient blocks after quantization to obtain LAST (0: a non-last nonzero coefficient in a block, 1: the last nonzero coefficient in the block), RUN (the run of zeros up to a nonzero coefficient), and LEVEL (the quantized value of a coefficient), and sends them to the video multiplexer 203.

Figures 27, 28, 29:
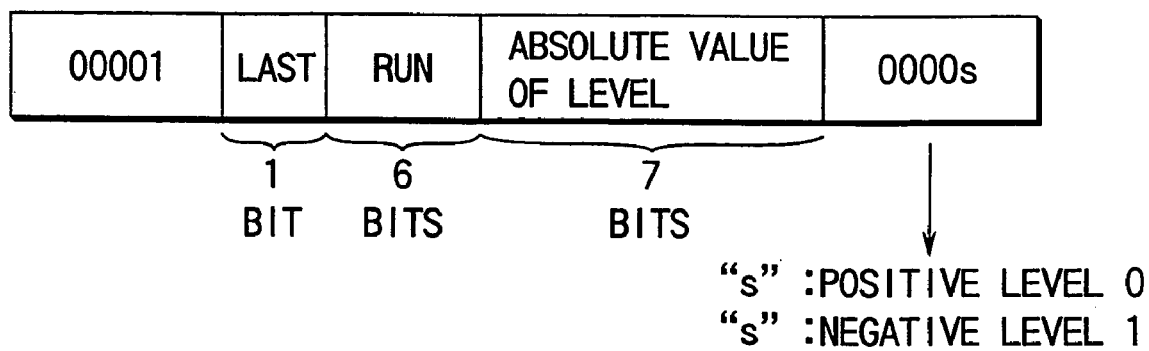
FIG. 27 is a view showing a RUN fixed-length code word table used in the video encoding/decoding system in FIG. 10.
FIG. 28 is a view showing a LEVEL fixed-length code word table used in the video encoding/decoding system in FIG. 10.
FIG. 29 is a view showing the data format of a fixed-length reversible code used in the video encoding/decoding system in FIG. 10.

The video multiplexer 203 includes an upper layer variable-length encoder and a lower layer variable-length encoder. The code word table of the lower layer variable-length encoder for performing variable-length encoding using a reversible code includes the four tables shown in FIGS. 22 to 26. FIG. 22 shows an INDEX table for searching the code word tables in FIGS. 25 and 26 for an INDEX value with RUN and LEVEL of a non-LAST coefficient for INTRA (intraframe encoding). FIG. 23 shows an INDEX table for searching the code word tables in FIGS. 25 and 26 for an INDEX value with RUN and LEVEL of a non-LAST coefficient for INTER (interframe encoding). FIG. 24 shows an INDEX table for searching the code word tables in FIGS. 25 and 26 for an INDEX value with RUN and LEVEL of a LAST coefficient common to INTRA and INTER. FIGS. 25 and 26 show code word tables in which INDEX values are made to correspond to reversible variable length code words (VLC-CODE). In addition, as tables for conversion to fixed-length reversible code words, the RUN fixed-length code word table shown in FIG. 27 and the LEVEL fixed-length code word table shown in FIG. 28 are used.

A procedure for variable-length encode processing performed by the lower layer variable-length encoder using these tables will be described below with reference to the flow chart of FIG. 19.

First of all, INDEX tables to be used are selected in accordance with the prediction mode designated by upper layer mode information (step S301). In this case, if the prediction mode is INTRA, the INDEX tables shown in FIGS. 22 and 24 are selected. If the prediction mode is INTER, the INDEX tables shown in FIGS. 23 and 24 are selected.

It is then checked whether the RUN and LEVEL values of the DCT coefficient to be encoded are not more than the maximum RUN and LEVEL values defined in the INDEX tables to be used (step S302). If the RUN and LEVEL values are not more than the maximum RUN and LEVEL values defined in the INDEX tables, the RUN and LEVEL values are used to search the INDEX tables to obtain an INDEX value for searching the code word tables shown in FIGS. 25 and 26 (step S303). It is checked whether the INDEX value obtained from the INDEX tables is "0" (step S304). If this value is not "0", the code word tables in FIGS. 25 and 26 are searched to output a reversible code word corresponding to the INDEX value (step S305). The last bit "s" of each reversible code word in the code word tables in FIGS. 25 and 26 represents the sign of LEVEL. When "s" is "0", the sign of LEVEL is positive. When "s" is "1", the sign of LEVEL is negative.

If the RUN and LEVEL values to be encoded exceed the maximum RUN and LEVEL values defined in the INDEX tables to be used, or the INDEX value obtained from the INDEX tables is "0", (LAST, RUN, and LEVEL) are fixed-length are encoded into fixed-length codes. ESCAPE codes are then added to each code at its two ends, and the resultant codes are output (step S306). More specifically, the RUN and LEVEL values are respectively converted into 6- and 7-bit fixed-length codes by using the RUN fixed-length code word table in FIG. 27 and the LEVEL fixed-length code word table in FIG. 28, and one bit corresponding to the LAST value is added to the beginning of each of these fixed-length codes, as shown in FIG. 29. In addition, ESCAPE codes are added to the two ends of each code sequence. The ESCAPE code at the beginning is "00001", and the ESCAPE code at the end is a reversible code "0000s" to be searched out with INDEX value="0" in the code word tables in FIGS. 25 and 26. The last bit "s" of this reversible code "0000s" indicates the sign of LEVEL. When "s" is "0", the sign of LEVEL is positive. When "s" is "1", the sign of LEVEL is negative.

A reversible code decoding method performed by the forward decoder 704 and the backward decoder 708 will be described next.

In the forward code word table 703 and the backward code word table 707, decode value tables like those shown in FIGS. 30 and 31 are prepared as code word tables, in addition to the code word tables in FIGS. 25 and 26, the RUN fixed-length code word table in FIG. 27, and the LEVEL fixed-length code word table in FIG. 28. In the decode value tables in FIGS. 30 and 31, decode values for (LAST, RUN, and LEVEL) corresponding to the INDEX values in the INTRA and INTER modes are set.

Forward decode processing will be described first with reference to the flow chart of FIG. 20.

First of all, decode processing for encoded data is performed, and an INDEX value corresponding to the reversible code word is obtained by using the code word tables shown in FIGS. 25 and 26 (step S401). It is then checked whether the INDEX value is "0" (step S402). If this value is not "0", the decode value tables in FIGS. 30 and 31 are searched with the INDEX value and the mode to obtain decode values of (LAST, RUN, and LEVEL) which correspond to the used prediction mode and INDEX value (step S403). If the INDEX value is "0", since it indicates an ESCAPE code, the succeeding fixed-length codes of (LAST, RUN, and LEVEL) are decoded by using the fixed-length code word tables in FIGS. 27 and 28 (step S404). The ESCAPE code at the end is decoded (step S405). The sign of LEVEL is determined by using the last one bit of each code word (step S406).

Backward decode processing will be described next with reference to the flow chart of FIG. 21.

First of all, the sign of LEVEL is determined on the basis of the first one bit of the code word (step S501). An INDEX value corresponding to the reversible code word is obtained by using the code word tables shown in FIGS. 25 and 26 (step S502). It is then checked whether the INDEX value is "0" (step S503). If this value is not "0", the decode value tables in FIGS. 30 and 31 are searched with the INDEX value and the prediction mode to obtain decode values of (LAST, RUN, and LEVEL) which correspond to the used prediction mode and INDEX value (step S504). If the INDEX value is "0", since it indicates an ESCAPE code, the succeeding fixed-length codes of (LAST, RUN, and LEVEL) are decoded by using the fixed-length code word tables in FIGS. 27 and 28 (step S505). The ESCAPE code at the beginning is then decoded (step S506).

A procedure for error detection processing performed in each of forward decode processing and backward decode processing in the second embodiment will be described next.

Figure 32:
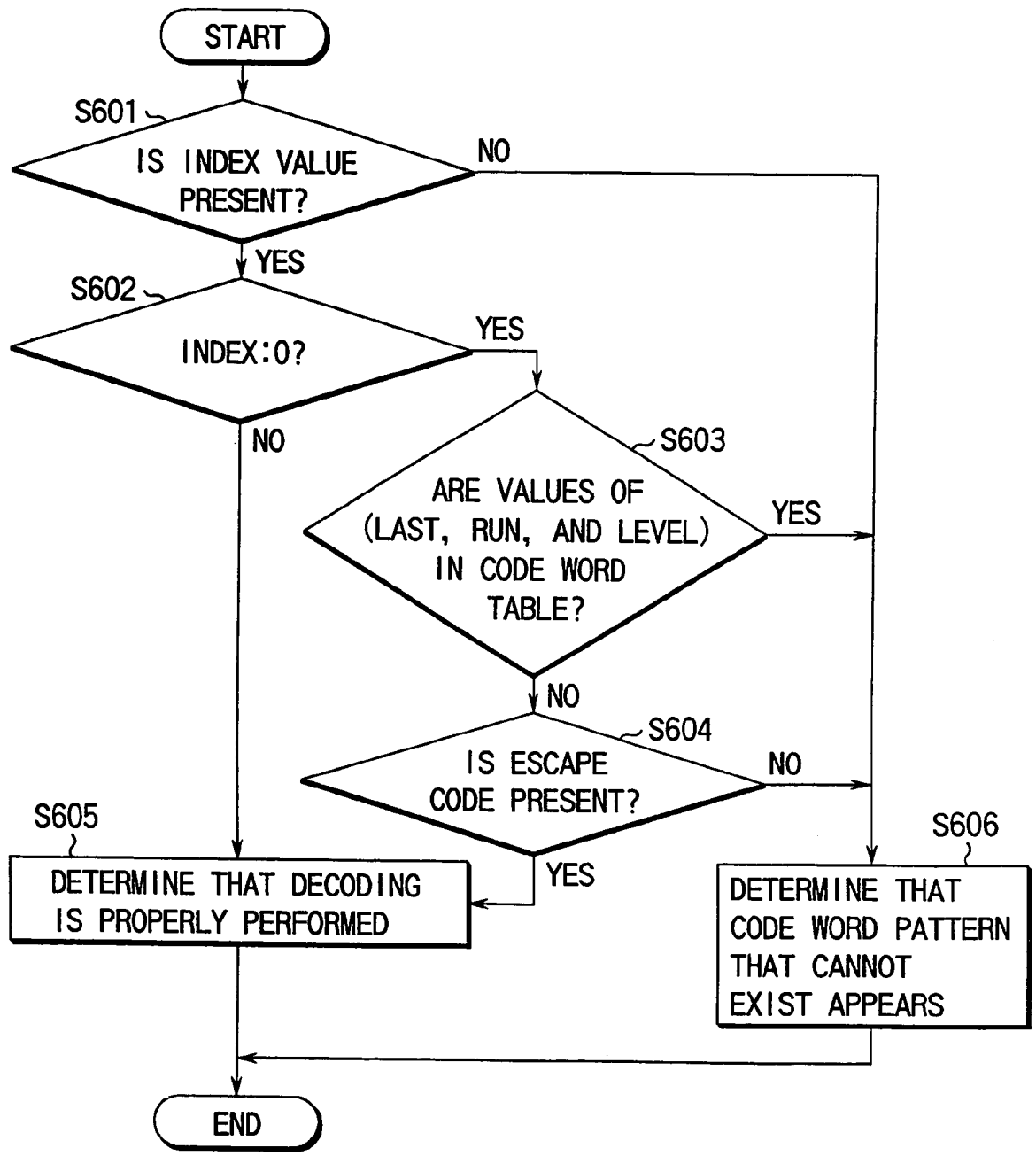
FIG. 32 is a flow chart showing a procedure for a method of detecting an error in accordance with the occurrence of a bit pattern that is not used for a code word in the video decoding apparatus according to the second embodiment.

FIG. 32 is a flow chart for detecting an error depending on whether a bit pattern that cannot exist in the forward code word table 124 appears in encoded data.

First of all, in order to check whether a corresponding code word is present in the code word table used in forward or backward decode processing, it is checked whether the INDEX value obtained by the above decode processing for the encoded data is present (step S601). If the INDEX value is not present, it is determined that a code word pattern that cannot exist in the table has appeared, thereby detecting an error (step S606).

If the INDEX value is present in the table, it is checked whether the INDEX value is "0" (step S602). If the INDEX value is "0", since it indicates that encoding is performed by using an ESCAPE code, it is checked whether a combination of (LAST, RUN, LEVEL) is present in the code word table (step S603). If the combination is present in the code word table, it is determined that a code word pattern that does exist in the table has appeared, thereby detecting an error (step S606). If the combination of (LAST, RUN, LEVEL) is not present in the code word table, it is checked whether an ESCAPE code is present at the end of the fixed-length code (step S604). If no ESCAPE code is present, it is determined that a code word pattern that cannot exist in the table has appeared, thereby detecting an error (step S606). If the ESCAPE code is present, it is determined that the pattern is a correct encoded bit pattern, and proper decode processing is performed (step S605).

When the INDEX value is present in the code word table and the INDEX value is not 0, the code bit pattern is determined as a correct code bit pattern, and decode processing is properly performed (step S605).

Figure 33:
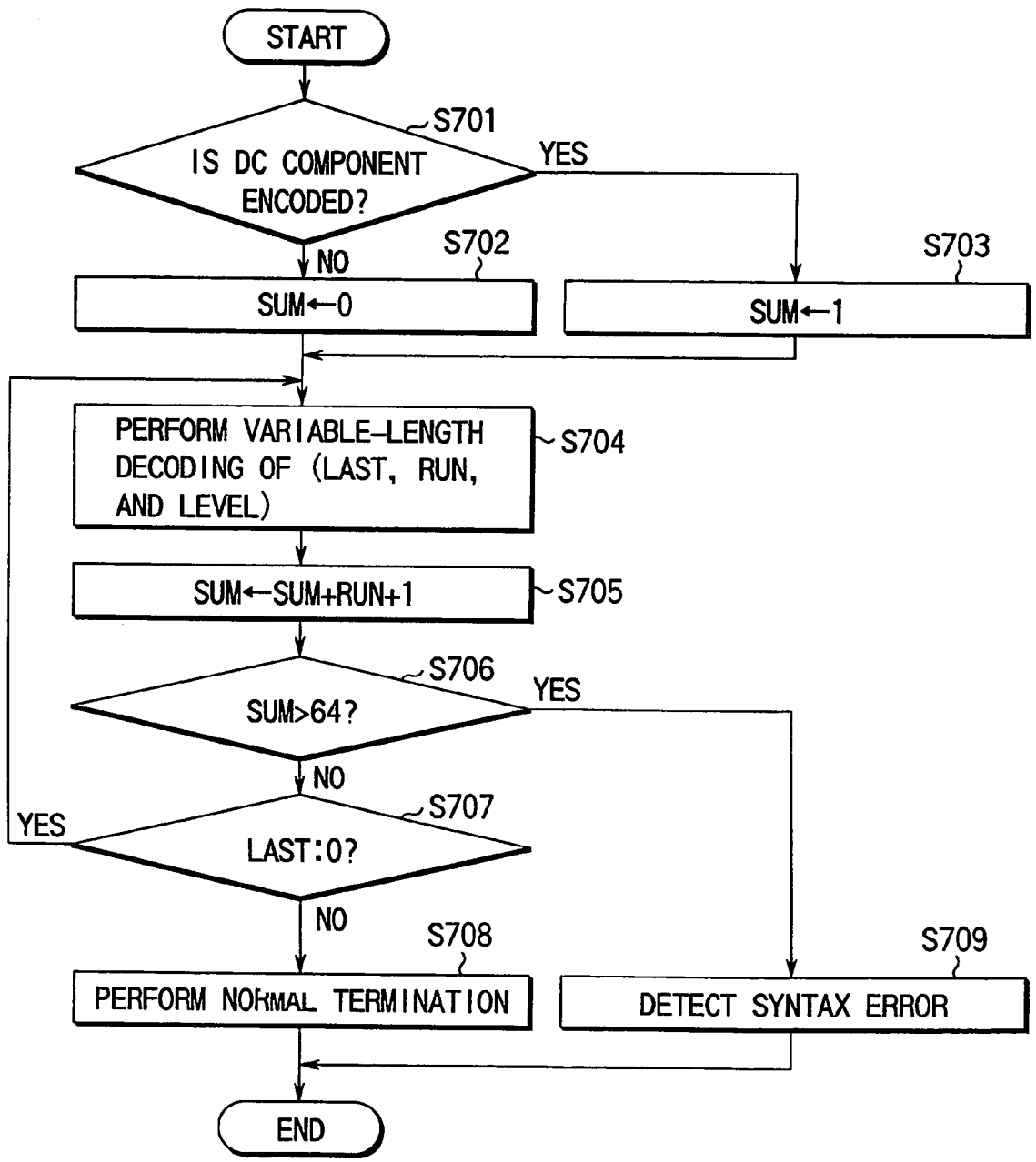
FIG. 33 is a flow chart showing a procedure for a method of detecting an error in accordance with the occurrence of a state that cannot exist in units of syntax in the video decoding apparatus according to the second embodiment.

FIG. 33 is a flow chart for detecting an error depending on whether a state that is impossible in units of syntax has occurred. In this case, it is checked in units of 8×8 DCT coefficient blocks whether the sum of the run of zeros and number of nonzero coefficients is larger than 64.

First of all, it is checked whether a DC component in 8×8 DCT coefficients is contained in the encoded data of the DCT coefficient portion of an AC component (step S701). If the DC component is contained, "0" is set as an initial value in a variable SUM representing the sum of the run of zeros and number of nonzero coefficients (step S702). If the component is not contained, "1" is set as an initial value in the variable SUM (step S703).

Subsequently, variable-length decoding of the encoded data of each DCT coefficient given by (LAST, RUN, and LEVEL) is repeatedly executed until LAST="1" (steps S704 to S707). In this processing, every time variable-length decoding of (LAST, RUN, LEVEL) is performed in step S704, the value obtained by adding one to the RUN value representing the run of zeros up to a nonzero coefficient, i.e., the value of RUN+1 is added to the variable SUM (step S705). The reason why the RUN value is incremented by one is that one coefficient is decoded regardless of whether it is a zero or nonzero coefficient. It is then checked whether the value of the variable SUM is larger than 64 (step S706). If the value of the variable SUM is larger than 64, the occurrence of a syntax error is detected (step S709).

If no syntax error is detected until the LAST coefficient becomes "1", the decoding processing for this block is normally terminated (step S708).

(Another Format Having ESCAPE Codes Added to Two Ends of Code Sequence)

FIGS. 34 and 35 show another format having ESCAPE codes added to the two ends of a code sequence. The RUN and LEVEL values are respectively converted into 6- and 11-bit fixed-length codes by using the RUN fixed-length code word table in FIG. 23 and the LEVEL fixed-length code word table in FIG. 34. At this time, Marker Bits "1" are set at the two ends of LEVEL to limit the run of zeros. As shown in FIG. 35, one bit corresponding to a LAST value is added to the beginning of this code sequence. In addition, ESCAPE codes are added to the two ends of the code sequence. The ESCAPE code at the beginning is "00001", and the ESCAPE code at the end is the reversible code "0000s" that is searched out with INDEX value="0" in the code word tables in FIGS. 25 and 26. The last bit "s" of this reversible code "0000s" represents the sign of LEVEL. When "s" is "0", the size of LEVEL is positive. When "s" is "1", the sign of LEVEL is negative.

Figure 19:
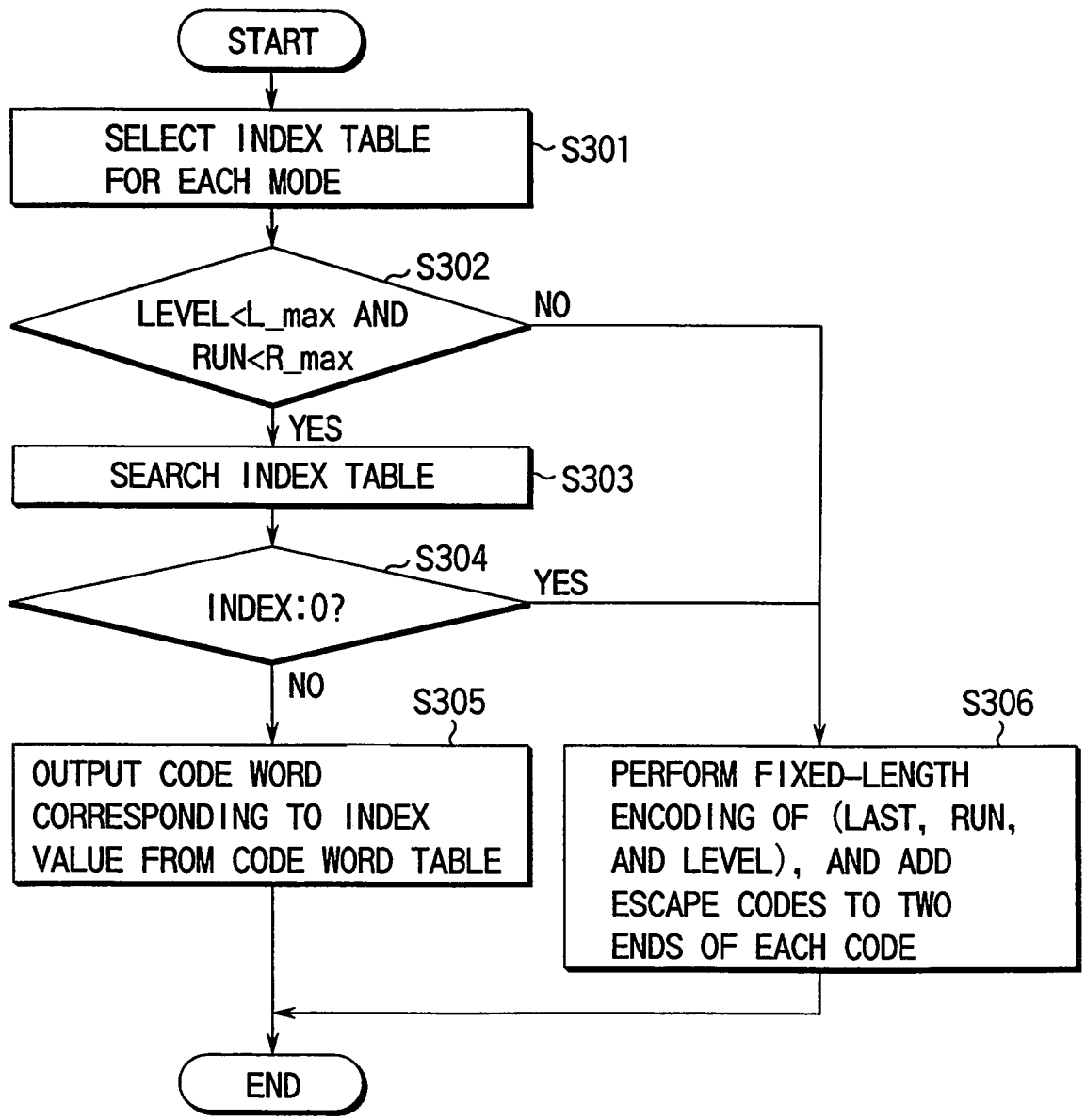
FIG. 19 is a flow chart for explaining a procedure by which the encoder of the video ending/decoding system variable-length-encodes the DCT coefficients of a video signal by using a reversible code.
Figure 37:
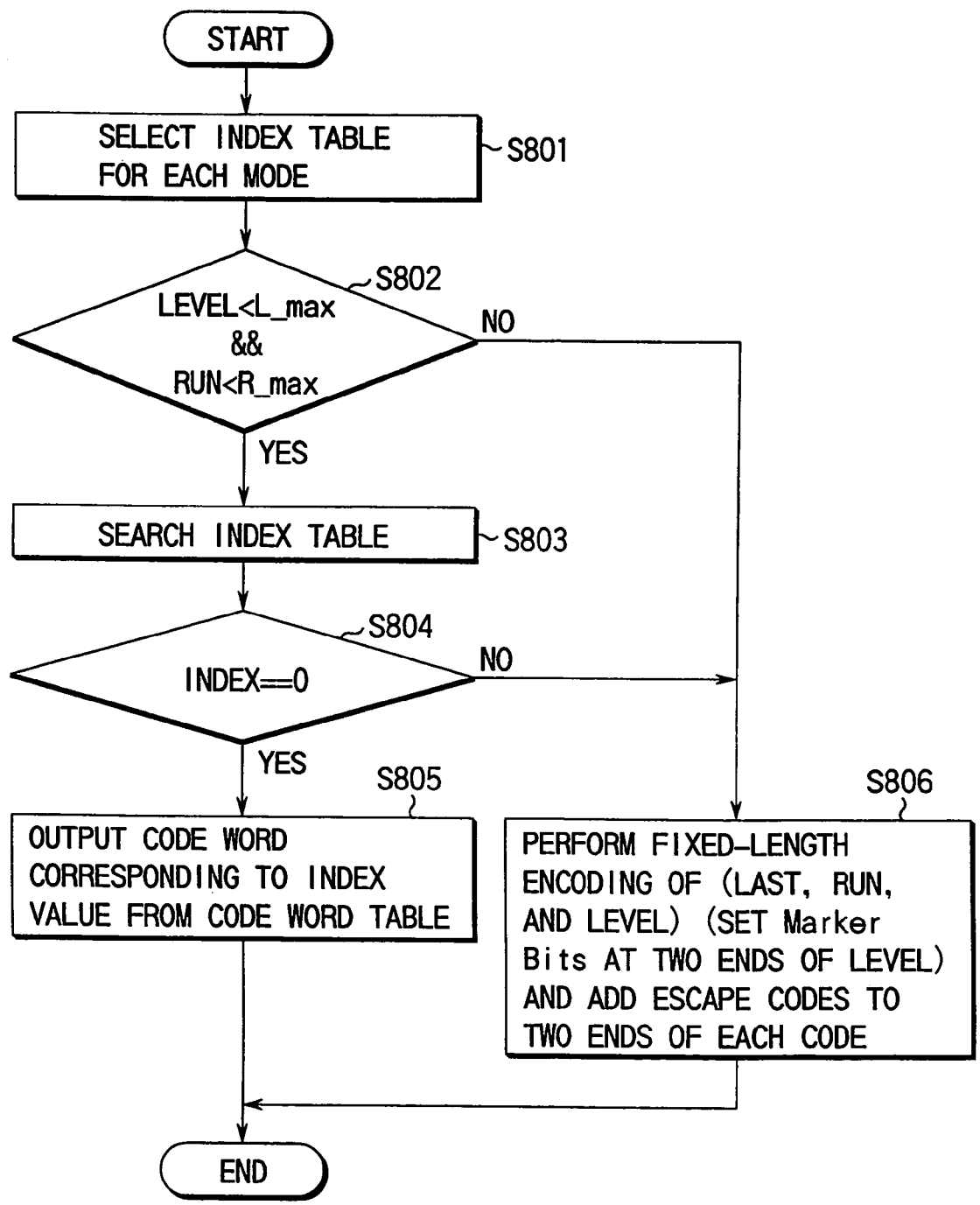
FIG. 37 is a flow chart showing a procedure for encode processing in the use of the encoded data sequence in FIG. 35 or 36.

FIG. 37 shows a procedure for lower layer variable-length encode processing which corresponds to FIG. 19.

Steps S801 to S805 are the same as steps S301 to S305 in FIG. 19. This procedure differs from that in FIG. 19 in step S806. In this case, Marker Bits are set at the two ends of LEVEL.

Figure 38:
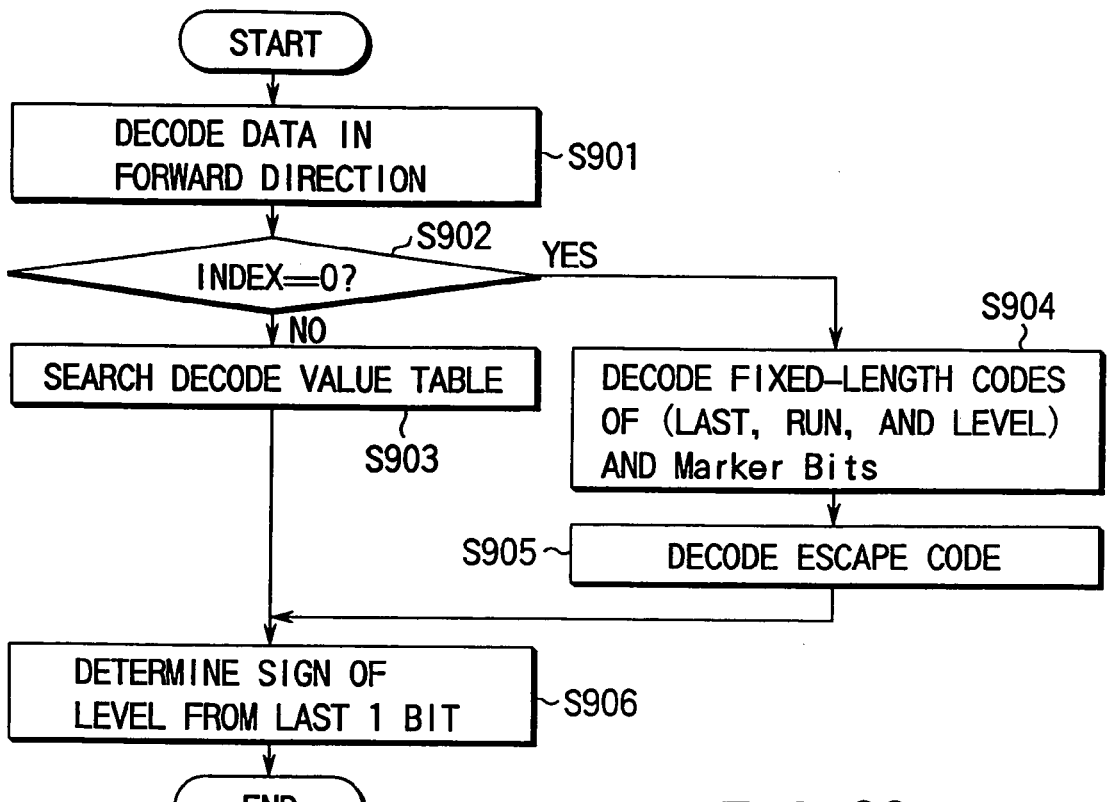
FIG. 38 is a flow chart showing a procedure for encode processing in the use of the encoded data sequence in FIG. 35 or 36.
Figure 39:
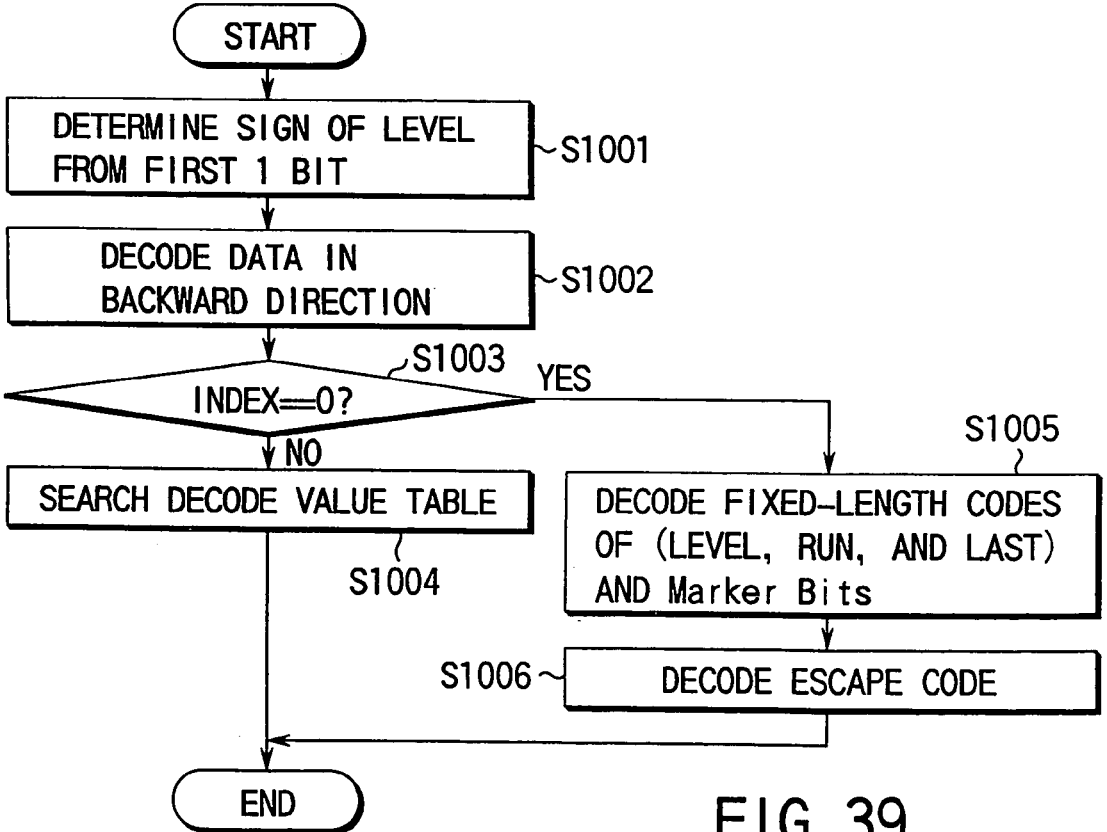
FIG. 39 is a flow chart showing a procedure for decode processing in the use of the encoded data sequence in FIG. 35 or 36.

FIGS. 38 and 39 show reversible code decoding methods respectively performed by the forward decoder 704 and the backward decoder 708.

Figure 20:
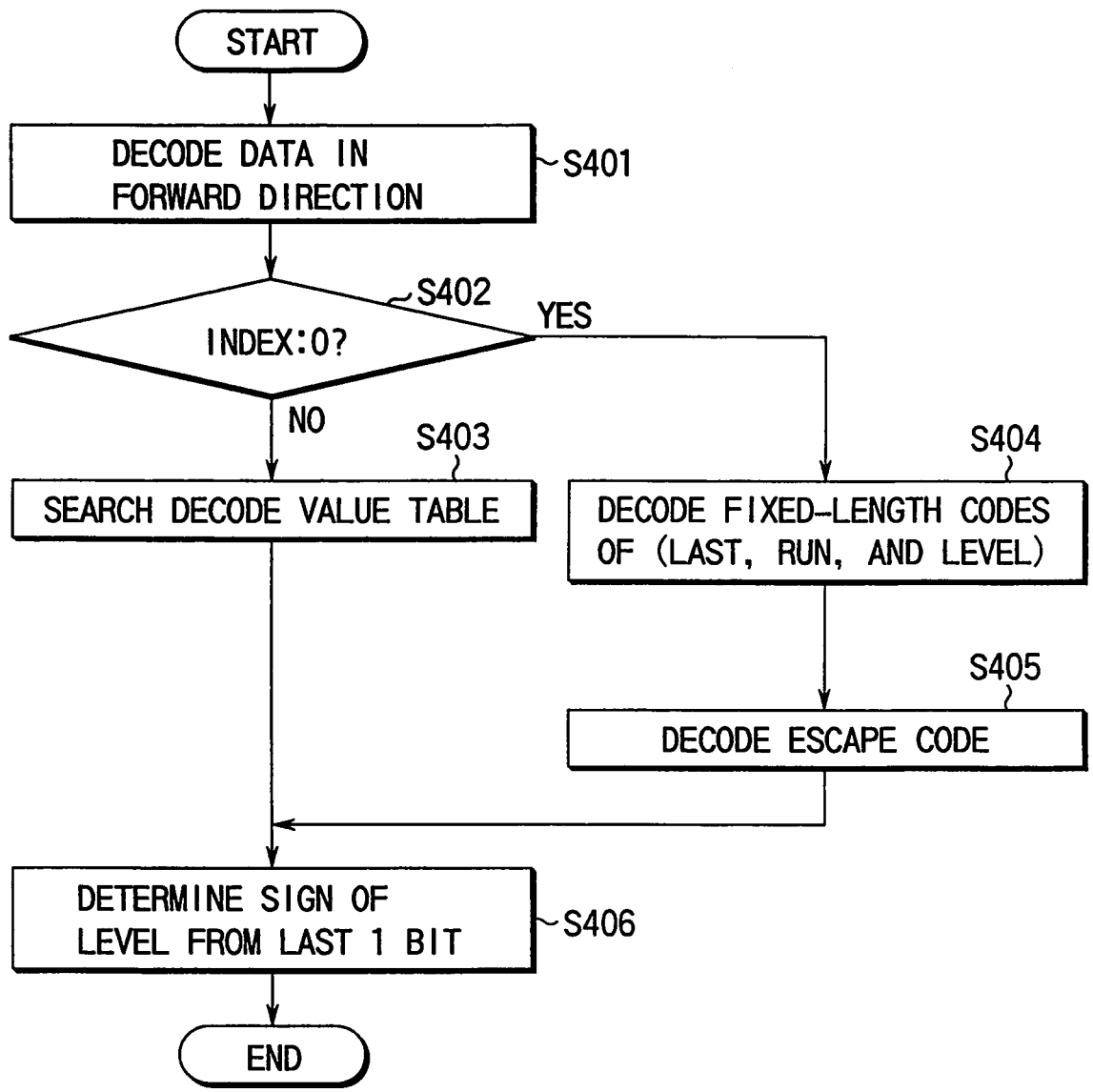
FIG. 20 is a flow chart for explaining a procedure by which the forward decoder of the video encoding/decoding system variable-length-decodes encoded data containing a reversible code.

Steps S901, S902, S903, S905, and S906 in the forward decode processing in FIG. 38 are the same as steps S401, S402, S403, S405, and S406 constituting the forward decode processing in FIG. 20. This processing differs from that in FIG. 20 in step S904. In step S904, the fixed-length codes of (LAST, RUN, LEVEL) following an ESCAPE code and Marker Bit are decoded as well as the fixed-length codes of (LAST, RUN, LEVEL) following the ESCAPE code.

Figure 21:
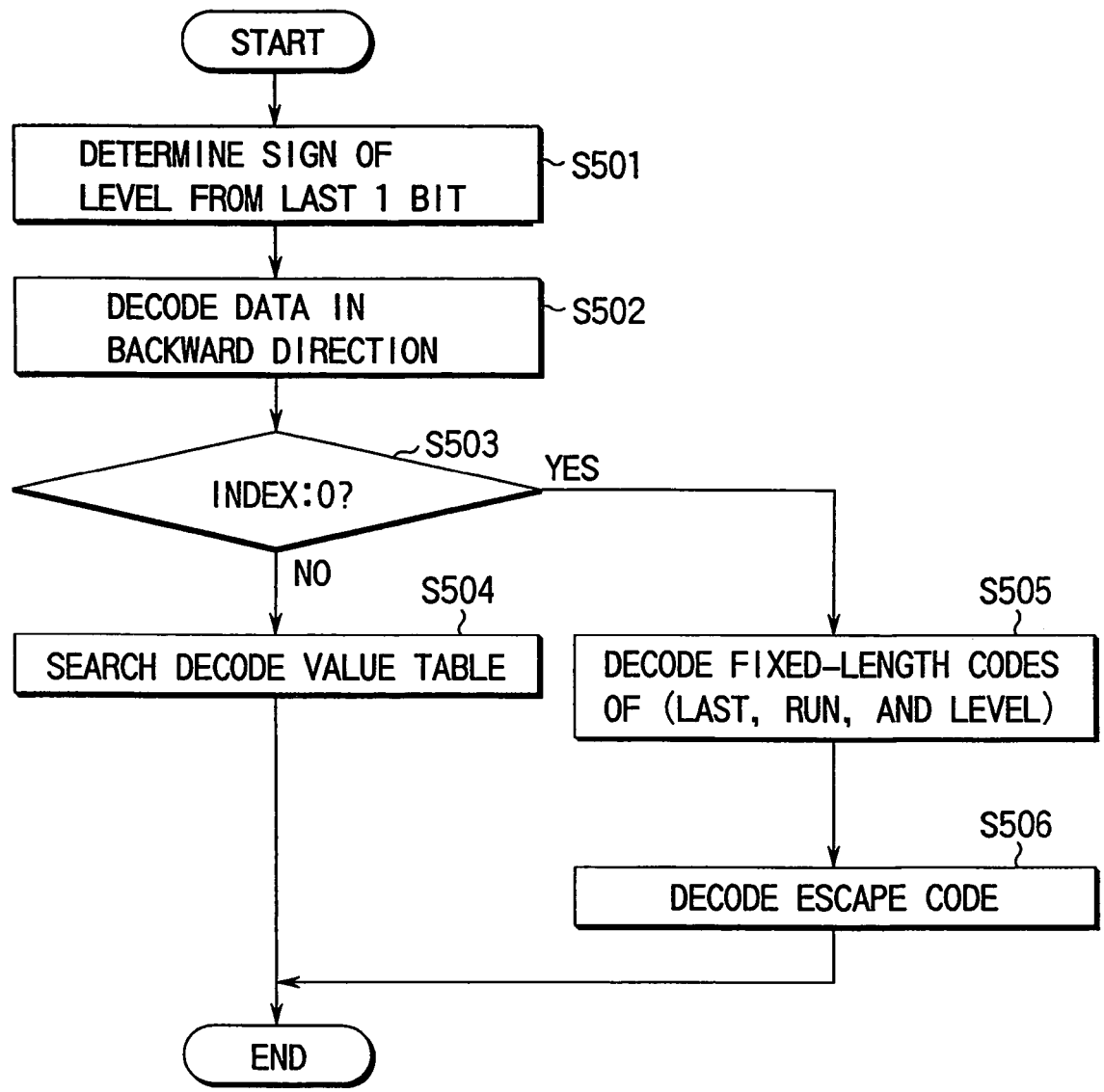
FIG. 21 is flow chart for explaining a procedure by which the backward decoder of the video encoding/decoding system variable-length-decodes encoded data containing a reversible code.

Similarly, steps S1001, S1002, S1003, S1005, and S1006 are the same as steps S501, S502, S504, S505, and S506 constituting the backward decode processing in FIG. 21. This procedure differs from that in FIG. 21 in step S1005. In this case, the fixed-length codes of (LEVEL, RUN, LAST) and Marker Bit are decoded as well as the fixed-length codes of (LEVEL, RUN, LAST).

In this case, as a format having ESCAPE codes added to the two ends of a code sequence, the format in which RUN consists of 6 bits and LEVEL consists of either 7 or 11 bits is exemplified. The numbers of bits are not limited to these.

FIG. 36 shows another format having ESCAPE codes added to the two ends of a code sequence. If, for example, the fixed-length code of LEVEL is long and exceeds the zero run limit, Marker Bit is preferably inserted between the fixed-length codes of LEVELs, as shown in FIG. 36. If, for example, the code length of a sync code such as a resync marker is 17 bits (zero run of 16 bits+1: "00000000000000001"), the run of zeros is limited not more than 15 bits to avoid confusion between the sync word and other code words. In this case, if the fixed-length code of LEVEL is long, and the run of zeros may exceed 16 bits, Marker Bit is inserted between the fixed-length codes of LEVELs, as shown in FIG. 36. This can avoid confusion between the fixed-length code of LEVEL and a sync word even if the fixed-length code length is long.

Figure 40:
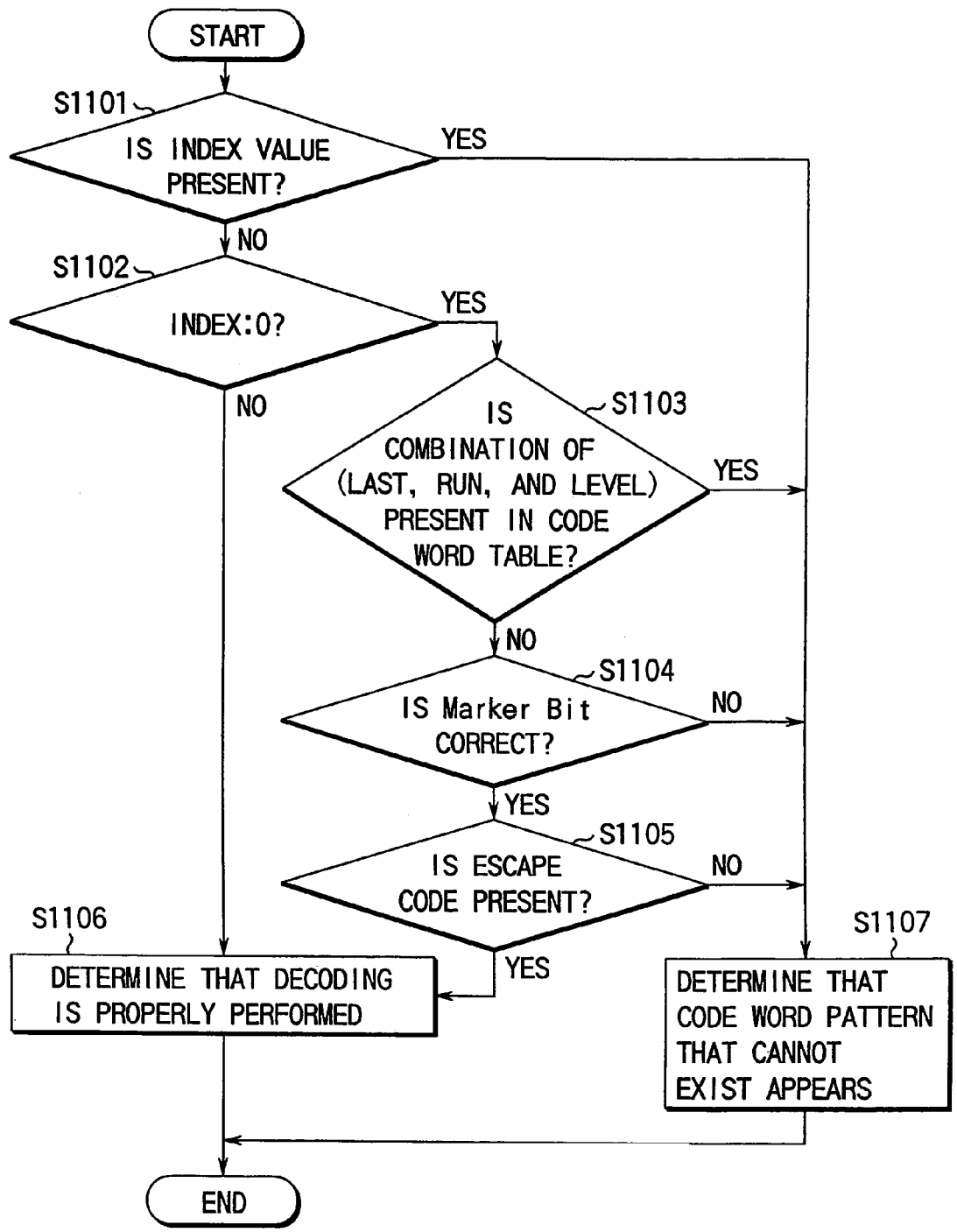
FIG. 40 is a flow chart showing an error detection procedure used when the encoded data sequence in FIG. 35 or 36 is used.

FIG. 40 is a flow chart showing a method of detecting a code word pattern in which no AC-DCT portion exists. This flow chart corresponds to FIG. 32.

To check whether the code word is present in a code word table, it is checked whether an INDEX value is present (step S1101). If the INDEX value is not present, a code word pattern that cannot exist has occurred (step S1107).

If the INDEX value is present, it is checked whether the INDEX value is 0 (step S1102). If the INDEX is 0, it indicates that encoding is performed by using an ESCAPE code. In this case, a combination of (LAST, RUN, and LEVEL) is decoded to check whether the combination is present in the code word table (step S1103). If the combination is present in the code word table, a code word pattern that cannot exist has occurred (step S1107).

It is also checked whether Maker Bit is correct (step S1104). If Marker Bit is not correct, a code word pattern that cannot exist has occurred (step S1107).

If the INDEX value is not 0, it indicates that decoding has been properly performed (step S1106).

If Maker Bit is correct in the case of the combination that cannot exist in the code word table, it is checked whether an ESCAPE code is present at the end of the fixed-length code (step S1105). If no ESCAPE code is present, a code word pattern that cannot exist has occurred (step S1107). If an ESCAPE code is present, it indicates that decoding has been properly performed (step S1106).

As described above, in this case, the processing of determining whether Marker Bit is correct is added to error detection processing performed in each of forward decode processing and backward decode processing.

(Still Another Format Having ESCAPE Codes Added to Two Ends of Code Sequence)

FIGS. 41 and 42 show still another format having ESCAPE codes added to the two ends of a code sequence. Assume that a LEVEL value is expressed in a two's-complement form. In this case, since the sign of LEVEL is specified by a code word of LEVEL, an ESCAPE code at the end of the code sequence is "00001", and the code "s" representing the sign of LEVEL is not used.

RUN and LEVEL values are respectively converted into fixed-length codes by using the RUN fixed-length code word table in FIG. 27 and the LEVEL fixed-length code word table in FIG. 41. At this time, Marker Bits "1" are set at the two ends of LEVEL to limit the run of zeros. As shown in FIG. 42, one bit corresponding to a LAST value is added to the beginning of this code sequence. In addition, ESCAPE codes are added to the two ends of the code sequence.

The insertion of Marker Bit between the end of LEVEL and the ESCAPE code can be omitted depending on the fixed code length of LEVEL. FIG. 43 shows an example of this case. FIG. 43 shows a case wherein the fixed code length of LEVEL is 12 bits.

The run of zeros of LEVEL is (fixed code length of LEVEL—2) bits. If, therefore, the fixed code length of LEVEL is 13 bits or less, even if the run of zeros of the ESCAPE code at the end, which is 4 bits, is added to the fixed code length, the sum of runs of zeros is smaller than the limit value (16 bits) set for a 16-bit sync code.

Figure 44:
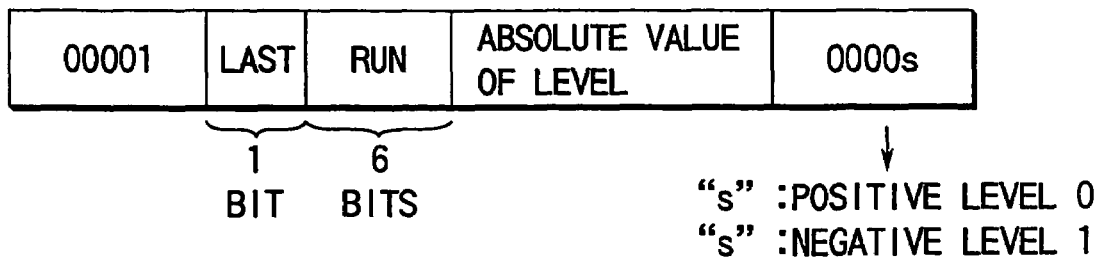
FIG. 44 is a view showing still another arrangement of the encoded data sequence.
Figure 45:
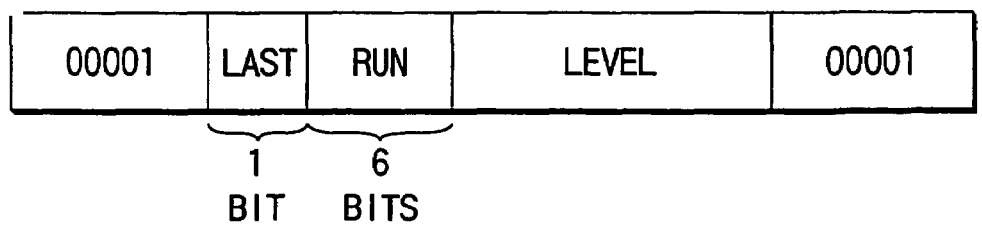
FIG. 45 is a view showing still another arrangement of the encoded data sequence in the use of the LEVEL fixed-length code word table in FIG. 41.

In addition, since the zero run limit is determined by the number of bits of a sync code as described above, if the code length of a sync code is set to be long, the insertion of Marker Bit can be omitted regardless of whether an absolute value or a two's-complement number is used as a code word of LEVEL, as shown in FIGS. 44 and 45.

Figure 46:
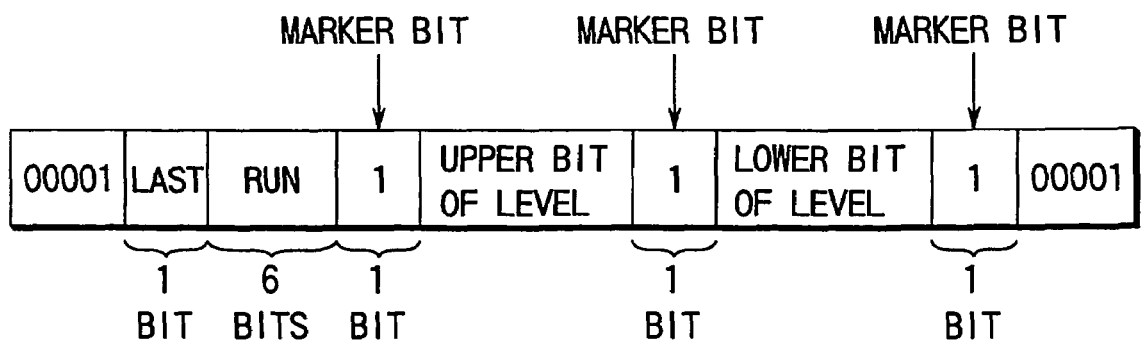
FIG. 46 is a view showing still another arrangement of the encoded data sequence in the use of the LEVEL fixed-length code word table in FIG. 41.

In contrast to this, even if a code word of LEVEL is expressed in a two's-complement form, Marker Bit may be inserted in the code of LEVEL so as not to exceed the zero run limit in the same manner as in FIG. 36. FIG. 46 shows an example of this case.

Figure 47:
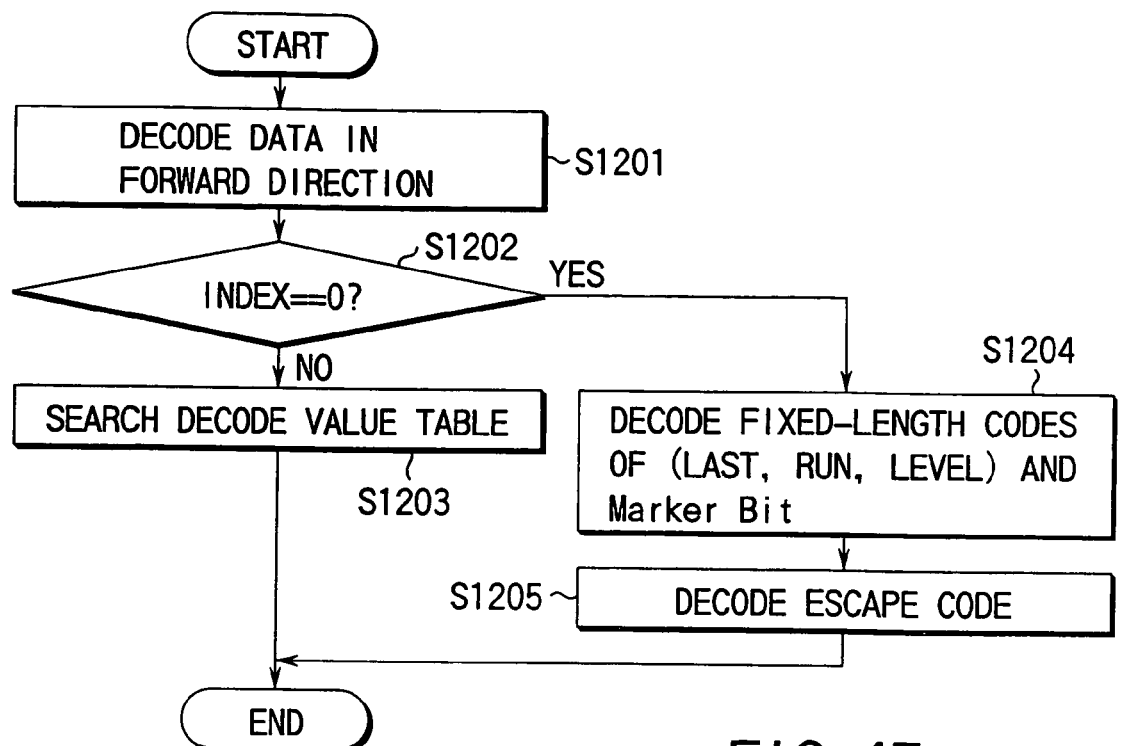
FIG. 47 is a flow chart showing a procedure for forward decode processing used when the encoded data sequence in FIG. 42, 43, or 46 is used.

FIG. 47 shows a case wherein a code word of LEVEL is expressed in a two's-complement form, and Marker Bit is inserted in the code word, i.e., a procedure for forward decode processing to be performed when the encoded data sequence shown in FIG. 42, 43, or 46 is used.

This processing differs from the forward decode processing in FIG. 38 in which an absolute value is used as a code word of LEVEL in that step S906 is omitted. More specifically, when a code word of LEVEL is expressed in a two's-complement form, the sign of LEVEL is also determined in decode processing for the fixed-length codes of (LAST, RUN, and LEVEL) and Marker Bit in step S204.

Figure 48:
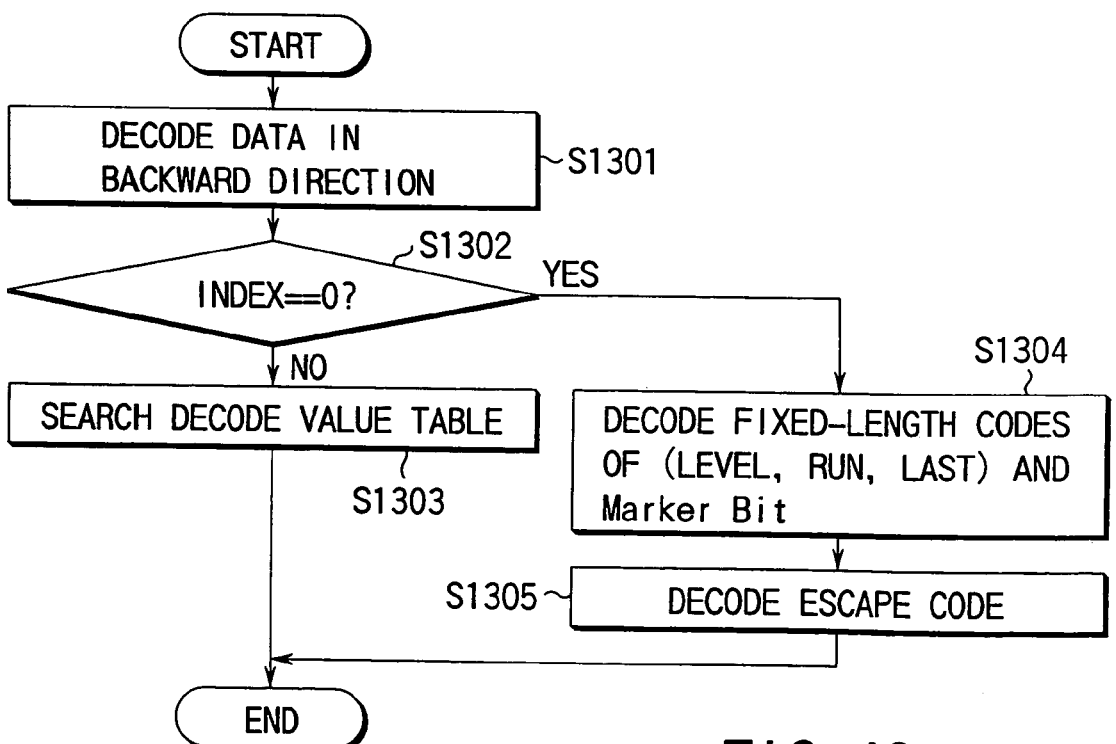
FIG. 48 is a flow chart showing a procedure for backward decode processing used when the encoded data sequence in FIG. 42, 43, or 46 is used.

FIG. 48 shows a case wherein a code word of LEVEL is expressed in a two's-complement from, and Marker Bit is inserted in the code word, i.e., a procedure for backward decode processing to be performed when the encoded data sequence shown in FIG. 42, 43, or 46 is used.

This processing differs from the backward decode processing (FIG. 39) using an absolute value as a code word of LEVEL in that step S1301 is omitted. More specifically, when a code word of LEVEL is expressed in a two's-complement form, the sign of LEVEL is also determined in decode processing for the fixed-length codes of (LEVEL, RUN, LAST) and Marker Bit in step S1304.

Figure 49:
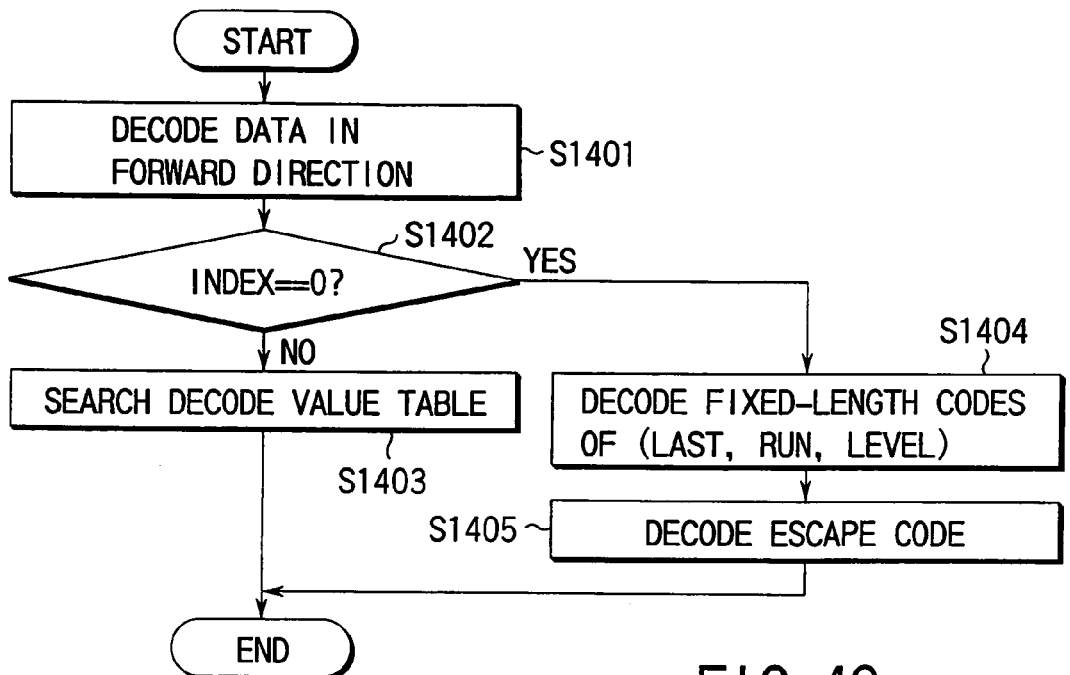
FIG. 49 is a flow chart showing a procedure for forward decode processing used when the encoded data sequence in FIG. 45 is used.

FIG. 49 shows a case wherein a code word of LEVEL is expressed in a two's-complement form, and Marker Bit is not used, i.e., a procedure for forward decode processing to be performed when the encoded data sequence in FIG. 45 is used. This processing differs from that in FIG. 47 in that only the fixed-length codes of (LAST, RUN, LEVEL) are decoded in step S1204.

Figure 50:
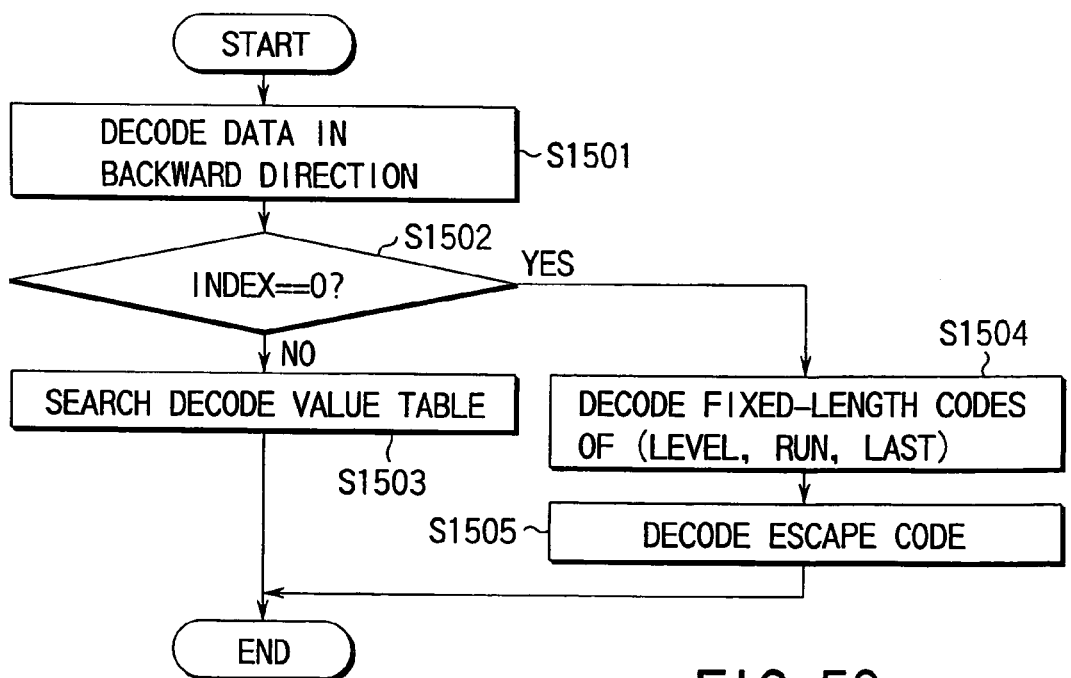
FIG. 50 is a flow chart showing a procedure for backward decode processing used when the encoded data sequence in FIG. 45 is used.

FIG. 50 shows a case wherein a code word of LEVEL is expressed in a two's-complement form, and Marker Bit is not used, i.e., a procedure for backward decode processing to be performed when the encoded data sequence in FIG. 45 is used. This processing differs from that in FIG. 48 in that only the fixed-length codes of (LEVEL, RUN, LAST) are decoded in step S1505.

(Third Embodiment)

An error range estimating method which can be applied to decode value determination processing in the first and second embodiments will be described as the third embodiment of the present invention.

Figures 51, 52:
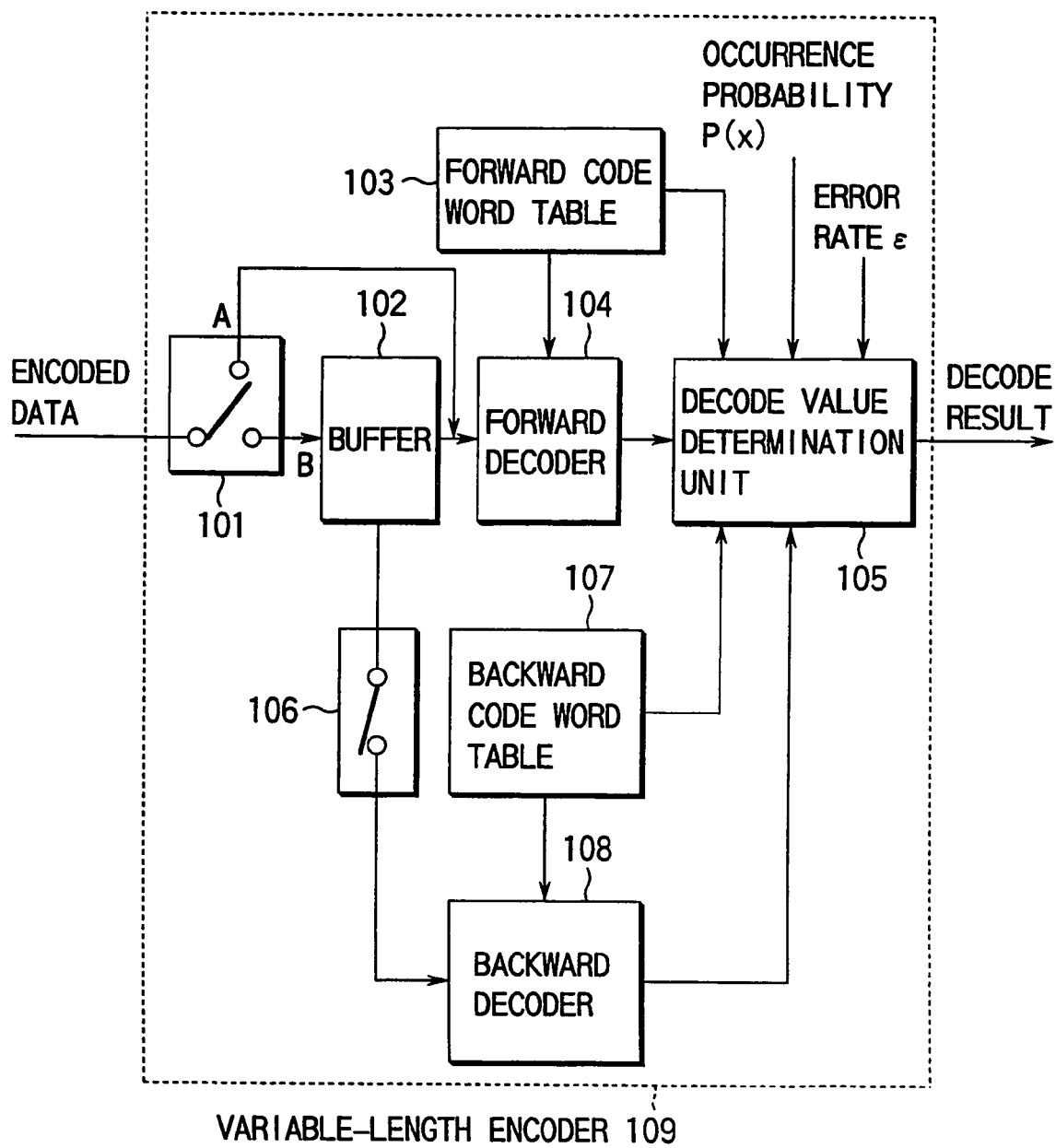
FIG. 51 is a block diagram showing the arrangement of a variable-length decoding apparatus according to the third embodiment of the present invention.
FIG. 52 is a view showing a code that does not satisfy the Kraft inequality with an equal sign.

FIG. 51 is a block diagram showing the arrangement of a variable-length decoder 109 according to the third embodiment of the present invention.

The variable-length decoder 109 is designed to decode encoded data containing variable length codes in units of sync sections as in the first and second embodiments, and has the same basic arrangement as that of the first and second embodiments.

In the variable-length decoder 109, when encoded data is a variable length code that can be decoded only in the forward direction, a switch S is connected to A, and normal forward decoding is performed by a forward decoder 104. The encoded data decoded by the forward decoder 104 is sent to a decode value determination unit 105.

When the encoded data is a reversible variable length code that can be decoded in both the forward and backward directions, the switch 101 is connected to B, and the encoded data is stored in a buffer 102. After the total number of bits of the encoded data is checked, the data is decoded by the forward decoder 104.

If an error is detected by the forward decoder 104, a switch 106 is turned on, and the encoded data stored in the buffer 102 is decoded by a backward decoder 108 in the backward direction.

In the forward decoder 104 and the backward decoder 108, when, for example, a code that cannot exist appears, it is determined that an error has occurred.

The decode value determination unit 105 determines a final decode result on the basis of a combination of the decode results respectively obtained by the forward decoder 104 and the backward decoder 108.

The operation of the decode value determination unit 105 for the encoded data of a reversible variable length code will be described below.

In the third embodiment, a final decode value is determined by estimating an error range from the encoded data error detection positions detected in forward and backward decode processing, the error rate in the transmission system or storage system, the occurrence probability of each code word, and the bit pattern of each code word in a code word table. In the first and second embodiments, a range preceding an error detection position by a predetermined amount (T code words) is specified as an error propagation range in a fixed manner. In contrast to this, in the third embodiment, an optimal value of T is obtained by estimating an error propagation range.

It is known that the code length of a Huffman code obtained by optimal encoding of a memoryless information source satisfies the following Kraft inequality with an equal sign if the code is two-dimensional.

$$\sum_{x \in X} 2^{-l(x)} = 1 \quad (1)$$

where x is a code word of a code X, and l(x) is the code length of x.

When sync sections are set, and sync codes are inserted as in the present invention, since design is made to prevent a collision with a sync code pattern (e.g., 000, . . . , 01), a code that does not satisfy the Kraft inequality with an equal sign is used.

$$\sum_{x \in X} 2^{-l(x)} < 1 \quad (2)$$

In codes like those shown in FIGS. 56, 57A, 57B, and 57C, "0000" is designated as a forbidden code word to prevent a collision with a sync code. In such a code, when a variable length code cannot be properly decoded upon mixing of an error, and the pattern "0000" that cannot exist appears, the occurrence of an error can be detected.

In a communication channel model of the transmission system or storage system for transmitting or storing encoded data, if a two-dimensional symmetrical communication channel with an error rate ε (0<ε<1) as shown in FIG. 58 is assumed, a conditional probability $P_{(y|P(y|x)x)}$ of transmission of a code word x and reception of a reception sequence y can be given as follows, without consideration of bit insertion and loss.

$$P_{(y|x)} = \begin{cases} \varepsilon^{d(x,y)}(1-\varepsilon)^{l(x)-d(x,y)} & l(x) = l(y) \\ 0 & l(x) \neq l(y) \end{cases} \quad (3)$$

where d(x,y) is the Hamming distance between the sequence x and the sequence y.

Consequently, a probability P(y) of reception of the sequence y is given by $$P(y) = \sum_{x \in X} P(x)P(y \mid x) \quad (4)$$

Assume that the number of code words of the code X is finite, and P(x)>0 for all code words x.

However, in order to analyze the state between the instant at which a bit stream is input and the instant at which an error is detected, a state (initial state I) in which at least a 1-bit error is included must be considered.

Since the probability that the code word x does not include even a 1-bit error is given by $(1-\varepsilon)^{l(x)}$, the conditional probability that each code word includes at least 1 1-bit error can be given by $$P'(y \mid x) = \begin{cases} \dfrac{P(y \mid x)}{1-(1-\varepsilon)^{l(x)}} & d(x, y) \neq 0 \\ 0 & d(x, y) = 0 \end{cases} \quad (5)$$

$$P'(y) = \sum_{x \in X} P(x)P'(y \mid x)$$

Consider a target code that can be instantaneously decoded. In this case, the reception sequence y without any error starts from the root of a code tree and always reaches a leaf portion of the code tree.

In the presence of an error, however, the reception sequence y may start or may be received in the state of a node as well as a leaf portion of the code tree, and hence can be expressed by a state transition diagram like that of FIG. 55. Since a transition probability $t_{ij}$ to each state is given by $$t_{ij} = \begin{cases} \sum_{y \in Y} P'(y)V(y, i \to j) & i = 1 \\ \sum_{y \in Y} P(y)V(y, i \to j) & i \geq 2 \end{cases} \quad (6)$$

the state transition probability $t_{ij}$ of transition from a state i to a state j can be obtained. In this case, a function V(y, i→j) takes the value 1 if the reception sequence y makes a transition from the state i to the state j; otherwise, the value 0.

In this case, the respective states are defined as follows:

| | | |
|---|---|---|
| I | initial state | |
| S | synchronous state | |
| $U_i$ | asynchronous state | i = 1, . . ., N − 2 |
| E | error detection state | |

FIG. 55 shows an example of the state transition diagram of a code word. FIG. 56 shows a code word state transition table.

A matrix T is a portion, of the state transition table, which is obtained by excluding an error detection probability from each state and is defined as $$T = \begin{pmatrix} t_{11} & t_{12} & \cdots & t_{1N} \\ \vdots & \vdots & \ddots & \vdots \\ t_{N1} & t_{N2} & \cdots & t_{NN} \end{pmatrix}. \quad (7)$$

Assume that a vector D is the probability of transition from each state to the error detection state E.

$$D = (t_{1N+1}, t_{2N+1}, \ldots, t_{NN+1})^T \quad (8)$$

Since a transition starts from the initial state I, the initial probability of each state excluding the error detection state E can be given by $$Q(0) = (1, 0, \ldots 0) \quad (9)$$

the probability of each state excluding the error detection state E after i code words can be calculated by $$Q(i) = Q(0)T^{i-1} \quad (10)$$

The probability of detection of an error after i code words is therefore the probability detected next in each state after i−1 code words, and hence can be expressed as $$R(i) = Q(i-1)D = Q(0)T^{i-1}D \; i=1, 2, \quad (11)$$

where $T^0$ is a unit matrix I.

When the estimated probability a is set, the number of code words from which errors can be detected with the set probability can be calculated.

$$a < \sum_{i=1}^{j} R(i) \quad (12)$$

When F(a) is set by obtaining a minimum value of j, as expressed above, an error range can be estimated in terms of probability. F(a) corresponds to T in the first and second embodiments, as previously described.

That is, an error is present with the probability a in a range preceding an error detection position by F(a) code words. In addition, from the viewpoint of decode processing, with this value, a portion to which an error may have propagated can be removed with the probability a by retracing the code by F(a) code words from an error detection position.

The decode value determination unit 105 calculates a range $F_1(a)$ in which an error is present in the forward direction and a range $F_2(a)$ in which an error is present in the backward direction on the basis of a forward code word table 103, a backward decoder 108, the probability P(x) of occurrence of a code word, the error rate $\epsilon$ in the communication channel, and the estimated probability a, and determines a portion to be discarded in accordance with a relationship with the error detection positions.

Figure 57A:
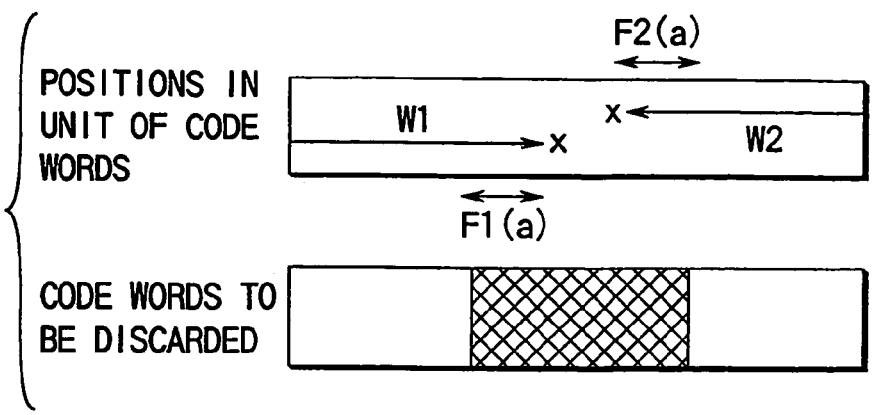
FIGS. 57A, 57B, and 57C are views showing the decoding operation of a decode value determination unit in the third embodiment.

If the error detection position in the forward direction and the error detection position in the backward direction do not cross each other as shown in FIG. 57A, the range to be discarded is increased by retracing the encoded data by the ranges $F_1(a)$ and $F_2(a)$ in which the errors are present.

Figure 57B:
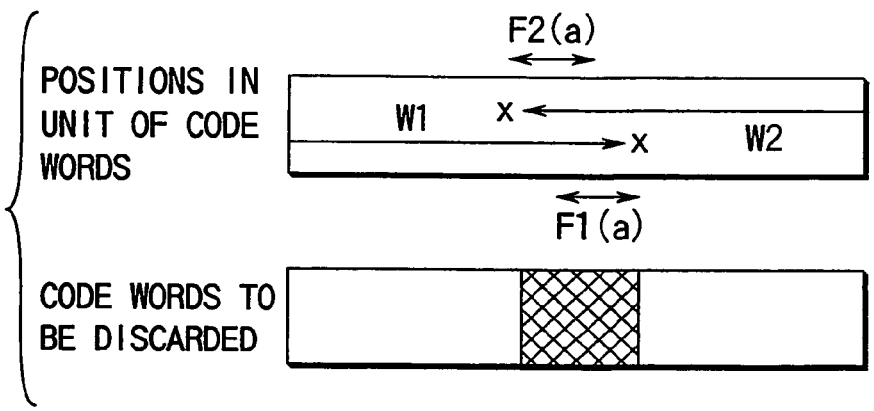

If the error detection position in the forward direction and the error detection position in the backward direction cross each other and the crossing range is larger than the range in which the errors are present, as shown in FIG. 57B, the crossing range is determined as a range to be discarded.

Figure 57C:
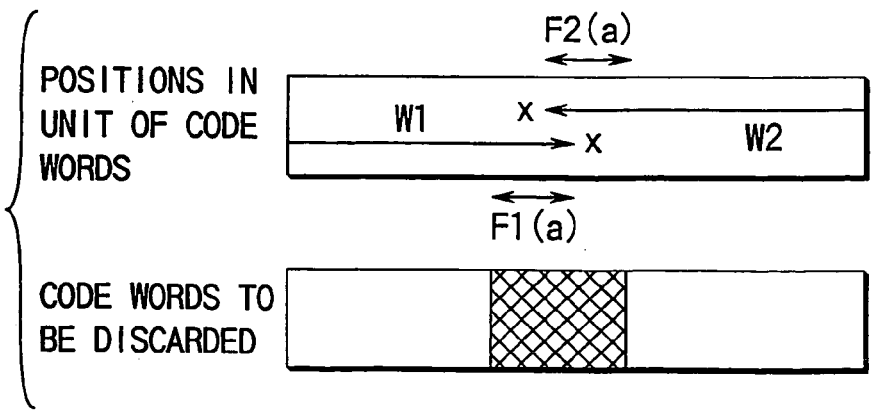

If the error detection position in the forward direction and the error detection position in the backward direction cross each other and the crossing range is smaller than the error range in which the errors are present, as shown in FIG. 57C, the range in which the errors are present is determined as a range to be discarded.

In addition, an error range can be estimated from the number of bits by multiplying F(a) by an average code length.

$$B(a) = F(a) \sum_{x \in X} P(x) 1(x) \quad (13)$$

Figure 58A:
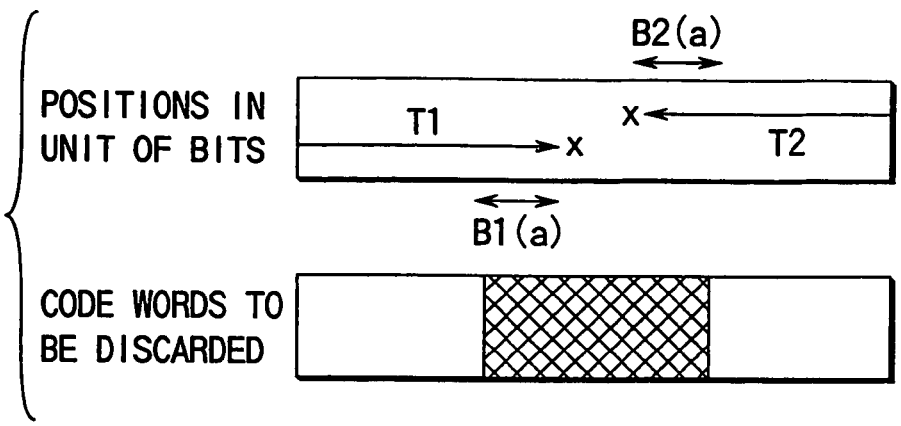
FIGS. 58A, 58B, and 58C are views showing another decoding operation of the decode value determination unit in the third embodiment.
Figure 58B:
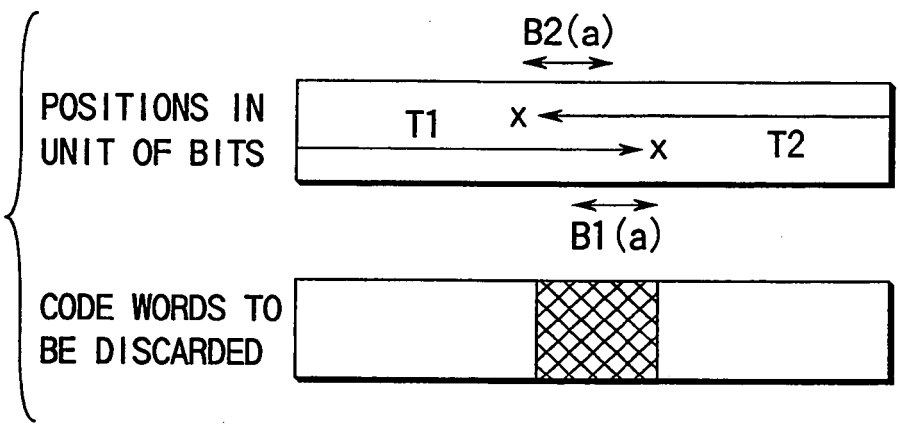
Figure 58C:
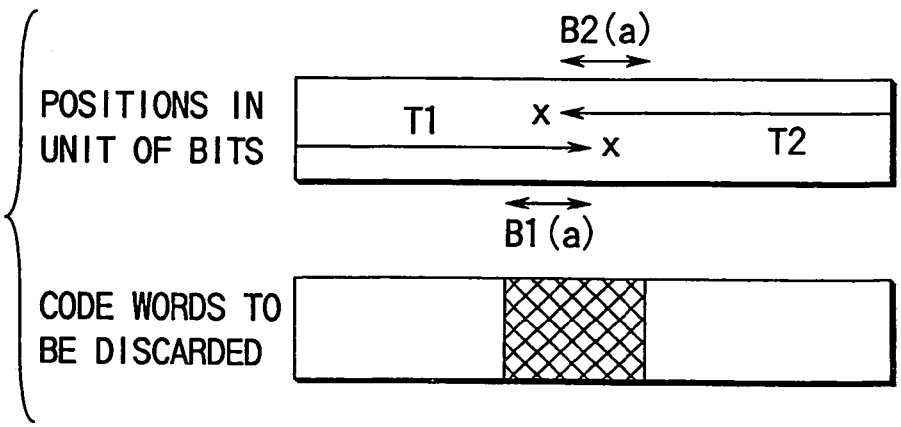

In this case, the decode value determination unit 105 operates in the manner shown in FIG. 58A, 58B, or 58C. If the error detection position in the forward direction and the error detection position in the backward direction do not cross each other as shown in FIG. 58A as in the case shown in FIG. 57A, 57B, or 57C, the range to be discarded is increased by retracing the encoded data by the ranges $B_1(a)$ and $B_2(a)$ in which the errors are present.

If the error detection position in the forward direction and the error detection position in the backward direction cross each other and the crossing range is larger than the range in which the errors are present, as shown in FIG. 58B, the crossing range is determined as a range to be discarded.

If the error detection position in the forward direction and the error detection position in the backward direction cross each other and the crossing range is smaller than the error range in which the errors are present, as shown in FIG. 58C, the range in which the errors are present is determined as a range to be discarded.

Although the third embodiment has exemplified the variable-length decoder capable of directional decoding, the present invention can also be applied to a variable-length decoder capable of only normal forward decoding.

As described above, in the variable-length decoding apparatus of the third embodiment, decode processing is performed in the following procedure: 1) decoding encoded data in the forward direction until detection of an error in the encoded data, 2) decoding the encoded data in the backward direction upon detection of an error in the encoded data in forward decoding, and 3) estimating a range in which the errors are present on the basis of the forward and backward decode results, the encoded data error detection positions respectively detected in the forward and backward decoding, the error rate in the transmission system or storage system, the occurrence probability of each code word, and the bit pattern of each code word in the code word table, thereby determining a final decode value.

As described above, the probability that an incorrect code word is erroneously decoded as a correct code word can be decreased to a predetermined probability or less by estimating the actual positions of errors from error detection positions in terms of probability in accordance with the error rate in the transmission system or storage system and the performance of code words.

Note that the procedures for decode processing performed by the variable-length decoding apparatuses of the first to third embodiments described above can be implemented by computer programs stored in recording media such as a computer readable CD-ROM, DVD-ROM, and DVD-RAM. Even a computer having no dedicated hardware for variable-length decoding can therefore perform decode processing with little influences of errors contained in encoded data. In addition, part or all of the hardware of the variable-length decoding apparatus according to each of the first to third embodiments can be mounted, and its operation control can be performed by computer programs.

(Fourth Embodiment)

Figure 59:
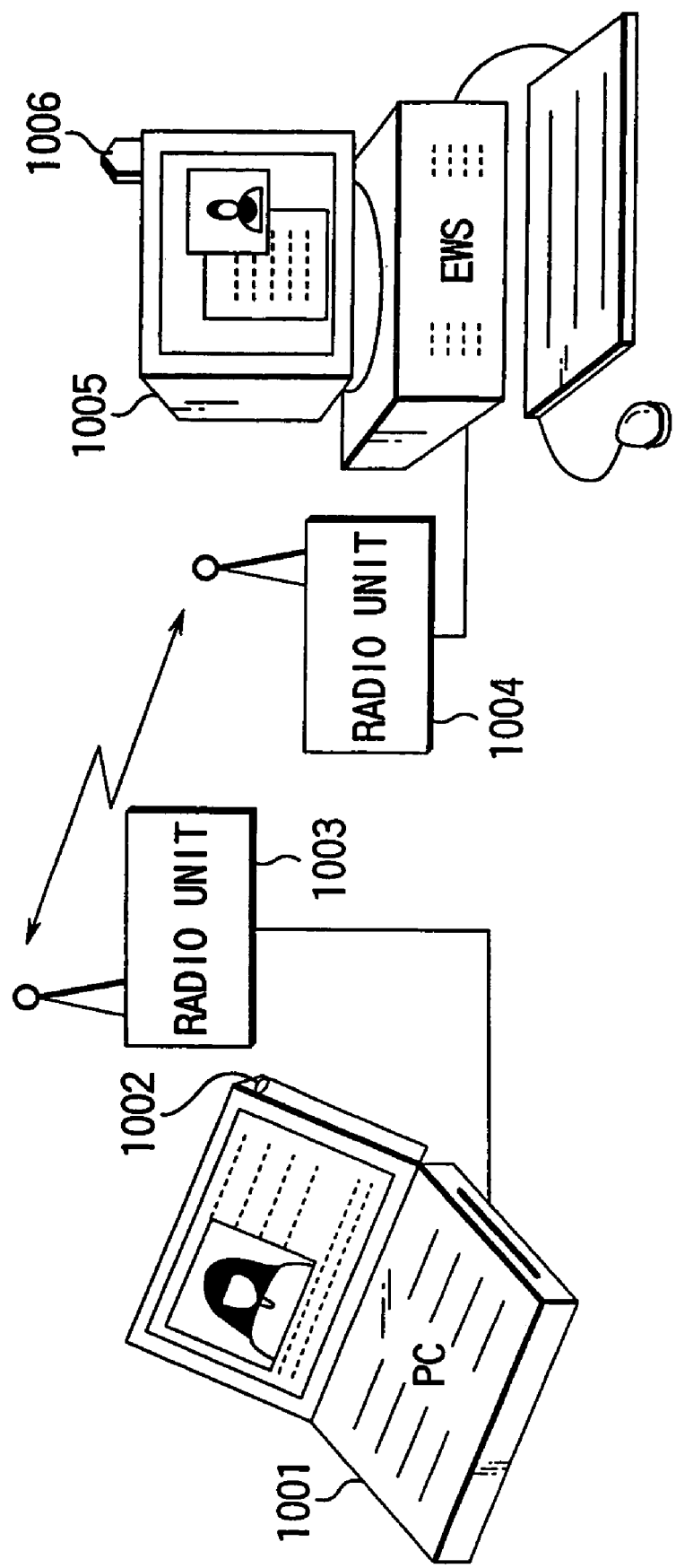
FIG. 59 is a view showing a system in which the variable-length decoding apparatus of the present invention is incorporated.

An example of a video encoding/decoding system incorporating the variable-length encoding/decoding apparatus according to each of the first to third embodiments of the present invention will be described as an application of the present invention with reference to FIG. 59. The image signal input through a camera 1002 mounted on a personal computer (PC) 1001 is encoded by the video encoder or video encoding software incorporated in the PC 1001. The encoded data is multiplexed with other information such as speech information and data information. The resultant data is transmitted from a radio unit 1003 by radio and is received by another radio unit 1004. The signal received by the radio unit 1004 is demultiplexed into the encoded data of the image signal and the speech data. Of these data, the encoded data of the image signal is decoded by the video decoder or video decoding software incorporated in a workstation (EWS) 1005 and is displayed on the display of the EWS 1005.

The image signal input through a camera 1006 mounted on the EWS 1005 is encoded by the video encoder or encoding software incorporated in the EWS 1005 as in the above case. The encoded data is multiplexed with other information such as speech information and data information. The resultant data is transmitted from the radio unit 1004 by radio and is received by the radio unit 1003. The signal received by the radio unit 1003 is demultiplexed into the encoded data of the image signal and the speech information or data information. Of these data, the encoded data of the image signal is decoded by the video decoder or video decoding software incorporated in the PC 1001 and is displayed on the display of the PC 1001.

Note that the video decoding software is implemented by a program for causing the computer to execute the procedure for variable-length decode processing described in each of the above embodiments.

In addition, the arrangements of the first to third embodiments and the formats of encoded data sequences described above can be used in combination, as needed.

As has been described above, according to the present invention, there is provided a variable-length decoding apparatus and method, which can decrease the possibility of decoding an incorrect code word as a correct code word by using error detection positions in encoded data in units of bits and error detection positions in the encoded data in units of syntax, and can reduce the influences of channel errors. In addition, with the application of the variable-length decoding apparatus and method of the present invention to video decode processing, the influences of channel errors in the display frame can be reduced even when encoded video signals are transmitted through an environment including many channel errors such as a radio communication channel. Furthermore, the probability of decoding an incorrect code word as a correct code word can be further decreased by estimating an error propagation range.

INDUSTRIAL APPLICABILITY

The video decoding apparatus of the present invention described above is suited to decoding variable-length encoded video information or the like that is encoded into a reversible variable length code decodable in both forward and backward directions and recorded on a recording medium or transmitted.

The invention claimed is:

1. A variable-length decoding apparatus comprising:
   an input unit which receives encoded data formed from a variable length code made up of reversible code words configured to be decoded in both a forward direction and a backward direction;
   a forward decoder which decodes the encoded data in each predetermined section in the forward direction;
   a backward decoder which decodes the encoded data in each predetermined section in the backward direction; and
   a decode value determination unit which outputs a final decode result from decode results respectively obtained by said forward decoder and said backward decoder,
   wherein each of said forward and backward decoders includes a detection unit for detecting an error in the encoded data, and
   said decode value determination unit determines a decode value by using an error detection position in the decoded data in units of syntax which is detected by said forward decoder and indicates an error position in the encoded data, and an error detection position in units of syntax which is detected by said backward decoder and indicates an error position in the encoded data.

2. A variable-length decoding apparatus according to claim 1, wherein said decode value determination unit uses, as the error detection position in the encoded data in units of syntax, an error detection position in units of code words which indicates which code word within a sync section of the encoded data has occurred the error.

3. A variable-length decoding apparatus according to claim 1, wherein when the error detection positions obtained by said forward and backward decoders cross in units of bits or syntax, said decode value determination unit discards encoded data belonging to an area between the error detection positions in which a crossing amount is larger, and uses a forward decode result as a decode value for code words up to a position immediately before the discarded data area, and a backward decode result as a decode value for code words from a position immediately after the discarded data area.

4. A variable-length decoding apparatus according to claim 1, wherein said decode value determination unit,
   (a) uses a forward decode result as a decode value for code words up to a position a predetermined amount before the error detection position in units of bits or syntax which is obtained by said forward decoder, and a backward decode result as a decode value for code words from a position a predetermined amount after the error detection position in units of bits or syntax which is obtained by said backward decoder, and discards the remaining encoded data when the error detection positions obtained by said forward and backward decoders do not cross each other in units of both bits and syntax,
   (b) uses a forward decode result as a decode value for code words up to a position immediately before the error detection position in units of syntax which is obtained by said backward decoder, and a backward decode result as a decode value for code words from a position immediately after the error detection position in units of syntax which is obtained by said forward decoder, and discards encoded data of a portion on which the error detection positions in units of syntax cross each other, when the error detection positions obtained by said forward and backward decoders do not cross each other in units of bits but cross each other in units of syntax, (c) uses a forward decode result as a decode value for code words up to a position immediately before the error detection position in units of bits which is obtained by said backward decoder, and a backward decode result as a decode value for code words from a position immediately after the error detection position in units of bits which is obtained by said forward decoder, and discards encoded data of a portion on which the error detection positions in units of bits cross each other, when the error detection positions obtained by said forward and backward decoders cross each other in units of bits but do not cross each other in units of syntax, and (d) selects a position where a crossing portion becomes largest as an error detection position, uses a forward decode result as a decode value for code words up to a position immediately before the error detection position obtained by said backward decoder and a backward decode result as a decode value for code words from a position immediately after the error detection position obtained by said forward decoder, and discards encoded data of a portion on which the error detection positions cross each other, when the error detection positions obtained by said forward and backward decoders cross each other in units of both bits and syntax.

5. A variable-length decoding apparatus according to claim 1, wherein said decode value determination unit determines a decode value by using an error detection position in the encoded data in units of bits which is detected by said forward decoder and indicates an error position in the encoded data, and an error detection position in the encoded data in units of bits which is detected by said backward decoder and indicates an error position in the encoded data in addition to the error detection position in the decoded data in units of syntax which is detected by said forward decoder and indicates the error position in the encoded data, and the error detection position in units of syntax which is detected by said backward decoder and indicates the error position in the encoded data.

6. A video decoding apparatus comprising:
an input unit which receives encoded data of a video signal containing a variable length code generated by encoding transform coefficients obtained by orthogonal transformation of the video signal by using reversible code words configured to be decoded in both a forward direction and a backward direction;
a sync section detection unit which detects a sync section of the encoded data;
a forward decoder which decodes encoded data in the forward direction in a predetermined sync section detected by said sync section detection unit;
a backward decoder which decodes encoded data in the backward direction in a predetermined sync section detected by said sync section detection unit; and
a decode value determination unit which outputs a final decode result from decode results obtained by said forward and backward decoders,
wherein each of said forward and backward decoders includes an error detection unit for detecting an error in the encoded data, and
said decode value determination unit determines a decode value by using an error detection position in the encoded data in units of bits and an error detection position in the decoded data in units of syntax, which are detected by said forward decoder and indicate an error position in the encoded data, and an error detection position in the encoded data in units of bits and an error detection position in units of syntax, which are detected by said backward decoder and indicate an error position in the encoded data.

7. A video decoding apparatus according to claim 6, wherein said decode value determination unit displays a previous frame for a macroblock from which encoded data is discarded or processes the macroblock in a mode without encoding when an intraframe encoding mode is set, and performs motion compensation when an interframe prediction encoding mode is set.

8. A video decoding apparatus according to claim 6, wherein each encoded data in the sync section includes transform coefficients of a plurality of macroblocks as a unit in performing prediction encoding for a video signal, and said decode value determination unit uses, as the error detection position in the encoded data in units of syntax, an error detection position in units of macroblocks which indicates which macroblock within the sync section has occurred an error.

9. A video decoding apparatus according to claim 6, wherein each encoded data in the sync section includes transform coefficients of a plurality of macroblocks as a unit in performing prediction encoding for a video signal, and said decode value determination unit, (a) uses a forward decode result as a decode value for macroblocks up to a position a predetermined amount before the error detection position in units of bits or syntax which is obtained by said forward decoder, and a backward decode result as a decode value for macroblocks from a position a predetermined amount after the error detection position in units of bits or syntax which is obtained by said backward decoder, and discards encoded data composed of transform coefficients of the remaining macroblocks, when the error detection positions obtained by said forward and backward decoders do not cross each other as both positions in units of bits and syntax, (b) uses a forward decode result as a decode value for macroblocks up to a position immediately before the error detection position in units of syntax which is obtained by said backward decoder, and a backward decode result as a decode value for macroblocks from a position immediately after the error detection position in units of syntax which is obtained by said forward decoder, and discards encoded data composed of transform coefficients of a macroblock on which the error detection positions in units of syntax cross each other, when the error detection positions obtained by said forward and backward decoders do not cross each other as positions in units of bits but cross each other as positions in units of syntax, (c) uses a forward decoder result as a decode value for macroblocks up to a position immediately before the error detection position in units of bits which is obtained by said backward decoder, and a backward decode result as a decode value for macroblocks from a position immediately after the error detection position in units of bits which is obtained by said forward decoder, and discards encoded data composed of transform coefficients of a macroblock on which the error detection positions in units of bits cross each other, when the error detection positions obtained by said forward and backward decoders cross each other as positions in units of bits but do not cross each other as positions in units of syntax, and (d) selects a position where a crossing portion becomes largest as an error detection position, uses a forward decode result as a decode value for macroblocks up to a position immediately before the error detection position obtained by said backward decoder and a backward decode result as a decode value for macroblocks from a position immediately after the error detection position obtained by said forward decoder, and discards encoded data composed of transform coefficients of a macroblock on which the error detection positions cross each other, when the error detection positions obtained by said forward and backward decoders cross each other as both positions in units of bits and syntax.

10. A video decoding apparatus according to claim 9, wherein said decode value determination unit displays a previous frame for a macroblock from which encoded data is discarded or processes the macroblock in a mode without encoding when an intraframe encoding mode is set, and performs motion compensation when an interframe prediction encoding mode is set.

* * * * *